INVENTORS
F. G. HALLDEN
G. H. RIDINGS
D. M. ZABRISKIE
R. D. PARROTT
BY
ATTORNEY

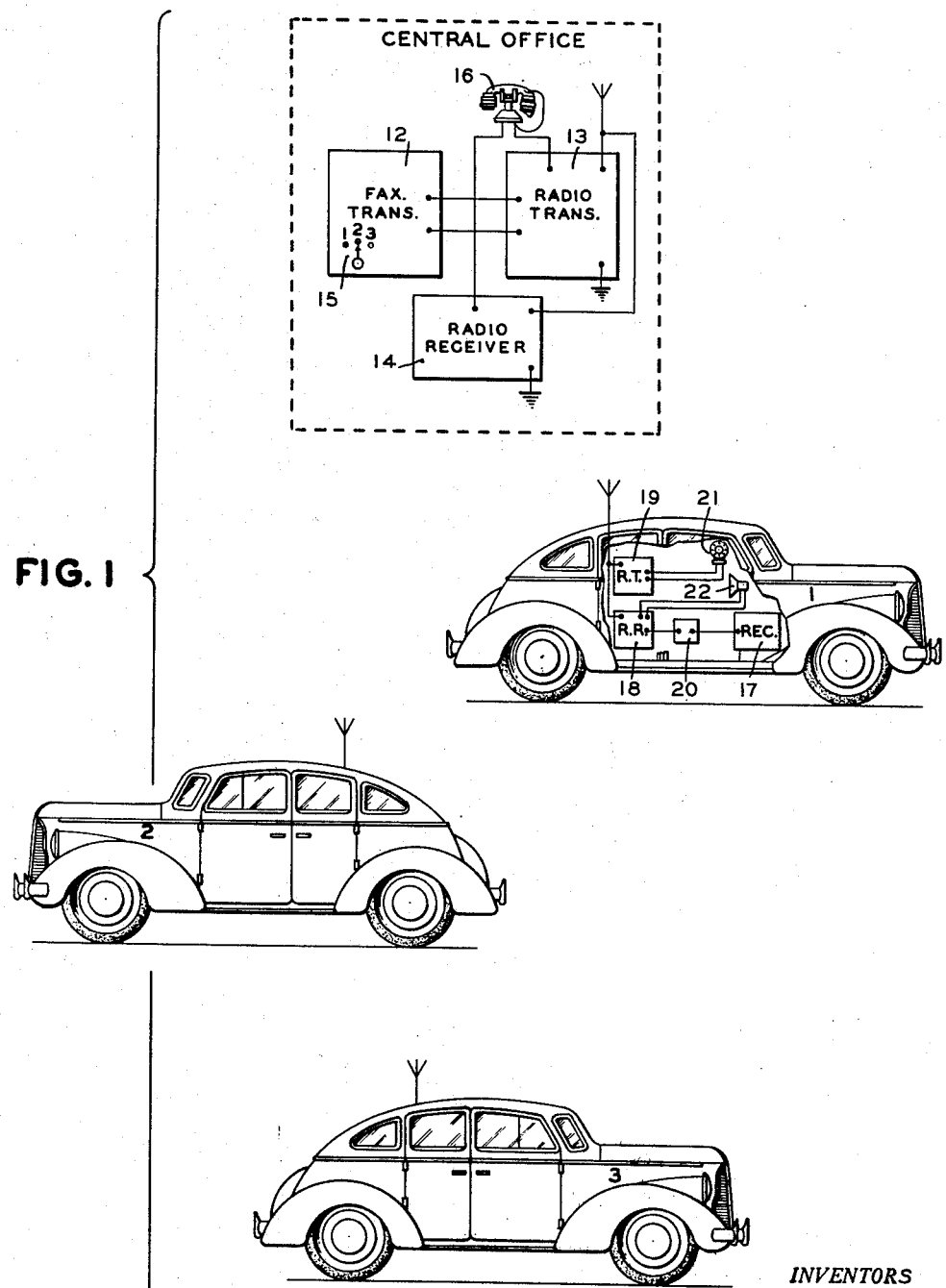

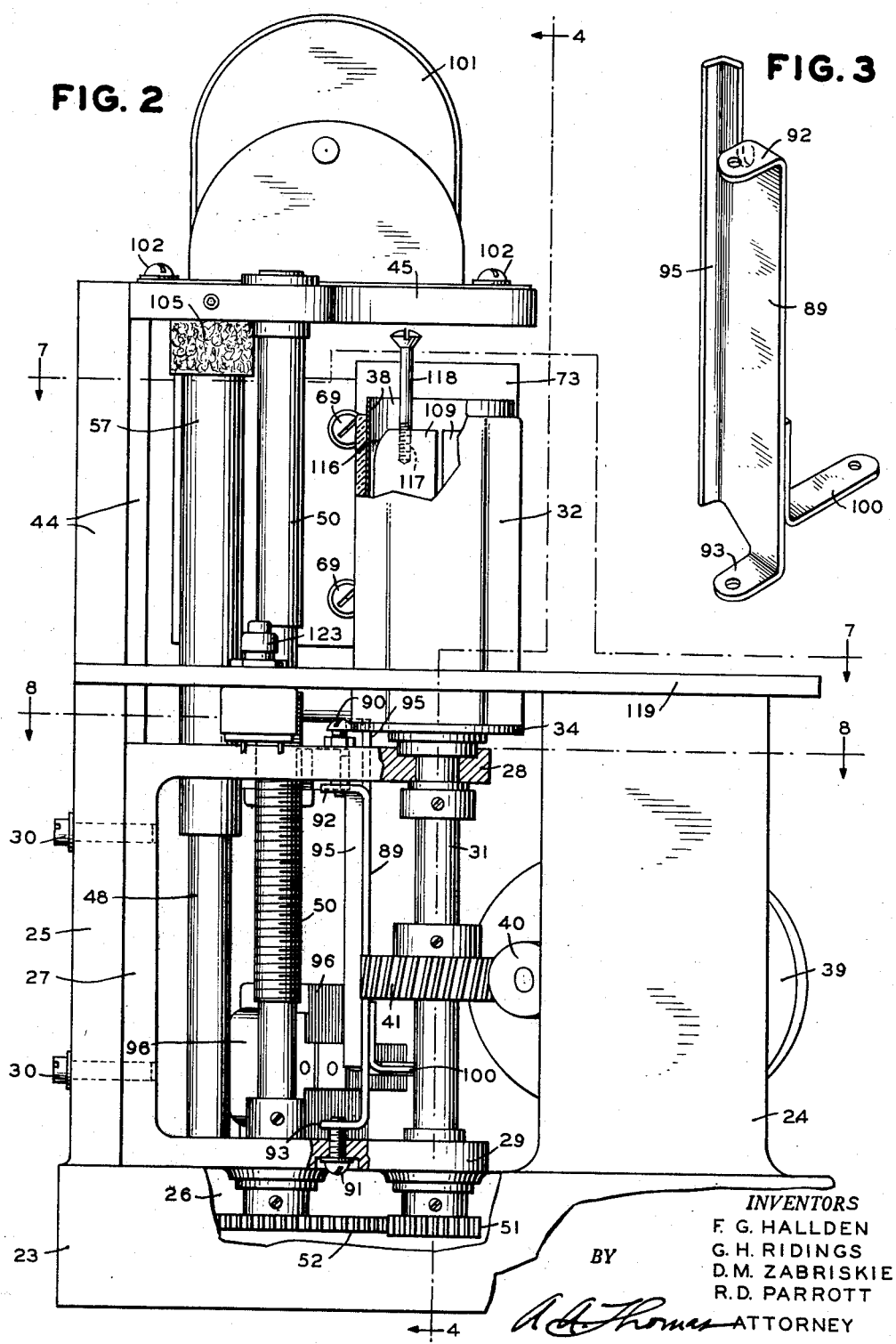

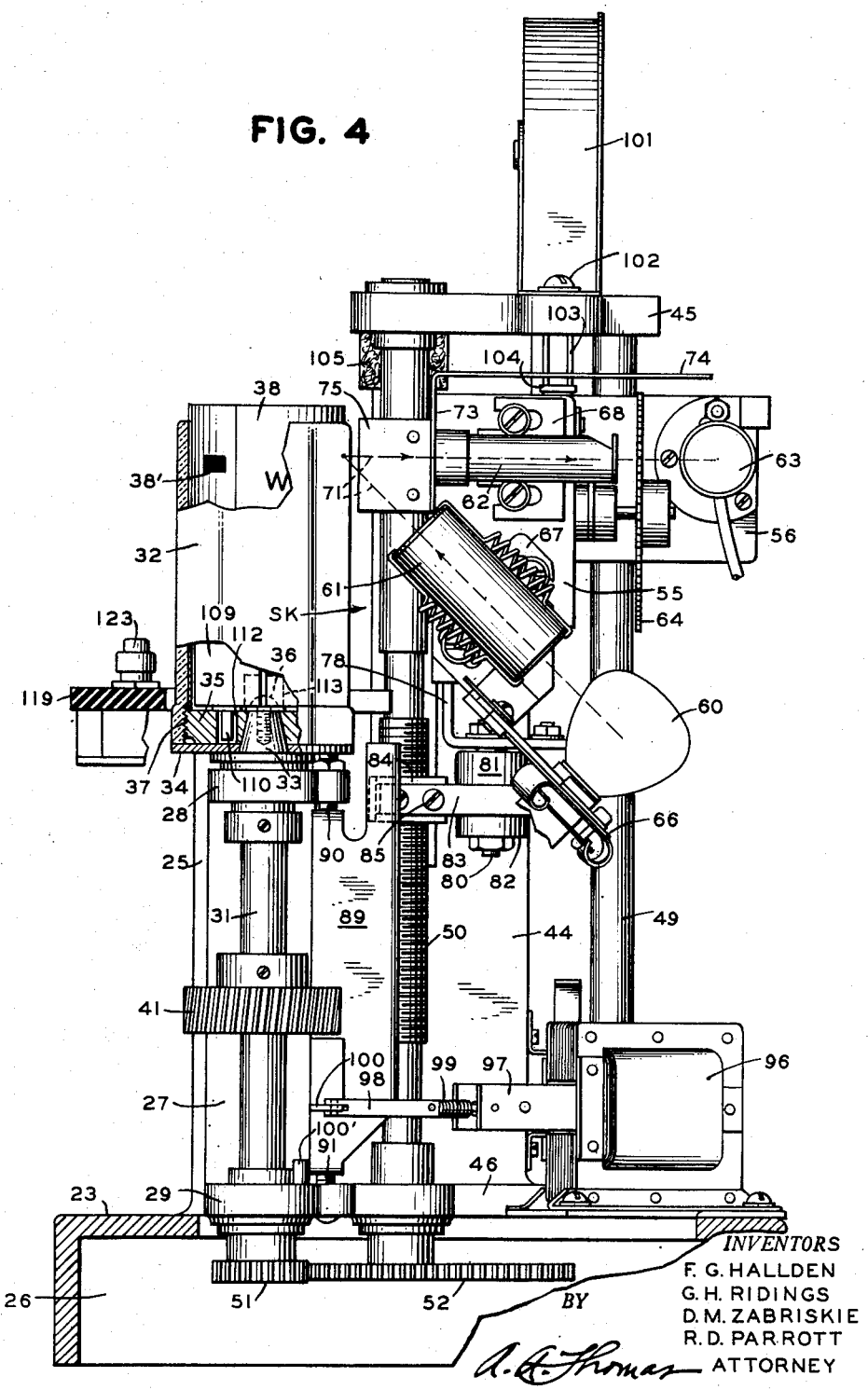

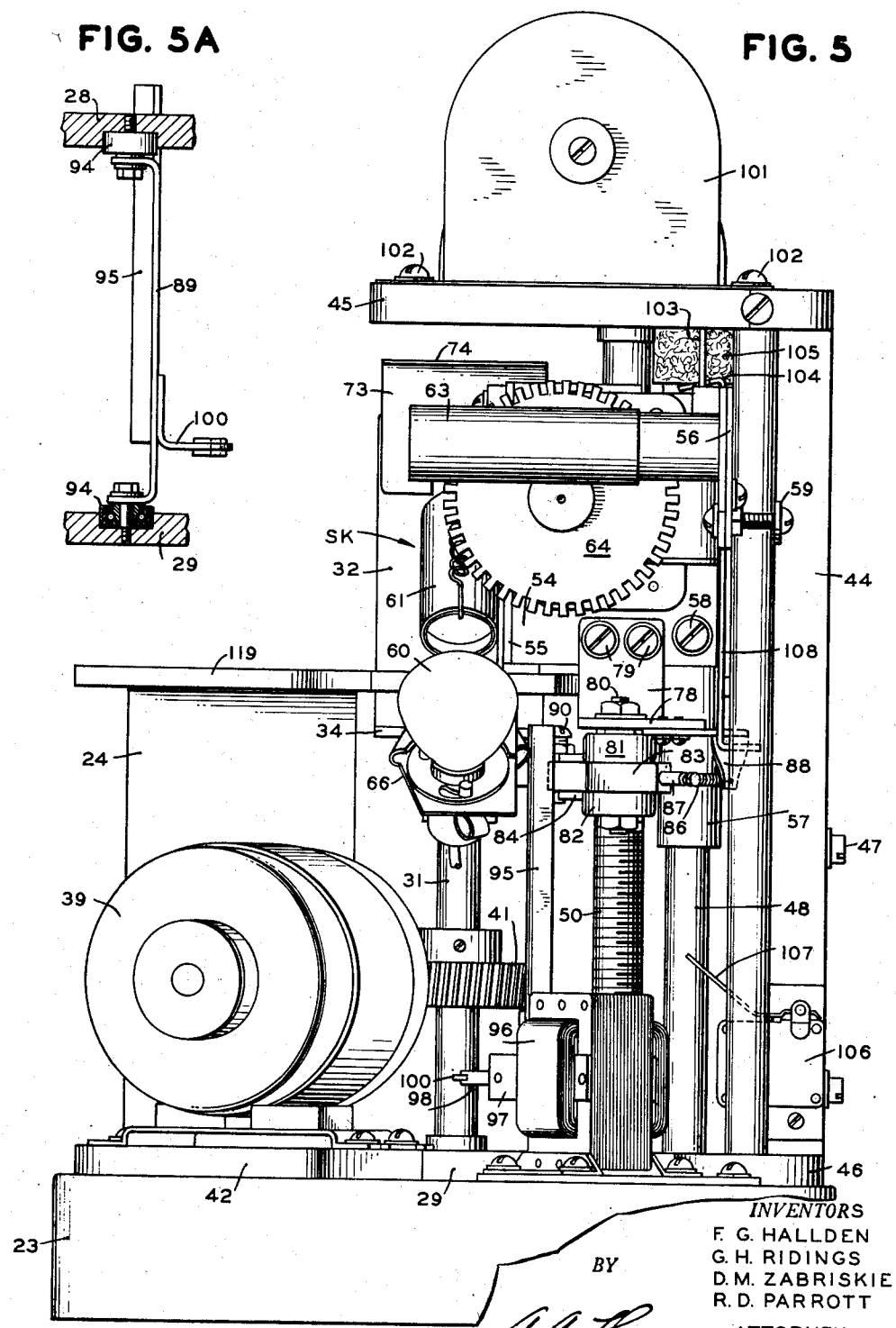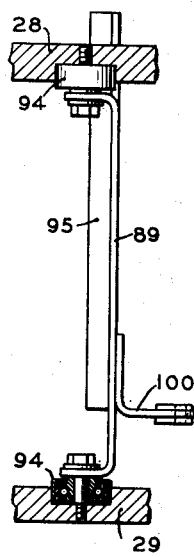

INVENTORS
F. G. HALLDEN
G. H. RIDINGS
D. M. ZABRISKIE
R. D. PARROTT
ATTORNEY

INVENTORS
F. G. HALLDEN
G. H. RIDINGS
D. M. ZABRISKIE
R. D. PARROTT
BY
ATTORNEY

March 16, 1954  F. G. HALLDEN ET AL  2,672,503
SYSTEM AND APPARATUS FOR FACSIMILE TELEGRAPH
TRANSMISSION AND RECORDING
Filed Feb. 7, 1948  24 Sheets-Sheet 10

INVENTORS
F. G. HALLDEN
G. H. RIDINGS
D. M. ZABRISKIE
R. D. PARROTT
BY
A. R. Thomas ATTORNEY

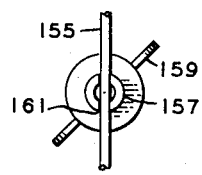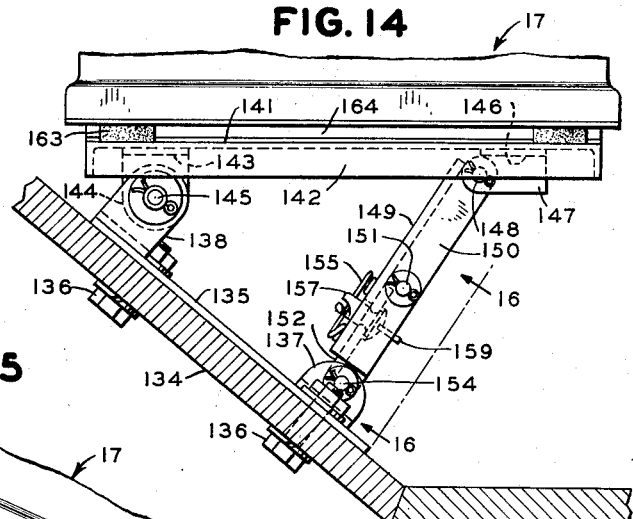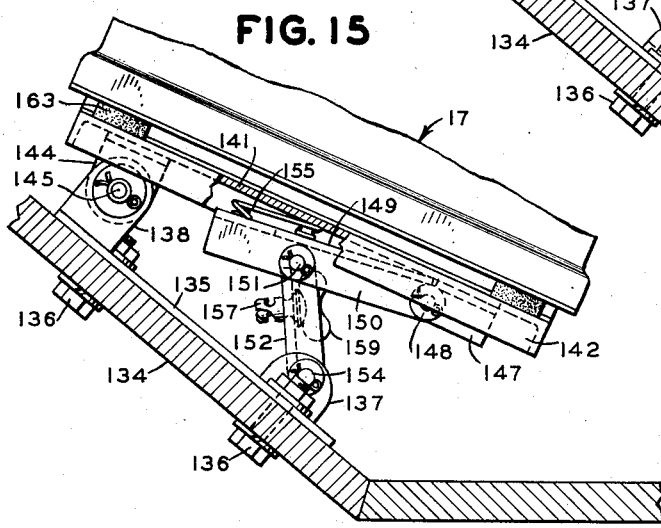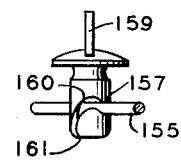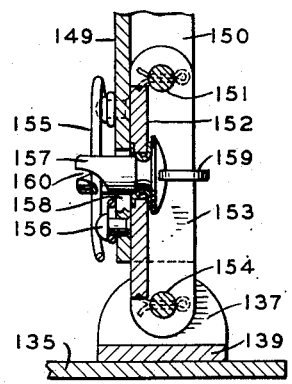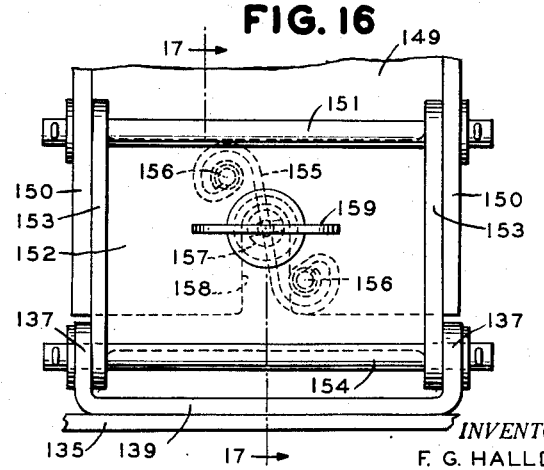

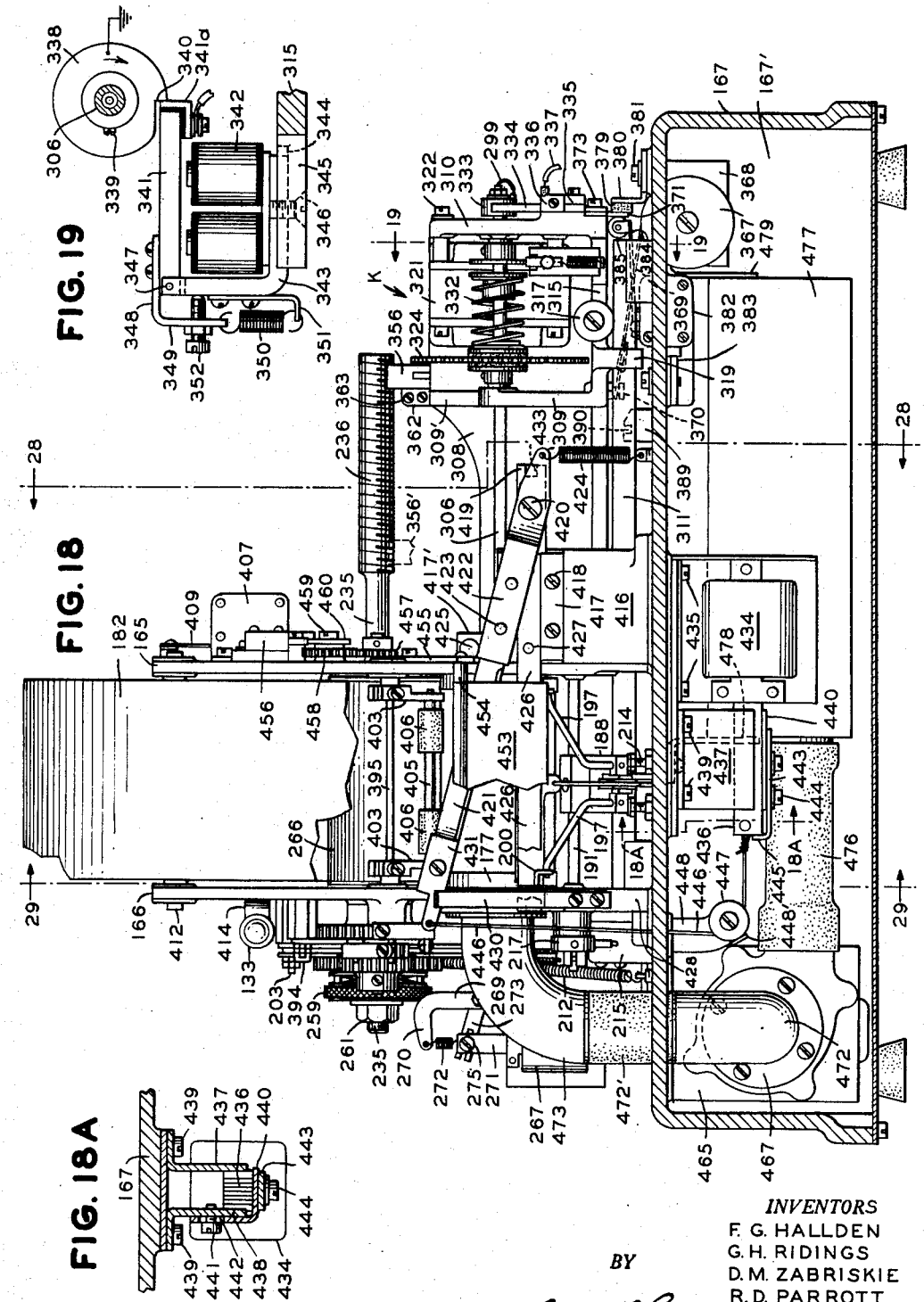

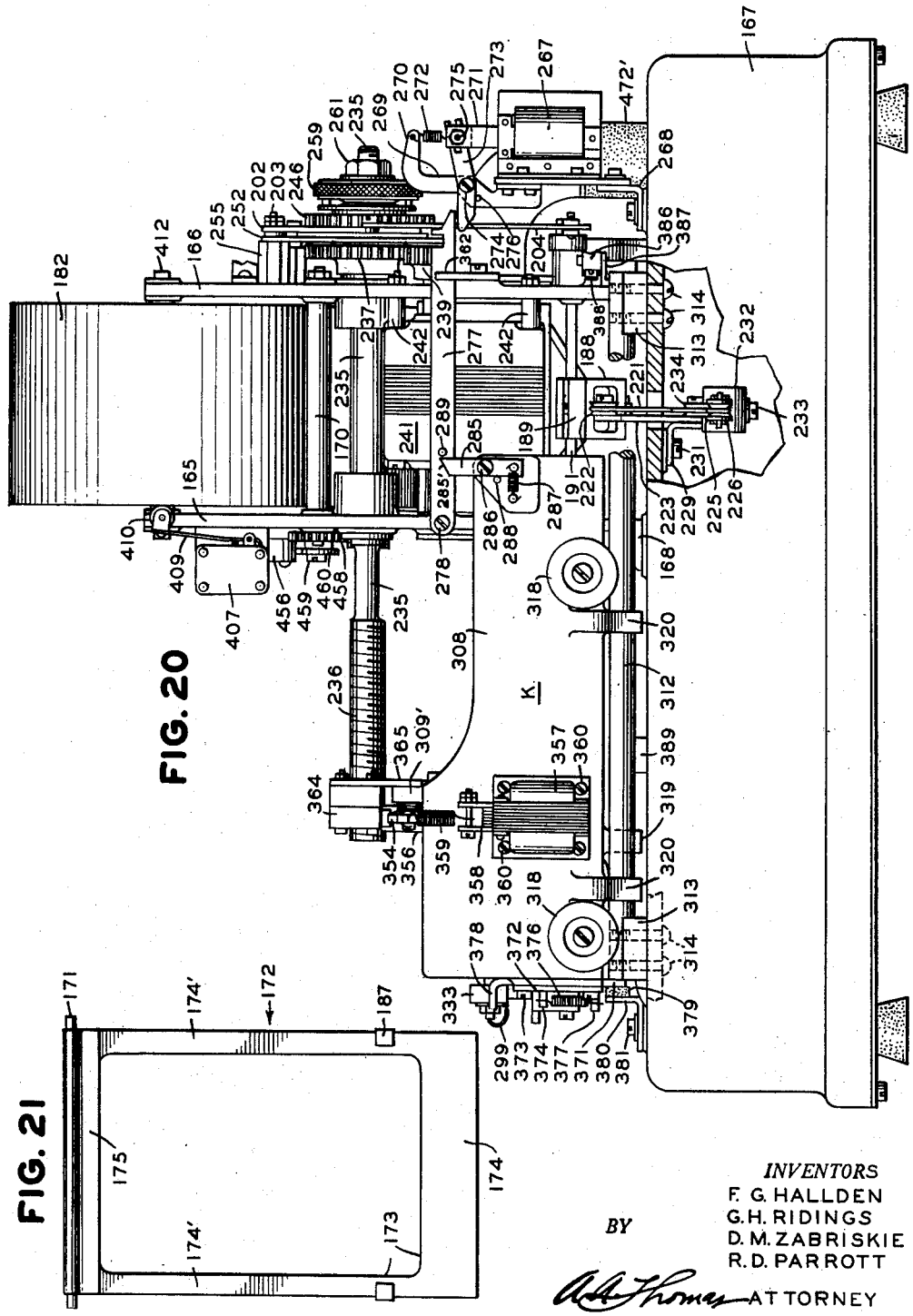

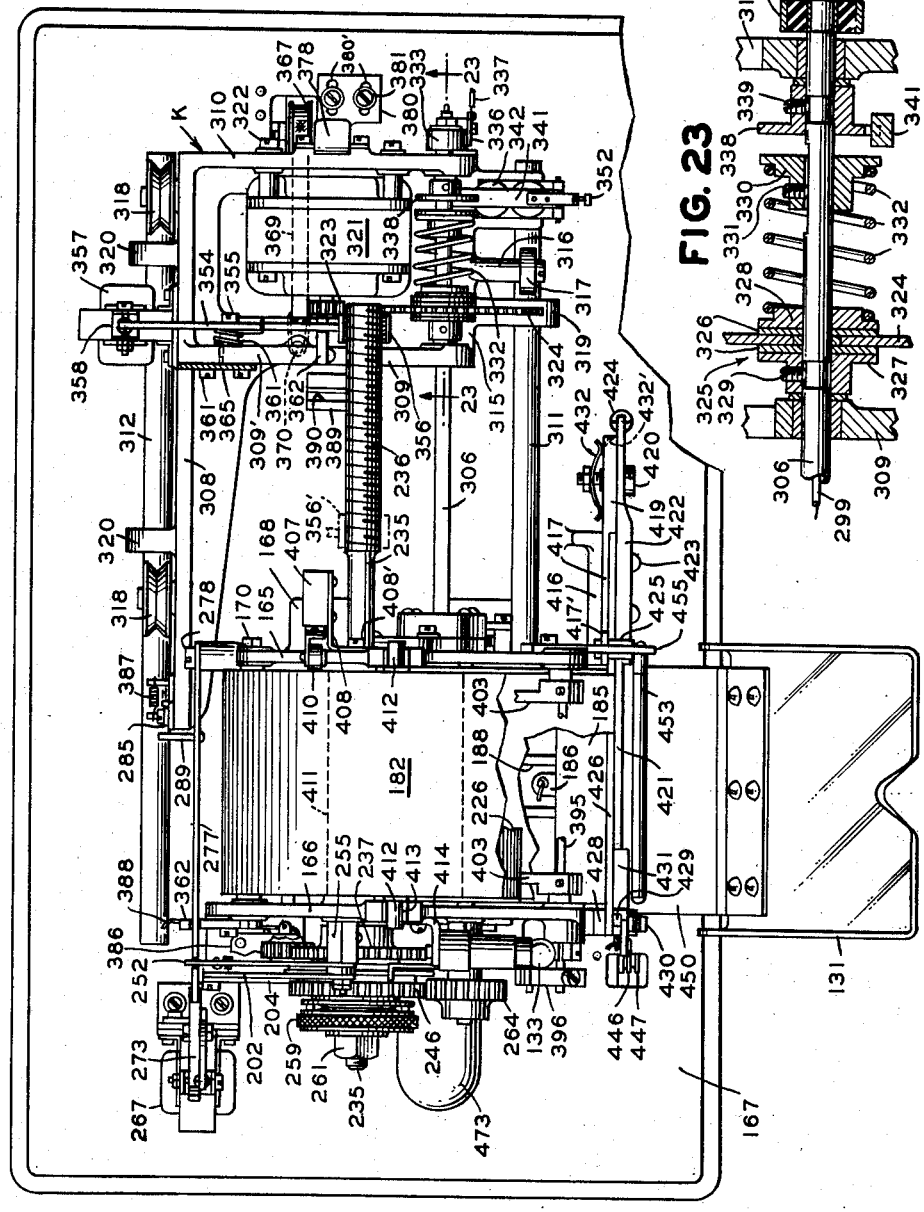

March 16, 1954

F. G. HALLDEN ET AL 2,672,503

SYSTEM AND APPARATUS FOR FACSIMILE TELEGRAPH
TRANSMISSION AND RECORDING

Filed Feb. 7, 1948

INVENTORS
F. G. HALLDEN
G. H. RIDINGS
D. M. ZABRISKIE
R. D. PARROTT

BY

*A. A. Thomas* — ATTORNEY

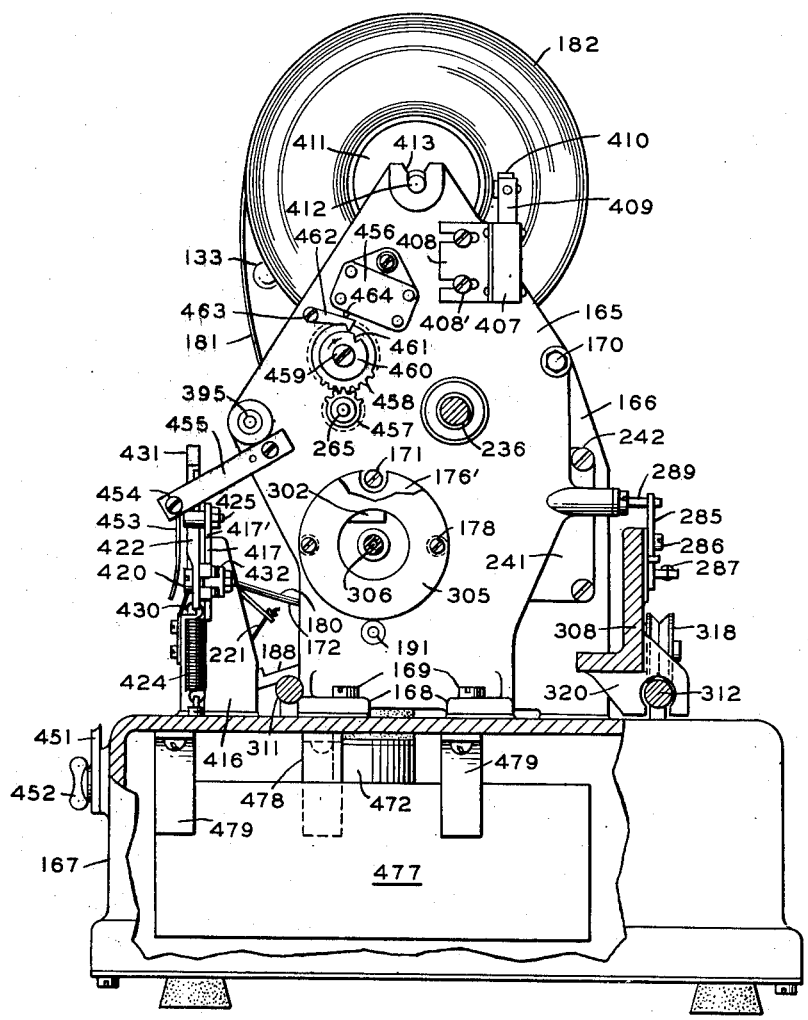

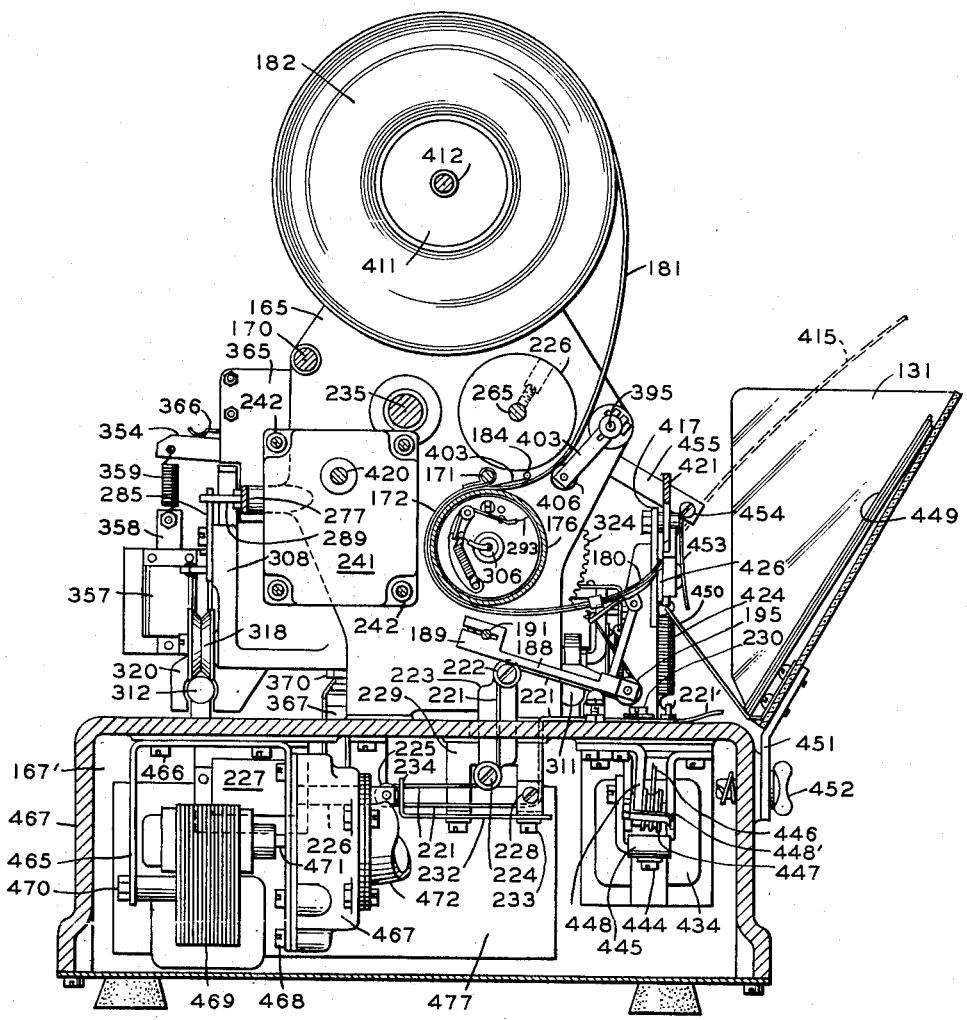

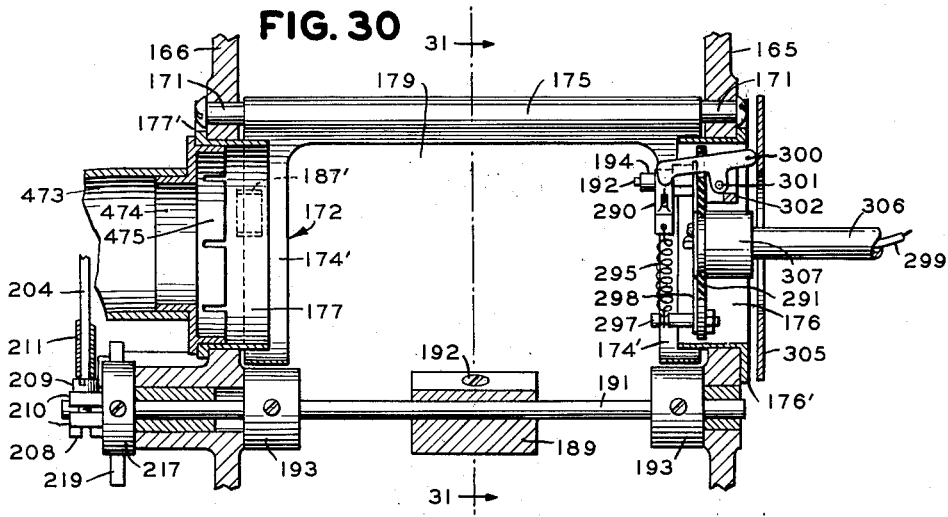

March 16, 1954  F. G. HALLDEN ET AL  2,672,503
SYSTEM AND APPARATUS FOR FACSIMILE TELEGRAPH
TRANSMISSION AND RECORDING
Filed Feb. 7, 1948  24 Sheets-Sheet 20
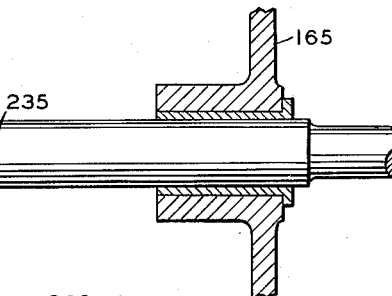
FIG. 35
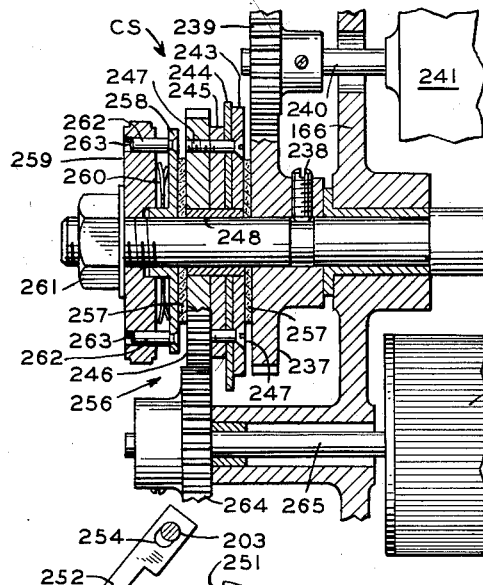
FIG. 36
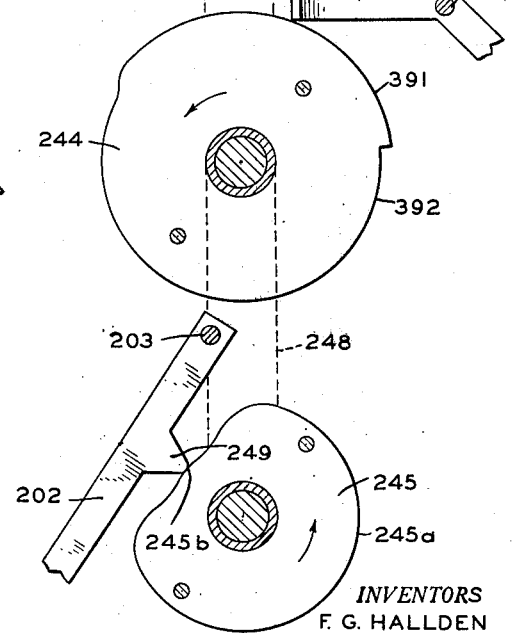
FIG. 37
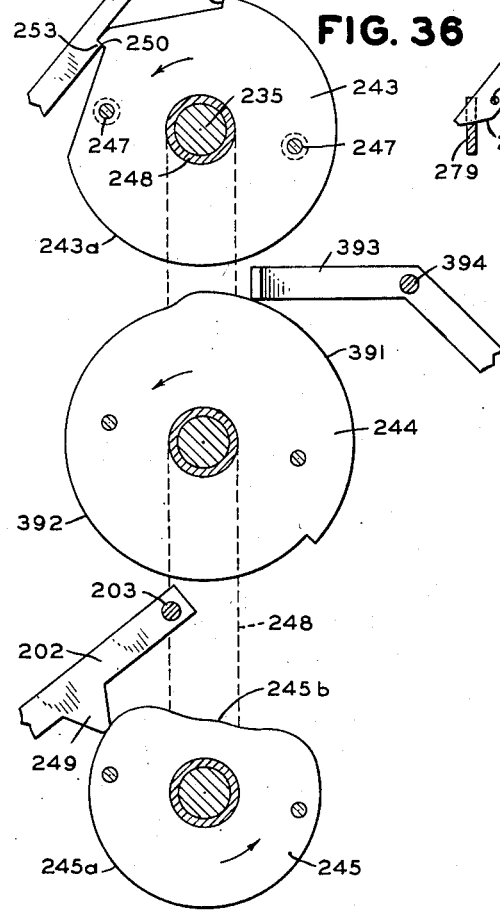
INVENTORS
F. G. HALLDEN
G. H. RIDINGS
D. M. ZABRISKIE
R. D. PARROTT
BY A. K. Thomas ATTORNEY March 16, 1954  F. G. HALLDEN ET AL  2,672,503
SYSTEM AND APPARATUS FOR FACSIMILE TELEGRAPH
TRANSMISSION AND RECORDING
Filed Feb. 7, 1948  24 Sheets-Sheet 21

INVENTORS
F. G. HALLDEN
G. H. RIDINGS
D. M. ZABRISKIE
R. D. PARROTT
BY
A. A. Thomas
ATTORNEY March 16, 1954 F. G. HALLDEN ET AL 2,672,503
SYSTEM AND APPARATUS FOR FACSIMILE TELEGRAPH
TRANSMISSION AND RECORDING
Filed Feb. 7, 1948 24 Sheets-Sheet 22
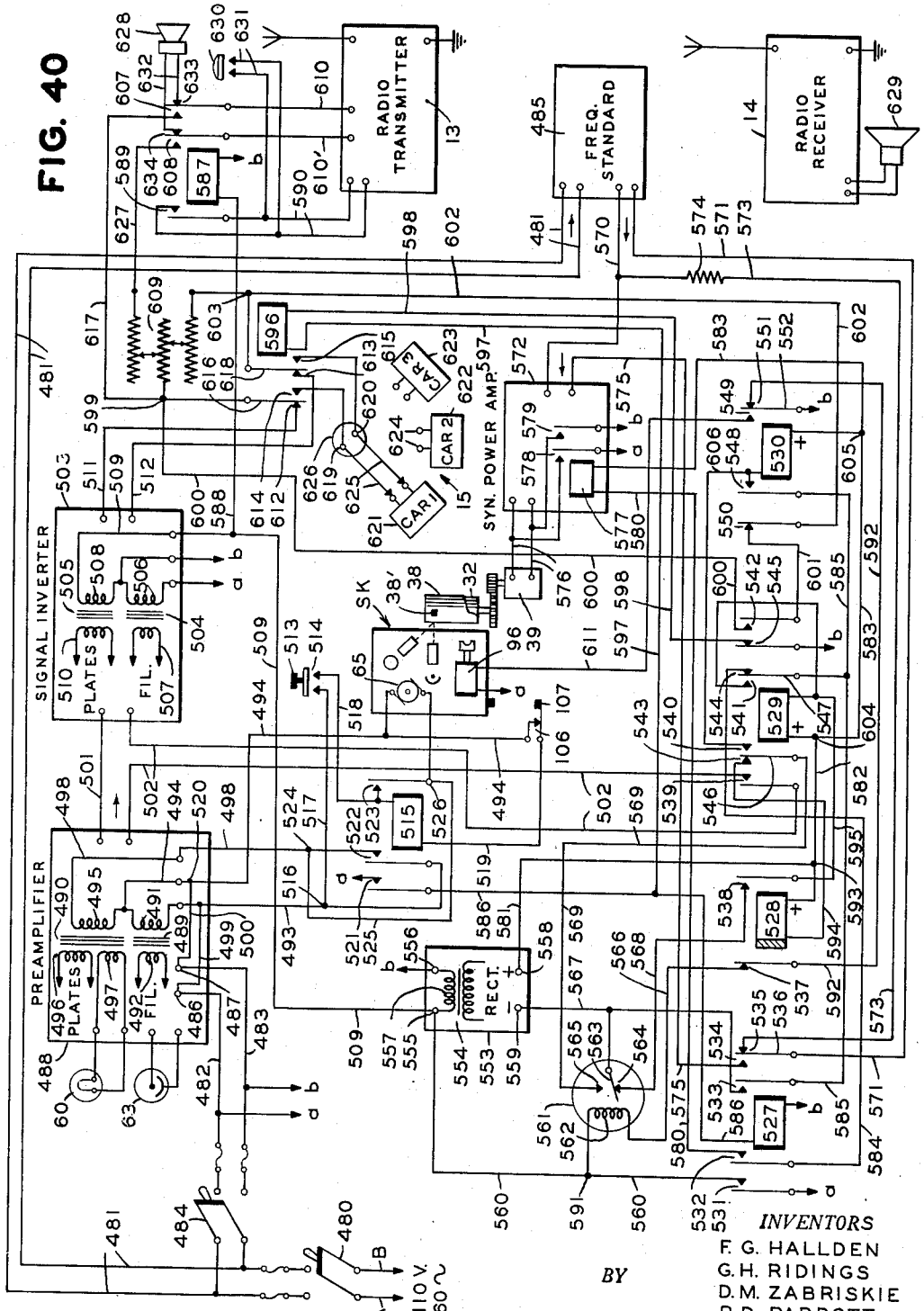
INVENTORS
F. G. HALLDEN
G. H. RIDINGS
D. M. ZABRISKIE
R. D. PARROTT
BY
A. H. Thomas ATTORNEY

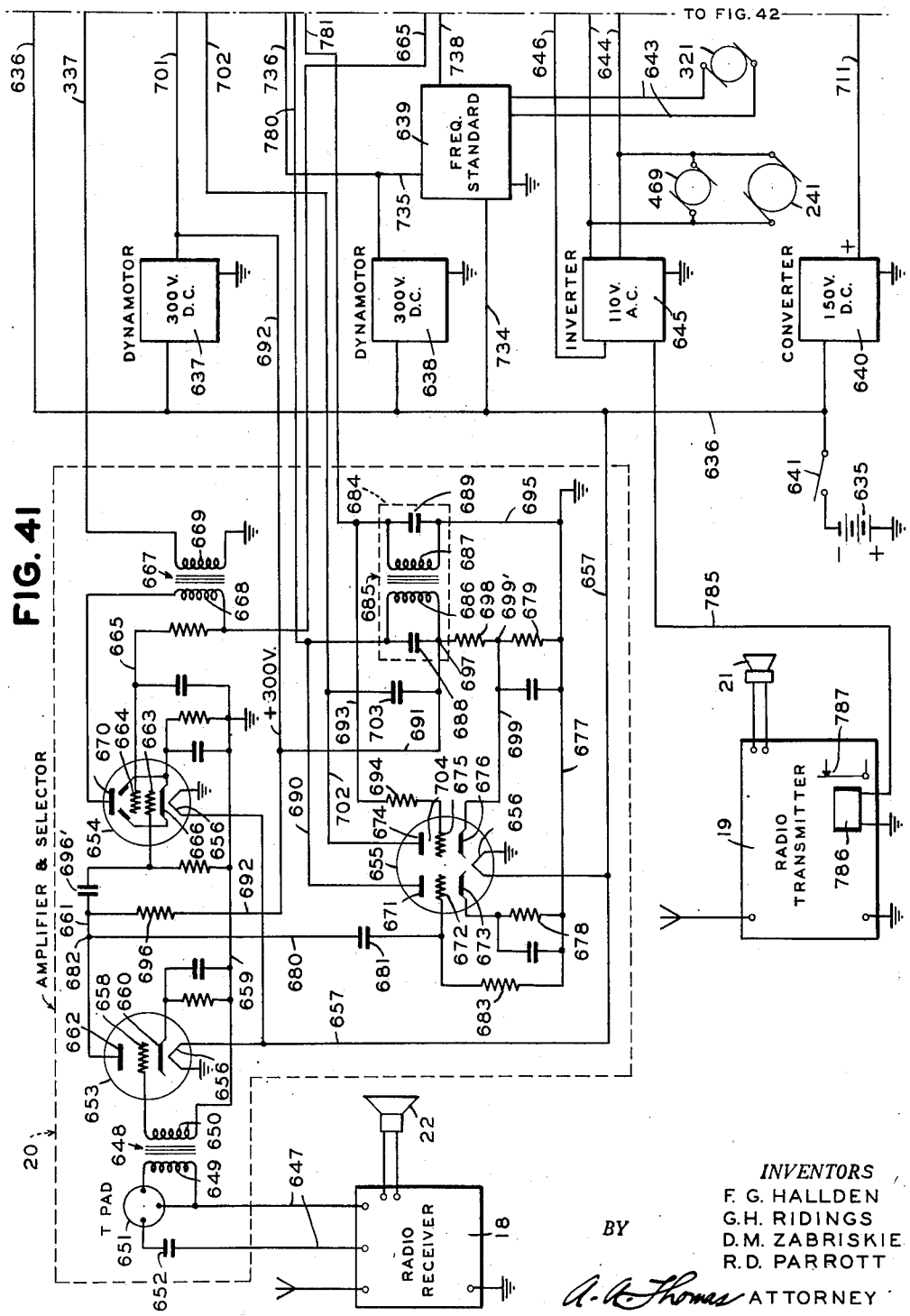

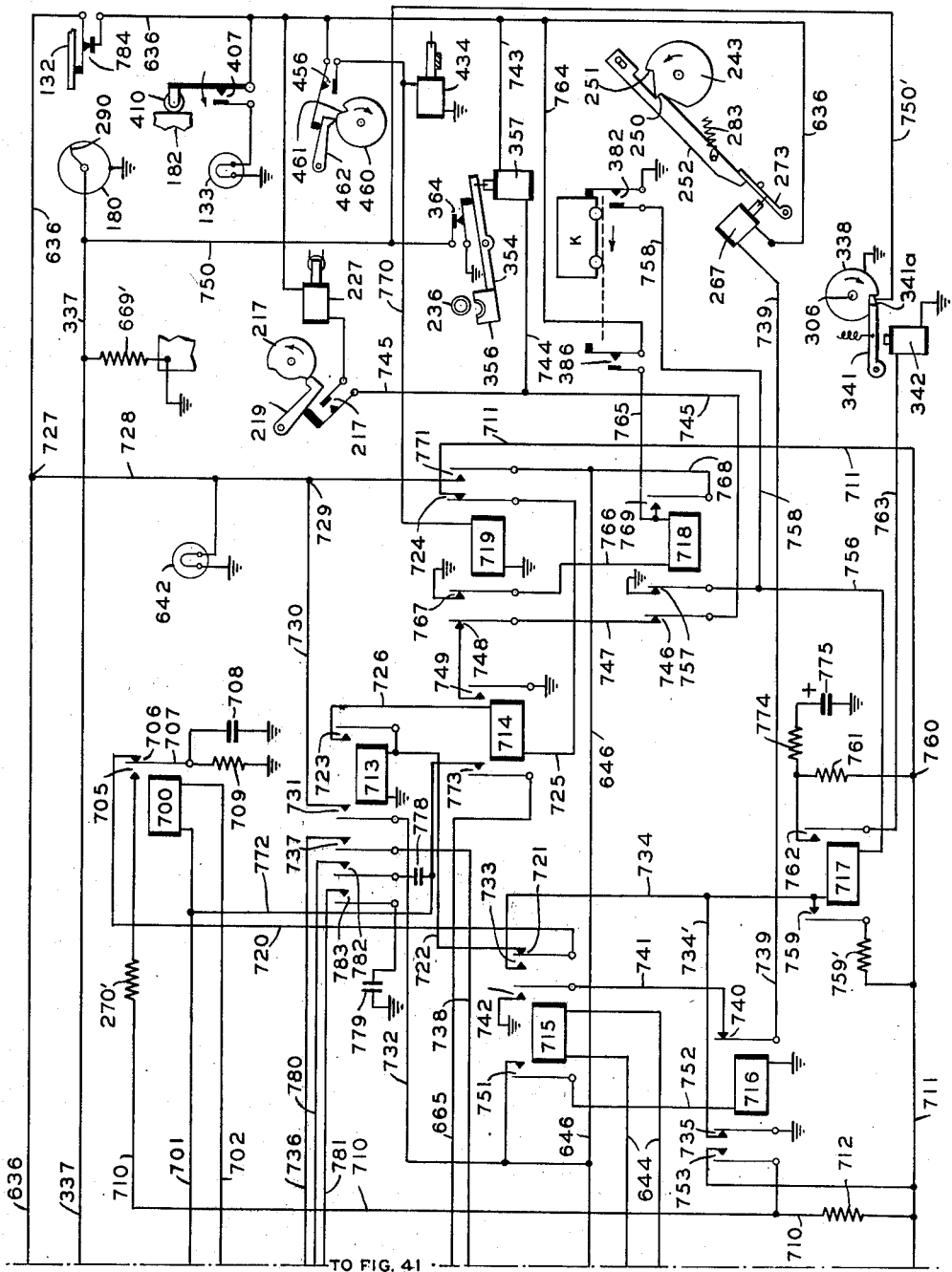

Patented Mar. 16, 1954

2,672,503

UNITED STATES PATENT OFFICE 2,672,503

SYSTEM AND APPARATUS FOR FACSIMILE TELEGRAPH TRANSMISSION AND RECORDING

Frederick G. Hallden, Bellerose, N. Y., and Garvice H. Ridings, Summit, Douglas M. Zabriskie, Northvale, and Robert D. Parrott, West New York, N. J., assignors to The Western Union Telegraph Company, New York, N. Y., a corporation of New York Application February 7, 1948, Serial No. 6,846

13 Claims. (Cl. 178—6.6)

Our invention relates to the art of facsimile telegraphy and its purpose is to provide novel systems and apparatus for simplifying and facilitating the delivery of transmitted messages, whereby this service is not only speeded up but made more economical.

It is generally known that telegrams received at the central office of a city are teletyped to the various branch offices from which delivery of the messages is made by messenger boys. Each telegram is sent from the central office to that branch office which is nearest to the address of delivery. The area covered by a branch office is usually extensive, especially in communities of private homes, so that a messenger boy often has to travel miles to deliver a telegram. Even with the familiar bicycle this trip may take a long time.

It frequently happens that, while a boy is out on a delivery errand, the branch office receives a telegram to be delivered in the very neighborhood where the boy has already gone. So, when the boy goes back to the office, he has to go over the same route again to deliver that other telegram. The same remarks apply to a branch office employing several boys, each of whom is assigned to a certain section of the territory served by that office.

Thus we see the delays and waste of time in the delivery of telegrams under that ancient system. Such delays not only increase the cost of the delivery service to the telegraph company but also lower the efficiency of telegraphic communications, where speed is the essential thing.

To overcome the foregoing objections and problems in telegraph service we have devised novel means for making the delivery of telegrams faster and more economical. We accomplish this object by a facsimile telegraph system adapted for operation over a radio circuit and employing one or more mobile receiving units to which the messages are facsimiled from the central office for direct delivery to the addressees.

In brief outline, this is the way our system works in a large city. We equip the required number of automobiles (depending on the size of the area to be served) each with a radio receiver and a facsimile recorder operatively connected to the radio receiver through a selector and the necessary circuits. The selector on each car makes a recording mechanism operative only when a particular starting frequency is picked up by the radio receiver of that car. Each automobile thus equipped covers a specified section of the city. The central telegraph office has one or more facsimile transmitters connected to a radio transmitter and there is a selector switch for sending the desired starting frequency over the radio transmission circuit. The operator at the central telegraph office knows the starting frequency of each car and also knows which car is assigned to each section of the city.

Suppose a telegram received at the main office is directed to an address in the section covered by car No. 3. The central operator first adjusts the selector switch to send out the proper frequency for the desired car, which is thereby placed in operative condition for facsimile reception. Then by pushing a button the operator at the main office starts the facsimile transmission of the message, which is automatically recorded by the selected mobile mechanism. The operator of the car drives to the given address and delivers the telegram. The recording time for a telegram is about a minute and the machine automatically shuts down at the close of the recording cycle, ready for the next message.

As fast as the telegrams are received at the main office they are facsimiled to the mobile recording units, which may be on the move all the time within their respective districts, receiving and delivering messages. The recording mechanism operates automatically, so that messages can be sent to a car at at any time, no matter whether the car is moving or standing still, or whether the messenger is in the car or has left it to deliver a telegram. There is thus no delay and loss of time in the delivery of telegrams.

In a preferred embodiment of our mobile facsimile system we provide each car with radio telephone equipment, so that the central operator and the car messenger can carry on a two-way conversation if necessary. This enables the central operator to telephone suitable information to any car, such as the address of an incoming telegram, so that the car can be on its way to the delivery address while the telegram is being recorded. Further, when a car messenger accepts an outgoing message from a customer, he telephones it at once from the car to the main office for transmission to its destination. In this way the time of transmission and delivery of the message is reduced still more, thereby further increasing the efficiency and economy of telegraph communication.

As indicating the flexibility of our telegraph transmission system, several cars may be assigned to a particular district in which a heavy message traffic is expected for a certain time, as during a holiday period. These cars, which are in effect roving telegraph offices, may be parked in various spots over the district, and as fast as telegrams are received by the cars they are delivered to the addressees.

A practical embodiment of our invention as actually built and operated is shown in the accompanying drawings, in which:

Fig. 1 represents a diagrammatic outline of our radio facsimile system as a whole;

Fig. 2 is a front elevation of the facsimile transmitter used in our system;

Fig. 3 shows a bail employed in the operation of the transmitter scanning mechanism;

Fig. 4 is a side view of the transmitter looking along section line 4—4 of Fig. 2;

Fig. 5 is a rear view of the transmitter;

Fig. 5A shows the bail of Fig. 3 with a different mounting;

Figure 7:
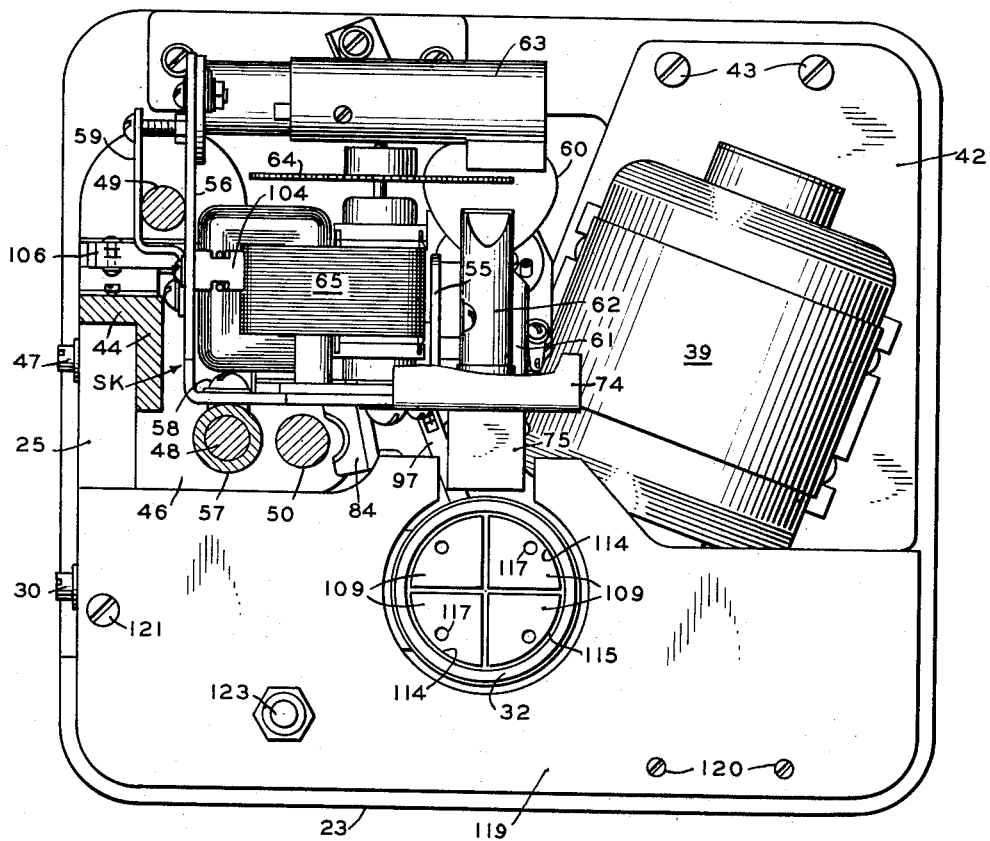
Figure 8:
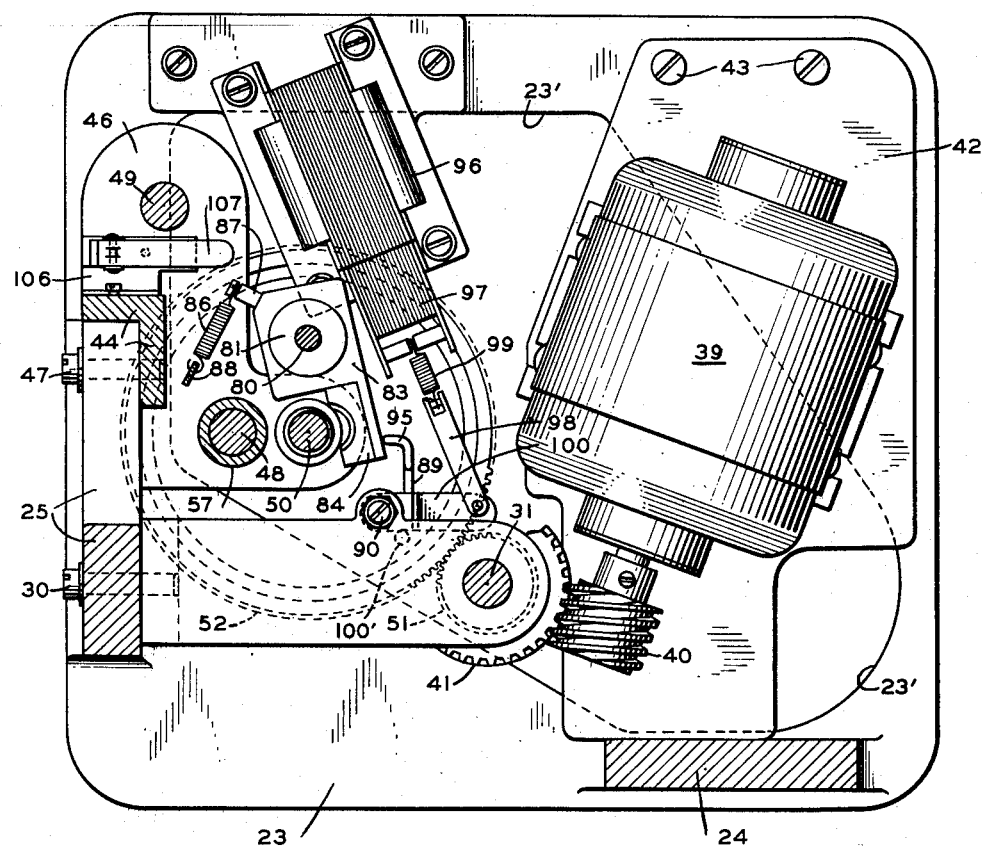
Figure 9:
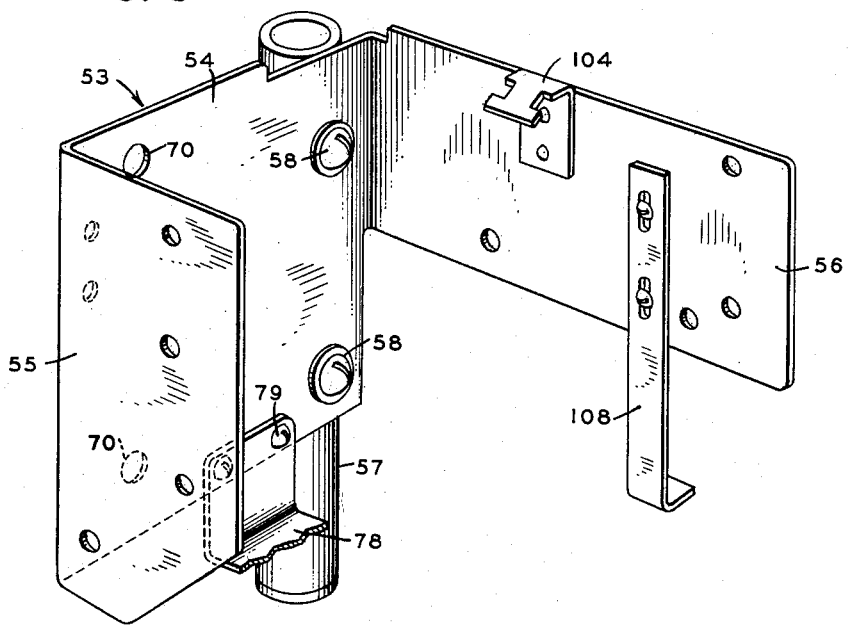
Figure 10:
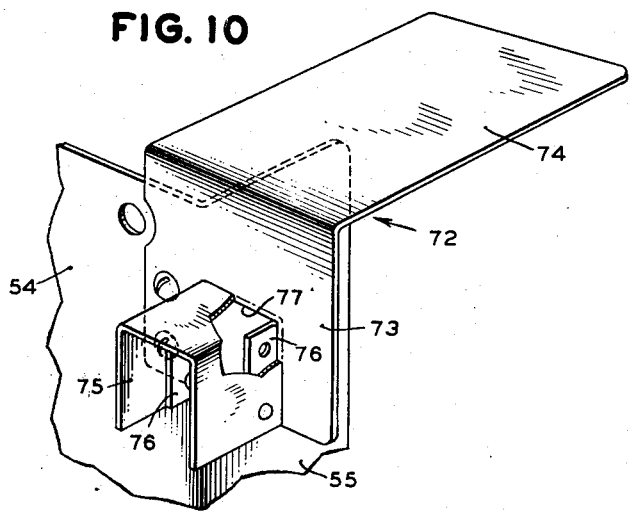
Figure 11:
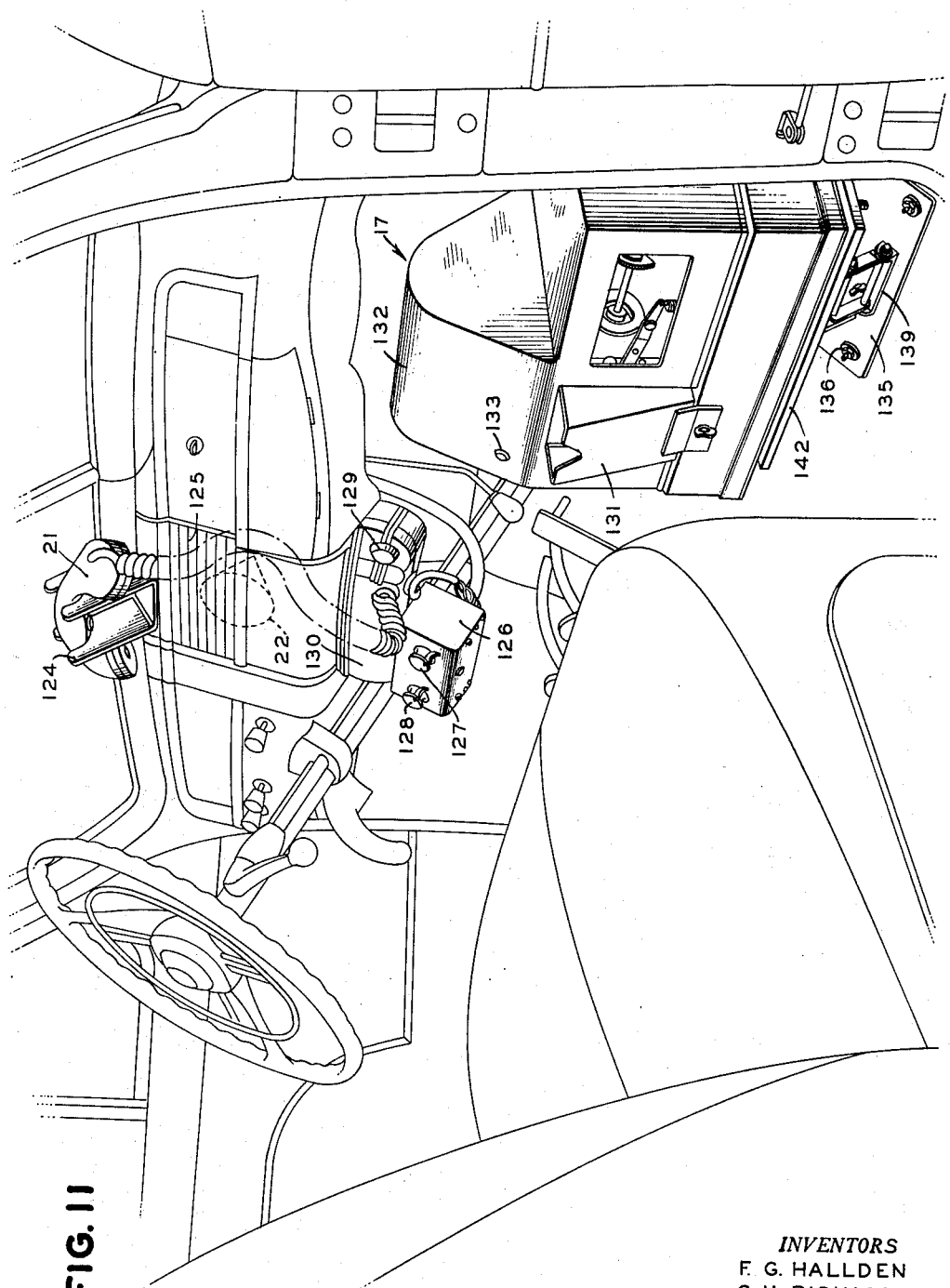
Figure 12:
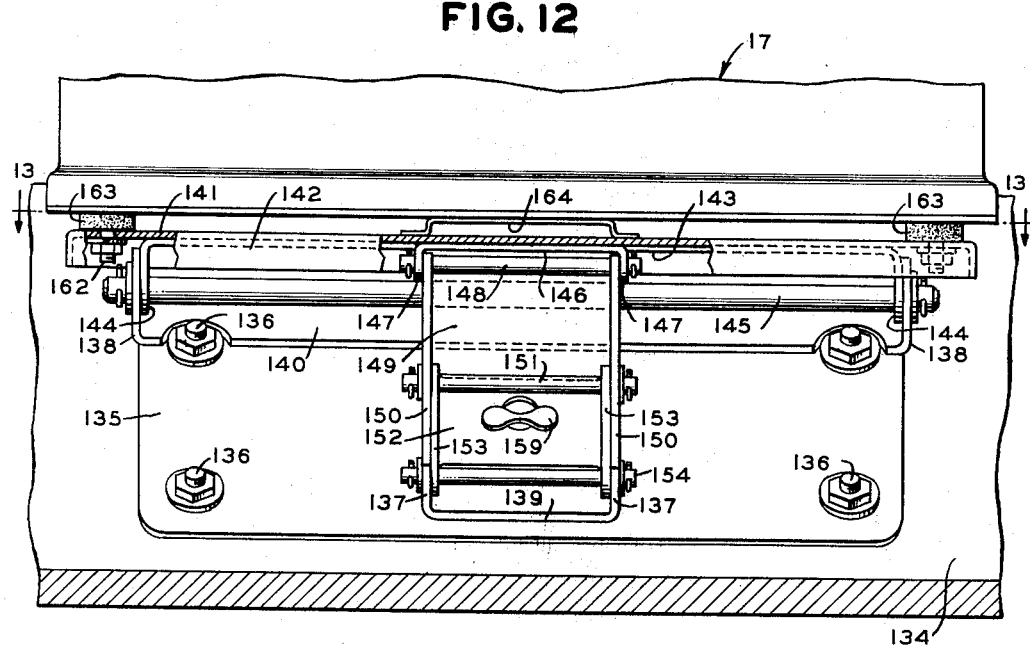
Figure 13:
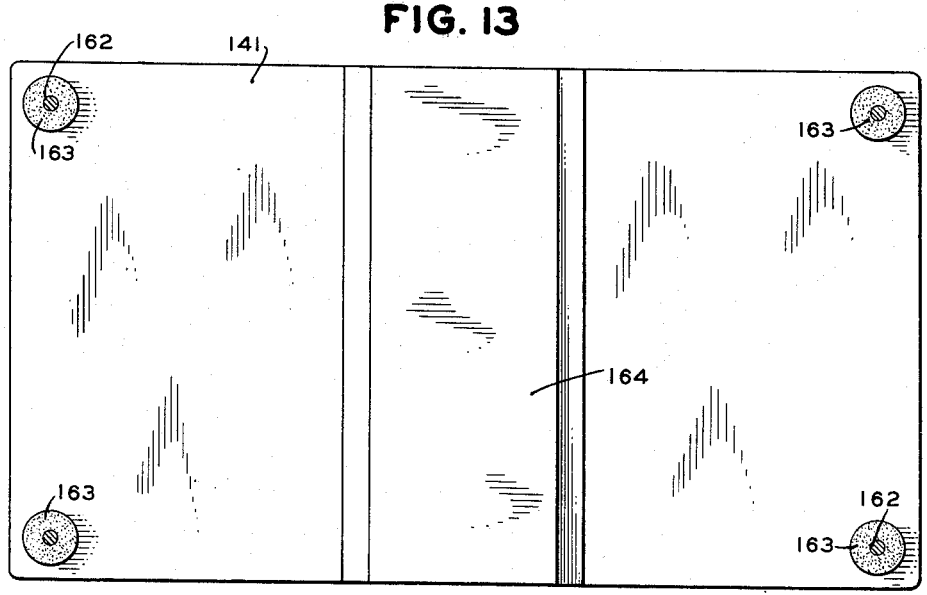
Figure 24:
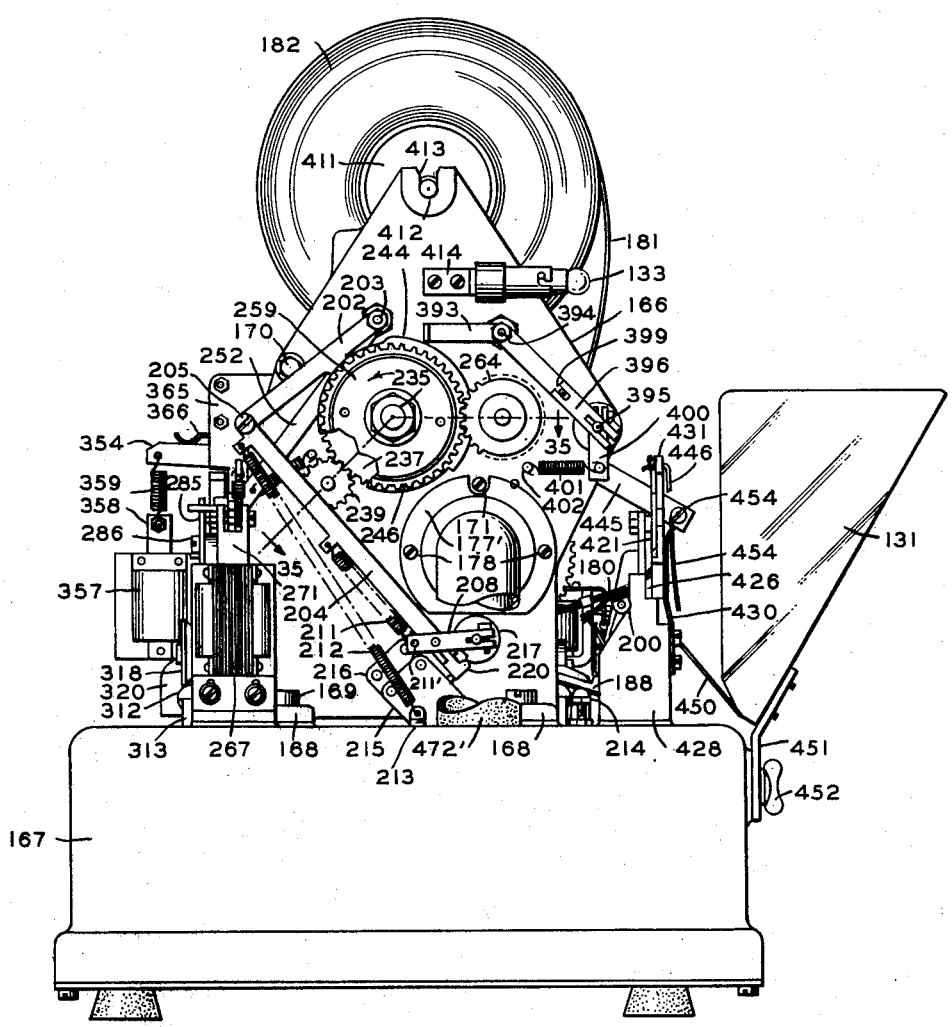
Figure 25:
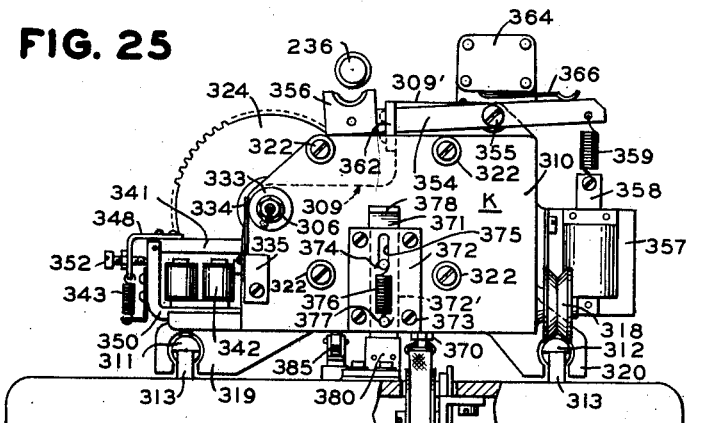
Figure 27A:
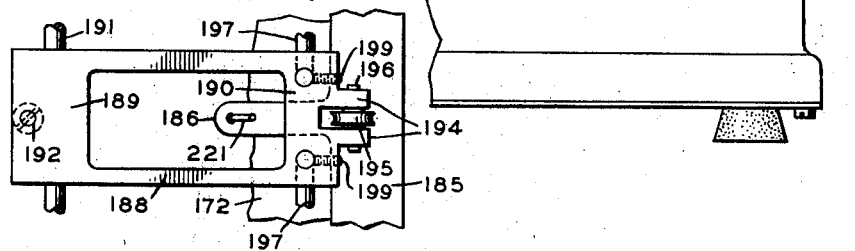
Figure 26:
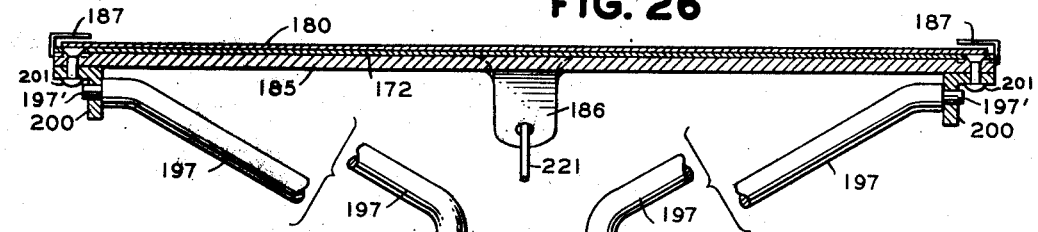
Figure 27B:
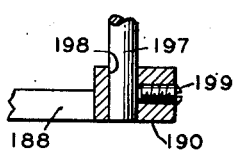
Figure 27:
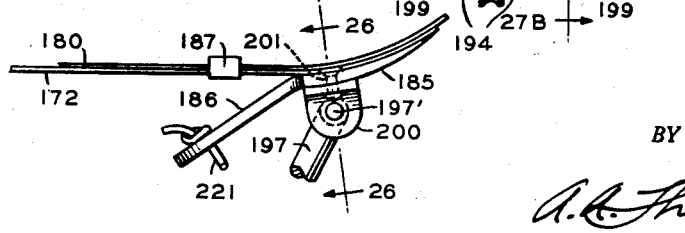
Figure 38:
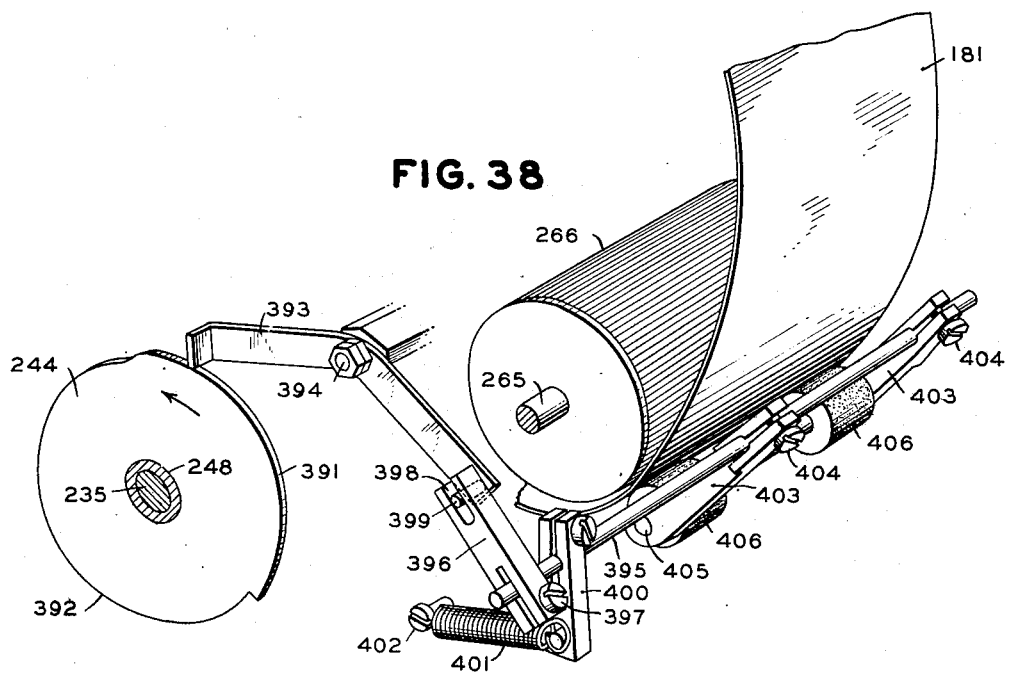
Figure 39:
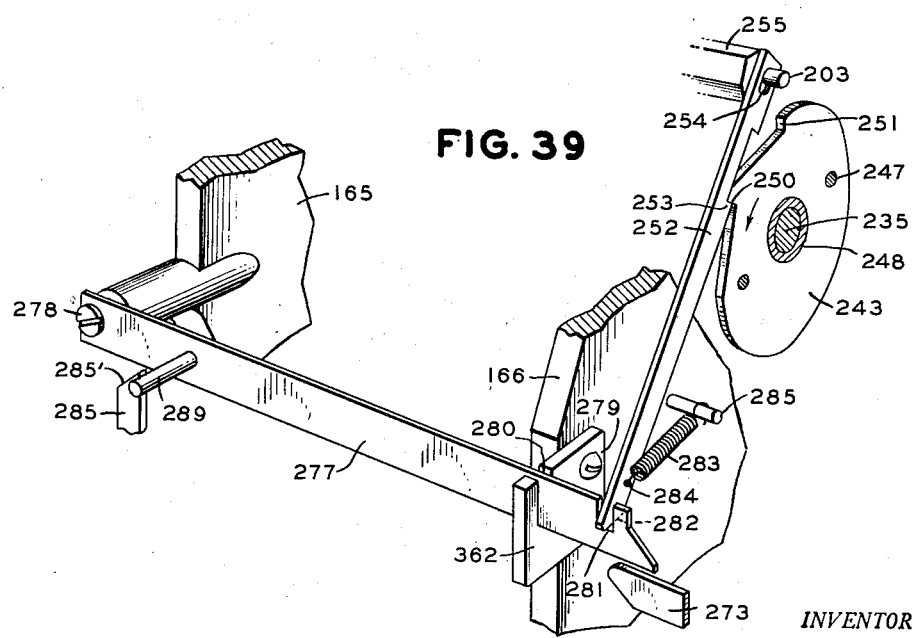

Figs. 7 and 8 are sectional plan views taken respectively on lines 7—7 and 8—8 of Fig. 2;

Fig. 9 is a perspective view of the scanning carriage frame in the transmitter;

Fig. 10 is a perspective view of the light shield mounted on the transmitter scanning carriage;

Fig. 11 shows the front interior of a standard automobile equipped with a facsimile recorder and other apparatus of our system;

Fig. 12 is a front view of the support which is fastened to the footboard of the car and on which the recorder is mounted;

Fig. 13 is a section on line 13—13 of Fig. 12;

Fig. 14 shows a side view of the recorder support in normal horizontal position;

Fig. 15 shows the support in collapsed condition;

Fig. 16 is an enlarged front view along the line 16—16 of Fig. 14;

Fig. 17 is a cross section on line 17—17 of Fig. 16;

Figs. 17A and 17B show details of the fastening device used in the other figures on that sheet;

Fig. 18 represents a front view of the recorder with a section through the base;

Fig. 18A is a section on the line 18A—18A of Fig. 18;

Fig. 19 is an enlarged view on line 19—19 of Fig. 18 showing the magnetic phasing device for the stylus shaft;

Fig. 20 shows a rear view of the recorder;

Fig. 21 is a flat view of the flexible wrapper used in the recorder for holding a blank in recording position;

Fig. 22 is a top view of the recorder;

Fig. 23 is an enlarged view of the stylus shaft mounting sectioned on line 23—23 of Fig. 22;

Fig. 24 shows the recorder as viewed from the left end;

Fig. 25 is a right-hand view of the recorder;

Fig. 26 is an enlarged front view of the wrapper and certain parts of the operating mechanism connected thereto, the upper portion of this figure being a section on line 26—26 of Fig. 27;

Fig. 27 shows the movable forward end of the flexible wrapper on an enlarged scale;

Fig. 27A shows a bottom view of the wrapper operating lever;

Fig. 27B is a detailed sectioned on line 27B—27B of Fig. 26;

Fig. 28 represents a transverse section on line 28—28 of Fig. 18 looking from right to left;

Fig. 29 is a view along section line 29—29 of Fig. 28 looking from left to right;

Fig. 30 is a sectional view lengthwise through the recording mechanism;

Fig. 31 shows a cross section on line 31—31 of Fig. 30;

Fig. 32 is a view similar to Fig. 31 showing the blank folding wrapper in closed position for recording;

Fig. 33 shows a detail of the connections that operate the wrapper;

Fig. 34 shows the rear side of the stylus carrying disk;

Fig. 34A is an enlarged end view of the stylus mounting;

Fig. 35 is an enlarged sectional view on the angular line 35—35 of Fig. 24, showing the driving connections that operate the stylus shaft and the paper feed roller of the recorder;

Figs. 36 and 37 illustrate different positions of the cam assembly that controls certain automatic operations of the recorder;

Fig. 38 shows details of the paper feed mechanism;

Fig. 39 shows certain connections operated by the cam assembly of Fig. 36;

Fig. 40 is a diagram of the transmitter circuits; and

Figs. 41 and 42 together represent the circuits of the recorder.

*General operation (Fig. 1)*

Before proceeding with a detailed description of the apparatus and circuits involved in this system, let us look at Fig. 1 to get a general idea of how the system works.

Suppose we take a city which has been divided into three districts for the expeditious delivery of telegrams under our system. Each district is covered by an automobile equipped to receive facsimile telegrams sent out by radio from the central office.

The equipment at the central office or sending station includes a facsimile transmitter 12, a radio transmitter 13, a radio receiver 14, a selector switch 15, and a two-way telephone set 16. The radio units may be located at a distance from the main office, even miles away, but we regard them as parts of the sending station apparatus.

The equipment provided on each car for communication with the sending station comprises a facsimile recorder 17, a radio receiver 18, a radio transmitter 19, a combined amplifier and selector unit 20, and a two-way telephone set consisting of a microphone 21 and a loud speaker 22. The mounting of these parts on the car will be described later.

The selector unit of each car is a band-pass filter that responds only to a certain frequency which is different for each car and is determined by the position of the selector switch 15 at the sending station. Thus, if the operator at the main office wants to send a telegram to car No. 2, he adjusts the selector switch 15 to position No. 2. The other positions of the selector switch are for cars 1 and 3, respectively. It will be understood, then, that only the particular car selected by the switch 15 will have its recorder 17 made operative to receive a transmitted message.

Suppose the attendant at the main office has a telegram to be delivered in the area served by car No. 2. He first moves the switch 15 to position No. 2 whereby the radio transmitter 13 sends out a steady tone of the particular frequency assigned to that car. Although this frequency is received by all three cars, only the selector unit of car No. 2 will respond and put this car into operative communication with the sending station.

Having selected the desired car, the attendant at the main office inserts the message in the facsimile transmitter and presses a start button, whereupon facsimile signals of the scanned message are automatically sent over the radio circuit. These signals are received by the recorder 17 of car No. 2 and automatically recorded in facsimile. The operator of the car at once drives to the address on the received telegram and delivers it.

The attendant at the main office may first talk to the car operators or messengers over the radio telephone 16 before setting the selector switch 15. This telephoned announcement will come through the loud speaker 22 of each car and may contain instructions to one or all of the car messengers. For example, the main office attendant may inform the operator of car No. 1 that a message bearing a certain address is about to be facsimiled to him. The operator of that car immediately starts for the given address and he may even get there before the telegram is completely recorded.

To give another instance of the practical advantages inherent in our system, suppose the main office receives a flood of telegrams for delivery in the district covered by car No. 1 which alone is incapable of coping with the situation. The attendant at the main office may then telephone to one or more of the other cars to proceed to district No. 1 and help out in the prompt delivery of messages.

Each car operator or messenger can get in touch with the main office by telephone whenever necessary. Such occasions may arise, for example, when the recorder is temporarily disconnected, as for replacing a worn stylus or putting in a new roll of paper. The central office attendant will then refrain from sending a message to that car until he gets the go-ahead word.

During operation of the facsimile transmitter, the telephone apparatus in our system is automatically disabled so as to make it impossible to interfere with the transmission and recording of facsimile signals. How that safeguard is brought about will be explained in due course.

The mobile units of our system operate as local telegraph offices not only for receiving telegrams from the main office but also for accepting telegraph messages from customers. Such messages will be instantly telephoned in to the main office by the car messenger. It will be seen then that speed and economy of telegram deliveries is the big achievement of our novel facsimile system.

*The facsimile transmitter at the main office (Figs. 2 to 10)*

In the broader aspect of our invention any practical design of facsimile transmitter may be used at the main office. The machine shown in Figs. 2 to 10 is especially suitable for our system and involves various features of novelty, as we shall point out. However, we would have it understood that our system as a whole is not restricted to this particular construction of facsimile transmitter.

The main supporting frame of this machine is a casting which comprises a base 23, a front post 24 and a side post 25. The base is hollow and provides a shallow chamber 26 to accommodate certain driving connections and other parts, as will appear later. The top of base 23 has a large irregular hole 23' (see Fig. 8) cut out to provide ample space for the passage of various parts into the chamber 26.

A U-shaped bracket 27 (Fig. 2) having upper and lower arms 28 and 29 is fastened to the upright 25 by screws or bolts 30, with the lower horizontal arm 29 preferably resting on the base 23. The arms 28 and 29 are in vertical alignment and constitute bearings for supporting a rotary shaft 31 which carries a transparent cylinder 32, usually made of glass or Lucite. The shaft 31 has a tapered upper end 33 (Fig. 4) on which are tightly fitted a disk 34 and a screw threaded ring 35. A screw 36 locks the assembled parts 34 and 35 to shaft 31 as a mounting for cylinder 32 which is simply screwed to the ring 35, as shown at 37. The bottom edge of the cylinder rests on the disk 34.

The upright cylinder 32 is open on top for the insertion of telegram sheets 38 which are to be optically scanned for facsimile transmission. These sheets are of standard size and each bears a black mark 38' called a phasing mark which is scanned in advance of the message to condition the connected receiver. The use of these phasing marks is a matter of common knowledge among facsimile engineers and requires no further explanation here. The inserted sheet 38 rests on the ring 35, as can be seen in Fig. 4. A small synchronous motor 39 (Fig. 2) rotates the cylinder 32 at constant scanning speed through a reduction drive comprising a worm pinion 40 on the motor shaft and a worm gear 41 on shaft 31. The motor is mounted on a plate 42 (see Fig. 8) which is fastened by screws 43 to the top of base 23.

A bracket consisting of a tall angular upright 44, a top plate 45 and a bottom plate 46 (Figs. 2 and 5) is secured to the side post 25 by screws or bolts 47. Fig. 7 shows how the angle bar 44 fits around the rear corner of the post 25. For the construction of the bracket plates 45 and 46, see Figs. 6 and 8, respectively. In some cases the bracket 44—45—46 can be cast integral with the base 23. This bracket, as we shall now describe, constitutes the main support for the optical scanning mechanism of the machine.

The bracket plates 45 and 46 support a pair of fixed vertical rods 48 and 49 and also support a rotary screw shaft 50. The relative disposition of these three vertical members is clear from the plan views of Figs. 7 and 8 where it is seen that the rod 48 and the shaft 50 are arranged side by side while the rod 49 is to the rear. The screw shaft 50, usually called the feed screw, extends through the bottom plate 46 into the base chamber 26, as shown in Figs. 2 and 4.

The cylinder shaft 31 likewise projects at its lower end into the base chamber 26 (Fig. 2) and carries a pinion 51 which meshes permanently with a large gear 52 on the feed screw 50. In this way the synchronous motor 39 which drives the cylinder shaft 31 simultaneously operates the feed screw 50 at properly reduced speed. Disposing of the gears 51 and 52 in chamber 26 permits a more compact arrangement of the parts mounted on base 23.

The function of the feed screw 50 is to move the optical scanning mechanism slowly down along the cylinder 32 during facsimile transmission. The various parts that make up the scanning mechanism are mounted on a carriage which is designated as a unit by the letters SK. The scanning carriage has a frame 53 which, as best shown in Fig. 9, is a U-shaped piece of sheet metal with a front plate 54, a short side 55 and a long side 56, both sides extending rearward. A tube or sleeve 57 is secured in the front plate 54 by screws 58 or otherwise, and this sleeve surrounds the fixed rod 48 in a smoothly sliding fit. A strap 59 (Fig. 7) secured to the side 56 of the carriage frame 53 holds the latter in slidable contact with the rear guide rod 49, which thus keeps the frame from twisting or wobbling as it slides up and down.

As shown in Figs. 4 and 7, on the slidable carriage frame 53 are mounted the usual parts required for optical scanning, namely, an exciter lamp 60, a condenser lens tube 61, a pickup lens tube 62, a photocell unit 63, a light chopper disk 64, and a small motor 65 for operating the chopper disk. The exciter lamp 60, the condenser tube 61 and the pickup tube 62 are all mounted on the side 55 of the frame 53 by means of suitable brackets 66, 67 and 68, respectively.

The photocell tube 63 is mounted on the rear end of the long side 56 of frame 53 (Figs. 4 and 7) and extends at right angles to the pickup tube 62, with the light chopper disk 64 interposed in the light path that goes to the photocell. The chopper motor 65 is secured to the front plate 54 by screws 69 (Fig. 2) which pass through holes 70 (Fig. 9) in the plate. The disk 64 requires no separate mounting for it is fixed on the shaft of motor 65.

It will not be necessary to describe extensively the operation of the optical scanning mechanism for that is well known to facsimile engineers. So we need only say that light from the lamp 60 is gathered by the condenser tube 61 and projected as a scanning spot on the sheet 38 in cylinder 32, and from there the light is reflected into the pickup tube 62 which sends it to the photocell 63. The path of the scanning beam is indicated by the dotted line 71 in Fig. 4. The light received by the photocell will vary in accordance with the tone values of the scanned sheet and these light variations are transformed by the photocell into corresponding electrical impulses. The toothed disk 64 rotates at a certain speed to interrupt the light before it reaches the photocell and thereby create a carrier current of predetermined frequency.

It is desirable to shield the scanning beam in its passage from the sheet in cylinder 32 to the photocell 63. We do that by a novel form of shield secured to the frame plate 54, as shown in Figs. 4 and 10. This shield, indicated as a whole by 72, is a piece of black sheet metal comprising a vertical front section 73, a horizontal top section 74 extending rearward, and a hood 75 projecting forward from the front section 73 toward the scanning cylinder 32. The hood 75 is riveted to a pair of wings cut out of the plate 73 and bent forward to provide a light opening 77 in the plate. The bottom of hood 75 is open for the passage of the scanning beam to the cylinder. The top 74 of the shield lies over the pickup tube 62 and extends beyond it to the photocell unit 63. The scanning beam is thus effectively shielded against stray light rays which would tend to mar the facsimile signals.

During the scanning operation the cylinder 32 is driven at predetermined high speed by the motor 39 (usually at 300 R. P. M.) while the scanning carriage SK is fed down slowly by the rotating feed screw 50 to produce a definite number of scanning lines per inch (usually 100) around the sheet in the cylinder. We mention these figures by way of example because they represent standard practice. While the cylinder shaft 31 and the feed screw 50 are permanently geared to the synchronous motor 39, the scanning carriage SK is normally disconnected from the feed screw and it is necessary to have a controllable driving connection for the carriage. This we now proceed to describe.

Referring to Figs. 4, 5, 8 and 9, there is an L-shaped bracket 78 secured to the lower edge of the carriage frame section 54 by screws 79. The horizontal arm of bracket 78 extends rearward and carries a fixed pivot pin or bolt 80 which projects downward. This pin has mounted thereon a pair of spaced ball bearings 81 and 82 between which is supported a plate 83 arranged to swing about the pin 80, as best shown in Fig. 8. The plate 83 is cut away to provide a recess for receiving a half nut 84 which is secured to the plate by screws 85 (Fig. 4). A contractile spring 86 is attached at one end to a pin 87 on plate 83 and at the other end to a suitable projection 88 on the supporting bracket 78 (Fig. 5). The function of spring 86 is to hold the half nut 84 away from the feed screw 50, as will be clear from Fig. 8.

Let us now see how the half nut 84 is actuated into mesh with the feed screw 50 and held in engagement therewith for the downward movement of the scanning carriage SK. For this description we shall refer to Figs. 2, 3, 4, 5 and 5-A. A vertical bail 89 is pivotally supported between the bracket arms 28 and 29 in any practical way. In Fig. 2 those arms carry pivot screws or pins 90 and 91 arranged to enter holes in flanges 92 and 93 on bail 89. In some cases we may use ball bearings 94, as shown in Fig. 5-A, for supporting the bail 89. The construction of this bail, which can be shaped from a piece of sheet metal, is clearly illustrated in Fig. 3. One side of the bail is bent to form an angular extension 95 which rises above the upper pivot flange 92 and is spaced laterally from the pivot axis of the bail so as to swing through an arc when the bail is operated.

As seen in Fig. 8, the extension 95 of bail 89 is in contact with the half nut mounting 83 which is constantly pressed against the bail by the spring 86. The contact edge of extension 95 is preferably rounded to reduce friction. When the bail is in normal or unoperated position, the edge 95 forms a stop to hold the half nut 84 in idle position. The bail 89 is operated by a solenoid 96 mounted on the base 23. The plunger 97 of the solenoid is connected to a link 98 through a contracting coil spring 99. The link 98 is pivoted to an arm 100 secured to the bail 89 near its lower end.

When the solenoid 96 is energized, the plunger 97 is drawn in and the bail 89 is rocked leftward (as viewed in Fig. 8) to push the half nut 84 into mesh with the feed screw 50 and hold it there, whereby the scanning carriage SK is moved down at predetermined low speed to scan the sheet in cylinder 32. The extension 95 of the bail is long enough to remain in contact with the half-nut plate 83 during the entire travel of the carriage. When the solenoid is deenergized, the spring 86 instantly restores the half nut 84 and the bail connections to their normal positions, as shown in Fig. 8. A stop 100' in the path of arm 100 limits the return movement of the parts under the action of spring 86.

Our novel mechanism for operating the half nut 84 possesses certain practical advantages not found in prior devices of that kind. Heretofore the electromagnet for operating the half nut has been mounted on the scanning carriage itself. Such an arrangement not only made the scanning carriage heavier, but required a much larger carriage. It is desirable in facsimile machines to have a scanning carriage as small and light as possible.

Referring particularly to the coil spring 99 in the connections between the solenoid 96 and the bail 89, we would point out that this spring constitutes a resilient link which absorbs any vibratory movements of the half nut 89 and the solenoid plunger 97. Vibrations of the half nut when in engagement with the feed screw 50 would be caused by slight variations in the threads of the screw, and vibrations of the plunger occur when the solenoid is energized (as in this case) by alternating current.

Now, it will be seen that if an entirely solid connection were used between the plunger 97 and the half nut 84, the plunger vibrations would affect the driving contact of the nut with the feed screw. Reversely, if the vibrations of the half nut were communicated to the solenoid plunger, the latter would be disturbed in its fully operated position and the solenoid would start to hum or sing, as the engineers call it. All these objections are entirely overcome by the resilient link 99 which we have shown as a contractile coil spring but which may take other practical forms.

Figure 6:
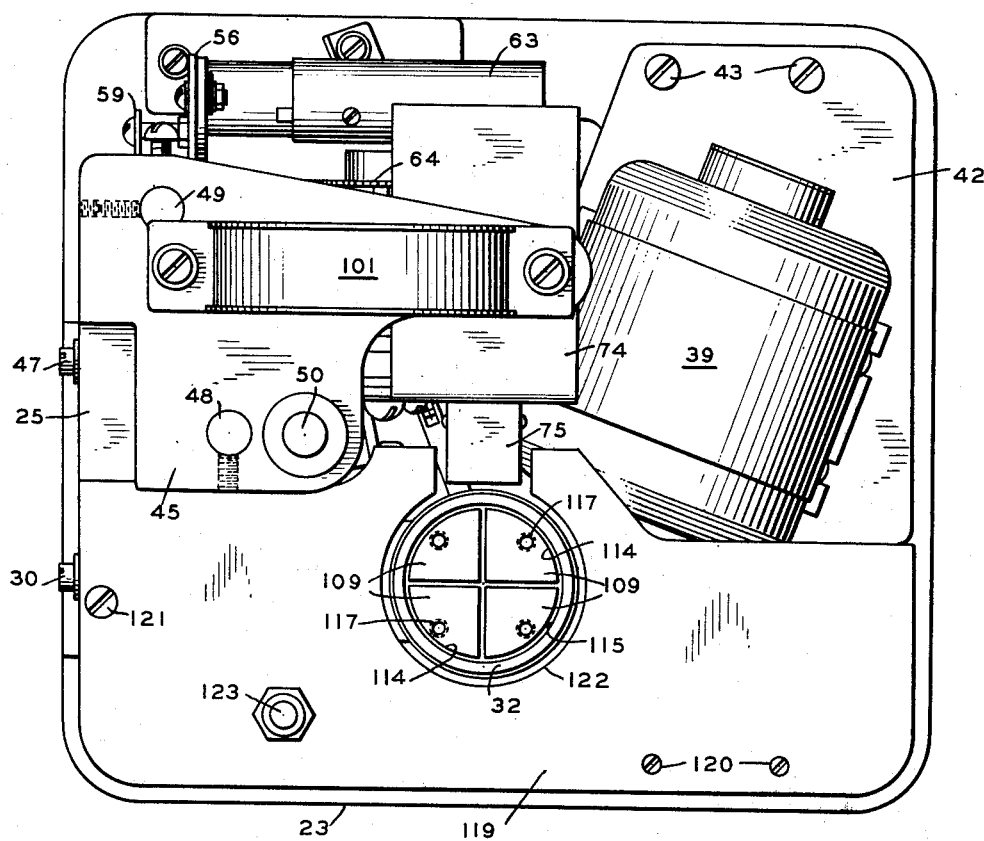
Fig. 6 is a top view of the transmitter.

The release of the half nut 84 from the feed screw 50 occurs automatically when the carriage is at the end of its downward travel, as will be fully explained later on. The released carriage is instantly pulled up to its initial or starting position by a spring drum 101 mounted on the top plate 45 by screws 102 (Figs. 5 and 6). We need not show or describe any details of this spring drum construction for it is a well-known retractile device. It is enough to say that inside the drum is a coil spring to which the scanning carriage is connected and which is wound up as the carriage moves down. The outer end of the spring in the drum passes through a hole in the top plate 45 and terminates in a loop 103 (Figs. 4 and 5) which fastens to a hook 104 on the carriage frame 53. The hook 104 is clearly shown in Fig. 9. To absorb the shock and noise of the returning carriage we put a bumper ring 105 of felt or rubber on the upper end of rod 48, so that the sleeve 57 strikes the bumper when the carriage is back to its starting point.

When the scanning carriage SK reaches the end of its downward travel, it opens a switch 106 mounted on the upright 44, as shown in Fig. 5. The switch 106 has an operating arm 107 arranged in the path of a depending strip 108 on the scanning carriage. The strip 108 is adjustably mounted on the side piece 56 of the carriage frame 53, as seen in Fig. 9. The normal distance between the lower end of strip 108 and the switch arm 107 is so calculated that the strip will strike the switch arm at the end of each scanning cycle. This automatic operation of switch 106 releases the solenoid 97 (as will be explained in describing the transmitter circuits of Fig. 40), and the scanning carriage SK is disconnected from the feed screw 50, whereupon the spring drum 101 lifts the carriage to starting position.

As we mentioned before, the cylinder 32 is rotated rapidly for scanning. It is necessary that during this operation the inserted sheet 38 be held firmly and evenly against the inner cylinder wall. This is accomplished in the present machine by cylindrical sectors 109 loosely mounted in cylinder 32, as shown in Figs. 4 and 6. These sectors or tumblers, as the engineers call them, are heavy pieces, usually of brass, resting on the base ring 35 of the cylinder. A pin 110 projecting from the bottom of each tumbler, enters a hole 112 in ring 35 in a loose fit so that the tumblers are free to move radially against and away from the inner wall of the cylinder. To make room for the head of screw 36 the tumblers are cut away at 113, as indicated in Fig. 4.

The combined outer periphery of the assembled tumblers 109 forms a cylindrical surface 114 which is substantially complete and concentric with the adjacent wall of cylinder 32 as will be clear from Fig. 6. It is easy to insert a sheet into the annular space 115 between the tumblers and the cylinder, especially if the top edge of the tumblers is rounded off as shown at 116 in Fig. 2. Upon rotation of cylinder 32 the tumblers move radially outward by centrifugal force and press against the sheet all around, holding it securely and evenly to the inner wall of the cylinder. When the cylinder stops, the loose tumblers permit easy removal of the scanned sheet which preferably projects a little above the cylinder to afford a finger grip.

The tumblers 109 are put into the cylinder 32 separately and can be taken out one at a time. To facilitate the insertion and removal of the tumblers, we provide each with a screw hole 117 on top to receive a screw or other suitable implement 118 adapted to form a finger piece (Fig. 2). By means of this temporary handle it is easy to lift out a tumbler as well as to adjust an inserted tumbler until the pin 110 drops into one of the holes 112. This added handle feature is the only new element we claim in connection with the centrifugal tumblers 109, which are a part of the invention set forth in the pending application of Wise, Parrott and Ridings, Serial No. 650,074, filed February 25, 1946.

A panel 119 is fixed on top of the posts 24 and 25 by screws 120 and 121, as shown in Figs. 2 and 6. This panel is preferably a piece of insulating material, like Bakelite, and forms a decorative plate surrounding the scanning cylinder 32 which projects through a circular opening 122 in the panel. It is convenient to mount a push button or other form of switch 123 on the panel 119 for starting the transmitter. What happens when the push button 123 is operated will be fully explained in the description of the transmitter circuits in Fig. 40.

In the complete machine we use a cover for concealing the inside mechanism leaving only the scanning cylinder 32 and the front panel 119 exposed. This will be understood without additional illustration.

*Mobile facsimile receiving station (Fig. 11)*

As we mentioned previously in the forepart of this specification, each motor car of our facsimile system constitutes a telegraph office on wheels comprising a radio receiver, a radio transmitter and a facsimile recorder. The two radio units are standard pieces of apparatus that require no description or illustration. Nor is it necessary to show the arrangement and mounting of the radio units in the car for they can be placed in any convenient space, such as the rear compartment of the car.

The facsimile recorder 17 is mounted on the footboard of a car under the instrument panel to the right of the steering post, as illustrated in Fig. 11. For the proper mounting of the recorder we have devised a novel form of support which holds the machine in horizontal position, yet allows it to be tilted forward for ready access to the interior. It will be observed that the recorder is set sufficiently back on the footboard so as not to interfere with the use of the seat next to the driver nor with getting into and out of the car by the right-hand door. The construction of this support will be described under the next heading.

The telephone transmitter or microphone 21 rests on a cradle 124 at the top of the instrument board where the driver can easily reach it when he wants to talk to the main office. However, as we said before, the microphone remains automatically disconnected from the radio transmitter 19 of the car during the operation of the recorder 17. The telephone receiver 22 is in the form of a loud speaker which is mounted behind a grill 125 in the center of the instrument board. When the operator at the main office calls up this car, the driver need not actually be in his seat if the car is parked, for the loud speaker will attract his attention if he is anywhere near the car.

A radio control box 126 is secured to the bottom of the instrument board to regulate the volume and the noise cut-out of the two radio units by means of knobs 127 and 128. This device is a well known standard article available in the market and requires no description or illustration.

When the power for the facsimile apparatus is on, a light shines through a large colored jewel 129 mounted in a box 130 below the instrument board. As long as this jewel is lighted (say, a bright orange), the operator knows that the power is on, and this light will therefore remind him to turn the power off before he leaves the car at night. We prefer to locate the power switch where it is only accessible to the driver so that it cannot be operated by an unauthorized person.

With the power switch on, the recorder takes care of itself. When the recording of an incoming telegram is finished, it is automatically discharged into a transparent delivery chute 131 projecting from the cover 132 of the machine. In other words, as fast as the transmitting messages are facsimiled, they appear in the chute 131 where the car messenger can see them for removal and delivery.

The recorder 17 is of a type which employs a continuous supply roll of card-like recording paper which is automatically fed to the recording mechanism. In the cover 132 of the machine, there is a small jewel 133 (usually red) which lights when the supply of paper is down to a predetermined point of exhaustion, as we shall explain later on. Upon seeing this warning signal, the operator of the car will call up the main office when the recorder is not working to tell the attendant there that the machine of this car will be temporarily disconnected for the insertion of a new supply roll. When the machine is back in service again, the car operator telephones that fact to the main office.

*Mounting of recorder 17 in the car (Figs. 12 to 17)*

On the sloping footboard 134 of the car is a plate 135 secured by bolts 136. The plate 135 carries a pair of upstanding ears or lugs 137 at the front or lower end and a second pair of lugs 138 at the rear end. A convenient way to form these lugs in pairs is to make each pair integral with a bar 139 and 140, respectively, these bars being riveted or welded to plate 135. As seen in Fig. 12, the front lugs 137 are much closer together than the rear lugs 138. The reason for this arrangement of the lugs will presently appear.

A rectangular metal plate or platform 141, preferably strengthened by a peripheral flange 142, has suitably secured to its underside a bar 143 which extends crosswise and terminates in a pair of lugs 144 arranged in line with the lugs 138 on plate 135. The two pair of aligned lugs 138 and 144 are perforated to receive a pivot rod 145. That is to say, the lugs 138 support the rod 145 and the platform 141 is hinged along its rear end to the rod 145 by means of the lugs 144.

Referring to Fig. 12, a short bar 146 is attached to the underside of the platform 141. This bar terminates in a pair of depending lugs 147 perforated to receive a pivot rod 148 to which is hinged a depending frame 149. The sides of this frame are turned forward to form flanges 150 through which the pivot rod 148 passes. At a certain distance from its hinged end the frame 149 carries a transverse rod 151. A second frame 152 is connected to rod 151 by means of lateral flanges 153 through which the rod passes, with the frame 152 lying inside the upper frame 149, as shown in Fig. 16. The lower end of frame 152 is pivoted on a rod 154 carried by the lugs 137 of the base plate 135.

We have, then, two overlapping frames 149 and 152 pivotally connected together by the cross rod 151, with the upper frame 149 hinged to the platform 141 and the lower frame 152 hinged to the sloping footboard of the car. The extent of overlap of these two frames can best be seen in Fig. 17. When the two frames extend upward in alignment at approximately right angles of the slope of the footboard, the platform 141 is in horizontal position, as shown in Fig. 14. To maintain the platform horizontal, it is necessary to lock the frames together in any practical way. We use a locking connection that can easily be released when necessary. Although this connection is not by itself a part of our invention, we have shown it in detail by way of example.

Referring to Figs. 16 and 17, the rear frame 149 has mounted on its back a stiff wire 155 which is fixed at its ends to a pair of studs 156 arranged in slanting alignment so that the wire extends across the center of the frame. The front or lower frame 152 carries a rotary barrel 157 which projects through a slot 158 in frame 149 and is locked against axial movement. A thumb piece 159 permits manual turning of the barrel 157 in either direction. The rear end of the barrel has an open cam slot 160 adapted to fit the wire 155. This slot curves in opposite directions from the diametric opening 161 in the end of the barrel 157.

When the wire 155 is in line with the end opening 161, the wire and the barrel 157 are free to separate so that the frames 149 and 151 are not locked together. Upon turning the barrel, the wire is drawn into the cam slot 160 where it is held locked, as will be clear from Fig. 17B. The fastening wire 155 is coiled at its ends to act as a resilient locking bar when drawn into the cam slot 160 so that the parts 155 and 157 are held tightly together against accidental loosening. A mere twist of the thumb piece 159 brings the end opening 161 of the barrel into line with the wire 155, whereupon the frames 149 and 152 automatically collapse, as shown in Fig. 15.

The recorder 17 is mounted as a unit on the platform 141 in any practical way, as by means of four corner bolts 162 (Figs. 12 and 13) which extend from the base of the recorder through the platform. We prefer to interpose washers 163 of felt, rubber, or the like, to cushion the machine against the vibrations of the car. Owing to the heavy weight of the machine, we usually insert a center rib 164 between the machine and the platform 141.

The reason why the platform 141 is supported so it can be dropped forward as shown in Fig. 15 will be clear from Fig. 11. The space in which the recorder is located is so restricted that there is not sufficient room to lift the cover off the machine in its normal horizontal position. Now, when the machine is dropped forward, the cover can be taken off for inspection of the interior mechanism. This would be necessary, for instance, when the operator has to change the stylus or insert a fresh roll of paper or make any required adjustments. Let it be noticed in Fig. 15 that the dropped platform has not touched the floor but leaves a space of safety, so there is no danger of the operator accidentally getting his hand or foot injured.

*The facsimile recorder (Figs. 18 to 39)*

Since a detailed description of this machine will necessarily be of considerable length, this specification will be easier to follow and to understand if we divide our description of the recorder into an orderly series of headings for the various devices and mechanisms that make up this machine.

THE WRAPPER MECHANISM

The automatic recorders we use at present in the mobile receiving stations of our system have the recording paper supplied from a continuous roll. A measured length of this paper, which is of card-like stiffness, is automatically coiled into a perfect cylindrical shape for inside recording by a stylus. The means for thus shaping and supporting the paper in recording position is called the wrapper mechanism which we shall describe first:

Looking at Fig. 18 which shows a front view of the recorder, there are two upright frames 165 and 166 rising from the base 167, which is a hollow casting with a chamber 167' to house various parts of the machine. The frames 165 and 166 are not of like construction so we shall distinguish them as the right frame 165 and the left frame 166. Each frame has a pair of lateral flanges 168 at the bottom (Figs. 24 and 28) for receiving bolts or screws 169 which fasten into the base. We usually bolt a brace rod 170 (Fig. 20) to the frames to increase their rigidity as a unitary support.

Referring to Fig. 30, a rod 171 is fastened in the frames 165—166 and this rod has mounted thereon a thin flexible sheet 172 which constitutes the wrapper element of the wrapper mechanism. Fig. 21 shows the form of this sheet as laid out flat. At the present time, we prefer to make the wrapper 172 of Phosphor bronze so thin as to be easily flexible and we have found it desirable to increase the flexibility by removing a central section of the sheet, as indicated at 173. The metal wrapper 172 is thus in the form of a rectangular frame with a front strip 174 connecting the sides 174' and a rear edge 175 folded around the supporting rod 171. The folded edges of the sheet may be welded or soldered together.

As shown in Fig. 30, the frames 165 and 166 have aligned openings into which are fitted two cylindrical flanges 176 and 177, respectively. These flanges are formed with integral annular heads 176' and 177', respectively, which are fastened to the frames by screws 178 (Figs. 24 and 28). The cylindrical flanges 176 and 177 extend toward each other into the space 179 which may properly be called the recording chamber for it is here that the recording takes place. It should be observed that the sides 174' of the wrapper 172 overlie the flanges 176 and 177.

The function of the wrapper 172 is to receive a recording blank 180 and wrap it around the flanges 176 and 177 which shape the blank into a cylindrical form and support it in that position as long as the wrapper remains closed. The blank 180 is a measured length of paper from the end of a continuous strip 181 fed from a supply roll 182 (Fig. 29) which is mounted on top of the frames 165 and 166. How this definite length of paper is fed into the open wrapper 172 will be explained in our description of the paper feed mechanism under a separate heading. At the moment we need only say that the paper strip 181 is guided by a hinged flap 183 (Fig. 31) through the narrow space between the hinged end of wrapper 172 and the pair of cylindrical flanges 176—177. The guide flap 183 is mounted on a rod 184 supported by the frames 165—166.

Upon entering the wrapper, the paper automatically coils around the shaping flanges 176—177 and then moves forward over the inner surface of the open wrapper until the required length of paper has been fed into the wrapper, as illustrated in Fig. 31. The flexible wrapper 172 is now ready to close and wrap the enclosed recording blank completely over the flanges 176—177 to shape the blank into a perfect cylindrical form, as shown in Fig. 32. The mechanism for operating the wrapper 172 from open to closed position will be described under the next heading.

THE WRAPPER OPERATING MECHANISM

In the description of the wrapper operating mechanism we shall refer particularly to Figs. 24, 26, 27, 27A, 29, 31 and 32.

The wrapper 172 is provided at its free or front end with a tip 185 which is a rectangular piece of sheet metal tapering off toward the front edge and having a rear extension 186. The wedge-shaped tip 185 extends entirely across the flexible wrapper 172 and is secured thereto preferably by soldering over its entire surface so that the tip is in effect an integral part of the wrapper. The front edge of the tip 185 terminates at the front edge of the wrapper and the rear extension 186 is bent away from the wrapper for a purpose that will presently be explained.

As best shown in Fig. 27, the soldered surface of tip 185 is curved and thereby holds the end portion of the wrapper 172 at the same curvature, which corresponds precisely to the curvature of the cylindrical flanges 176 and 177. Therefore, when the flexible wrapper is closed (Fig. 32) the curved tip of the wrapper holds the end of the paper blank 180 in firm contact with the shaping flanges 176—177, whereby the blank is made into a perfect cylinder. The thinned edge of the tip 185 makes it sufficiently flexible to hold the paper against the flanges 176—177 with a spring pressure contact, thereby assuring a perfect cylindrical shape for the end portion of the paper blank.

To make certain that the forward end of the blank will follow the curvature of the open wrapper during the paper feed operation, we provide the wrapper 172 with a pair of guide lugs 187 which are U-shaped pieces soldered to the underside of the wrapper a short distance away from the curved tip 185. These lugs are slightly spaced from the top surface of the wrapper to receive the side edges of the blank. The cylindrical flanges 176 and 177 have each an opening 187' to accommodate the guide lugs 187 so that the paper lies in contact with the flanges all around it. This will be understood from Fig. 32.

The wrapper sheet 172 is so thin that it would be impossible to attach an actuating connection directly to it, so we utilize the rigid tip 185 as a reinforcing piece to which our novel wrapper operating mechanism is connected. Referring especially to Figs. 26, 27A and 31, a lever 188 in the form of a rectangular casting has a rear mounting block 189 and a front cross bar 190. The block 189 is split and has a hole to receive a rock shaft 191 journaled in the upright frames 165 and 166 (Fig. 30). A set screw 192 clamps the lever 188 to the shaft 191 so that these two parts move together. Collars 193 fixed on rock shaft 191 adjacent to the supporting frames 165 and 166 hold this shaft against axial displacement.

The front cross bar 190 of lever 188 has a pair of spaced lugs 194 which carry a pulley 195 on a pin 196. The lever 188 is connected to the wrapper tip 185 by means of two divergent arms 197. The lower ends of these arms are set in holes 198 in the cross bar 190 and secured by screws 199 (Fig. 27B). The upper ends 197' of the wrapper 197 are pivotally connected to ears 200 on the wrapper tip 185 and those pivot ends act as trunnions on which the tip can turn. The ears 200 are shown as right-angled lugs secured to the ends of tip 185 by rivets 201. It will be apparent that the arms 197 constitute a rigid right-angled extension of lever 188.

It is clear from a study of Figs. 31 and 32 that as the lever 188 is swung upward through the required angle it pushes the front end of the wrapper 172 upward and closes the wrapper around the cylindrical flanges 176—177. This movement of the lever 188 is brought about by the following mechanical combination.

An arm 202 (Fig. 24) is pivoted at one end on a stud 203 projecting from the upright frame 166 and the free end of this arm is pivoted to the upper end of a link 204 by a pin 205. The lower end of link 204 has a slot 206 (Fig. 33) for receiving a pin 207 carried by a short lever 208 which is rigidly clamped to the rock shaft 191 by a screw 209 passing through a forked extension 210 of the lever. The pin 207 is always held at the top of slot 206 by a contractile spring 211 which is attached at one end to the link 204 (Fig. 24) and at the other end to a pin 211' on the lever 208 (Fig. 33). This arrangement allows the link 204 to swing as the pin 207 moves through an arc.

A strong coil spring 212 (Fig. 24) is attached at its upper end to the link 204 near the top end thereof and the other end of the spring is fastened to a fixed part of the machine, such as a lug 213. The spring 212 always tends to pull the link 204 down and this action of the spring is controlled or timed by the arm 202 which in turn is under the control of a motor driven cam assembly. The construction of this cam assembly will be described under the next heading.

When the wrapper 172 is open (Fig. 31) the operating connections for the wrapper are in the position illustrated in Fig. 24 where the arm 202 is held in its highest position. Let us assume that at a given moment the arm 202 is released for downward movement through a definite angle. Instantly the tension of spring 212 asserts itself and pulls the link 204 down, rocking the lever 208 and the shaft 191 through an arc calculated to swing the lever 188 into the wrapper closing position, as shown in Fig. 32.

When the closed wrapper is to be opened, the arm 202 is automatically lifted back and the link 204 is pulled up against the action of spring 212. This upward movement of link 204 causes the spring 211 to rock the shaft 191 clockwise whereby the lever 188 is swung down to the position shown in Fig. 31 to open the wrapper 172. An adjustable stop 214 limits the downward movement of the lever 188 and thereby determines the open position of the wrapper. As will appear later, the opening of wrapper 172 is one of a series of automatic operations that take place at the end of each scanning cycle.

Referring to Figs. 24 and 33, we utilize the timed movements of rock shaft 191 to control a switch 215 which is mounted on a bracket 216 carried by the upright frame 166. The switch 215 may be of any suitable type, such as a microswitch, so we need not show or describe any structural features of this well-known device. It is enough to say that a button or lever 215' projects from the casing of the switch for operating the same. The projection 215' is always under spring pressure which tends to push it out. Because the switch 215 is instrumental in controlling the wrapper mechanism, we shall call it the wrapper switch.

The operation of switch 215 is controlled by a cam 217 (Fig. 33) fixed on the rock shaft 191. The periphery of this cam has a depression or recess 218 which extends over a definite arc. The cam 217 operates a follower 219 pivoted at 219' to the frame 166. The free end of the follower 219 extends between the switch 215 and the cam 217 and is provided with a rounded tooth 220 which rides over the cam periphery. As long as the tooth 220 engages the high edge of cam 217, the follower 219 keeps the switch button 215' pushed in to hold the switch open. When the rock shaft 191 and the cam 217 are rotated leftwise (as viewed in Fig. 33) by the spring 212 during the wrapper closing operation, the tooth 220 rides in the recess 218 and allows the switch button 215' to move outward and close the switch. What happens when the wrapper switch is closed will now be described.

In the final closing movement of the wrapper 172, it is necessary to give a separate adjustment to the tip 185 about the trunnions 197' (Fig. 32) in addition to the actuation of the tip by the lever 188. For this purpose, we attach a cord 221 to the tongue or extension 186 of the tip 185 and this cord is arranged as shown in Fig. 29.

From the extension 186 the cord 221 passes around the pulley 195 on lever 188, then rearward over a pulley 222 on a fixed upright plate 223, then down through the top of base 167 to a pulley 224, which is also mounted on plate 223. The cord now goes rearward around a pulley 225 on the plunger 226 of a solenoid 227 secured to the underside of the base. From here the cord 221 runs forward around a stud or roller 228 on a bracket 229, then upward through a hole in the base 167, then forward over the top of the base to a clamping screw 230. The end 221' of the cord is left free to serve as a finger grip for adjusting the cord before clamping it tight under the screw 230.

As shown in Fig. 20, the bracket 229 is an angular piece attached to the underside of base 167 by screws 231 and the vertical plate 223 is secured to the bracket as an extension thereof. The bracket 229 also carries a bar or narrow plate 232 which is attached by screws 233 to the bottom of the bracket. The plate 232 terminates in an upstanding lug 234 which is bifurcated to let the cord pass through. The lug 234 is in line with the pulley 225 on the solenoid plunger 226, whereby this lug forms a stop for the outward or return movement of the plunger. To make the solenoid stop 234 adjustable toward and from the plunger 226, the plate 232 is provided with longitudinal slots (not shown) for the screws 233. We usually provide the pulleys with suitable cord retainers to prevent the cord from jumping the pulleys. Such devices are well known and we need not show them.

It is clear from Figs. 29 and 31 that when the solenoid 227 is energized and pulls in its plunger 226 the upper end of cord 221 is pulled down and the wrapper tip 185 is rocked about the trunnions 197' of arms 197. The solenoid 227 is energized when the switch 215 is closed, so that the two movements of the wrapper tip 185 by the lever 188 and by the cord 221 take place simultaneously upon operation of the rock shaft 191 as previously described.

As can be seen by comparing Figs. 31 and 32, the extension 186 on the wrapper tip 185 acts as a lever to rock the tip on the trunnions 197' when the cord is pulled down until the extension is in line with the taut cord upon the complete closing of the wrapper. We use the term "cord" for the element 221 in its broadest possible sense to include any flexible connection suitable for the purpose. We have found an ordinary fish line to be wholly satisfactory.

*The cam assembly and driving connections (Figs. 35–37)*

The power shaft of the machine is shown at 235 and is journaled in the two upright plates 165 and 166. The right-hand section of the power shaft (Fig. 18) is screw-threaded for the required length and constitutes a feed screw 236 for operating the carriage of the recording mechanism, as will be explained in due course. The left end of the shaft projects beyond the frame 166 and has a gear 237 fixed thereon by a set screw 238 or otherwise. The gear 237 is in permanent mesh with a pinion 239 on the shaft 240 of a motor 241 mounted between the plates 165—166. It is convenient to bolt the motor 241 to the left frame 166 by means of studs 242 (Fig. 20).

We have, then, as seen in Fig. 35, a permanent drive between the motor 241 and the power shaft 235, which keeps running as long as the motor is energized. However, there are other driving connections which are operated from the power shaft only at certain predetermined intervals controlled by a cam assembly CS loosely mounted as a unit on the shaft 235.

The control unit CS consists of three cams 243, 244 and 245, and a gear 246. These four parts are joined together face to face by screws 247 and always operate as one piece. A sleeve or bushing 248 extends through the cam assembly in a tight fit for mounting the same rotatably on the power shaft 235. The three cams 243, 244 and 245 are each of special configuration so as to carry out their intended functions. To distinguish these cams from each other we shall designate them as follows: The stop cam 243 which controls the starting and stopping of the unit CS; the paper feed cam 244 which controls the paper feed mechanism; and the wrapper cam 245 which controls the mechanism for the opening and closing of the wrapper 172.

In addition to what we have already said about the operation of the wrapper mechanism, we need only point out that the cam 245 actuates the arm or follower 202 which is always held against the cam by the operating spring 212 (Fig. 24). Looking at the bottom portion of Fig. 36 we see that the tooth 249 of the follower 202 is on the high edge 245a of cam 245, whereby the follower is held in its raised position and the wrapper 172 is open. When the tooth 249 encounters the low edge 245b of cam 245, the follower 202 is pulled down by the spring 212 and the wrapper is closed.

The stop cam 243 has its circular periphery 243a interrupted by two radial shoulders or stops 250 and 251 which are spaced circumferentially by a definite arc. The cam 243 has a follower 252 formed with a shoulder 253 arranged to interlock with the cam stops 250 and 251. The follower 252 is pivoted on the stud 203 by means of a slot 254 which allows the follower to be shifted lengthwise a small amount for a purpose we shall presently explain. It should be noted here that the stud 203 also supports the follower 202 of the wrapper cam 245. A spacing nut 255 on the stud 203 holds the followers 202 and 252 in proper alignment, as shown in Figs. 18 and 20.

It is clear from Figs. 36 and 37 that, when the follower 252 is locked to either one of the stops or shoulders 250 and 251, the cam assembly CS as a whole is held stationary on the rotating power shaft 235. Only when the follower 252 is disengaged from the stops 250 and 251 is the cam assembly released for operation by the power shaft through a friction clutch indicated as a whole by 256.

The clutch 256 may be of any practical construction and in the present instance it consists of a pair of felt disks 257 arranged in contact with the opposite sides of the cam assembly CS, a pressure disk 258 bearing against one of the felt disks, an adjusting nut 259 screwed on the outer end of the power shaft 235, and a spider spring 260 arranged between the elements 258 and 259. A nut 261 holds all the parts to the left of gear 237 locked on the power shaft. The pressure disk 258, which is slidable on the shaft 235, is connected to the nut 259 by pins 262 which slide in holes 263 in the nut. For easy manual adjustment the nut 259 is made as a large disk with a knurled edge. Adjustment of this nut varies the pressure of spring 260 against the disk 258 which transmits the pressure to the felt disks 257. In this way the cam assembly CS is frictionally mounted on the power shaft 235.

The gear 246 which forms part of the cam assembly CS is in permanent mesh with a pinion 264 fixed on the end of a shaft 265 which is journaled in the upright frames 165 and 166. The shaft 265 carries a roll or cylinder 266 which is a part of the paper feed mechanism to be described later.

It is clear from what we have said that the cam assembly CS is held locked on the power shaft 235 in either one of two angular positions as determined by the stop shoulders 250 and 251 on the cam 243. Therefore the control of the cam assembly for releasing or stopping the cam 243 depends essentially on the control of the cam follower 252. The mechanism for effectuating that control forms the subject of our next heading.

Control mechanism for the cam assembly CS

In the description of this mechanism we can confine our attention to Figs. 20 and 39.

A solenoid 267 is mounted in vertical position on the base 167 of the machine by means of a suitable bracket 268. The mounting frame of the solenoid carries a bracket 269 which terminates on top in a lateral arm 270 for supporting the plunger 271 of the solenoid through an interposed coil spring 272. This spring always exerts an upward pull on the plunger and keeps it in normal raised position.

A latch 273 is pivoted on the bracket 269 by a stud 274. The outer end of latch 273 is slotted to receive a pin 275 on the plunger 271, whereby the vertical movements of the plunger rock the latch about its pivot. A stop 276 on bracket 269 holds the latch and the plunger in normal position against the action of spring 272. The inner end of latch 273 projects beneath the free end of a long horizontal lever 277 which is pivoted on a stud 278 carried by the frame 165. A plate 279 fixed on the frame 166 has a vertical slot 280 for receiving the outer end of lever 277 whereby the latter is guided in its movements. The lever 277, which we call the clutch release lever, normally rests on the bottom of the slot 280.

The function of lever 277 is to lift the follower 252 out of engagement with the stop shoulders 250 and 251 of cam 243. For this purpose the lever 277 has a slot 281 near its free end for receiving the lower beveled end 282 of the cam follower 252. A spring 283 is attached at its front end to the lower end of the follower 252 at the point 284 and the rear end of the spring goes to a fixed stud 285 on the frame 166. The arrangement of spring 283 is such that it is higher at its rear end so that it always tends to rock the follower downward about the pivot 203 and at the same time slide it upward lengthwise as far as the pivot slot 254 will allow.

It will be seen that the contractile spring 283 always holds the cam follower 252 in contact with the operating lever 277 by pressing the beveled end 282 of the follower against the bottom of slot 281. When the solenoid 267 is energized, the descending plunger 271 rocks the free end of latch 273 upward against the lever 277 which is thereby thrown up and lifts the follower 252 out of engagement with the stop 250 on cam 243. The moment this stop cam is thus released, the cam assembly CS is driven by the power shaft 235 through the friction clutch 256.

It should be explained here that the solenoid 267 is energized only for a moment, so that the follower 252 is lifted off the cam 243 only for that brief interval. Since the action of restoring spring 283 is very quick and since the cam assembly rotates at a comparatively low speed, we have to guard against the possibility of the shoulder 253 of the returning follower 252 re-engaging the cam stop 250 before the latter has moved out of the way. We accomplish this by causing the spring 283 to slide the follower 252 upward at the very instant when it is lifted off the cam stop 250. This sliding movement, which is permitted by the slot 254, places the shoulder 253 of the returning follower behind the cam stop 250 so that the cam 243 is free to turn until the shoulder 253 encounters the next stop 251 (Fig. 37).

The release of the follower 252 from the shoulder 250 of cam 243 occurs upon the energizing of solenoid 267 at the beginning of a recording cycle to effect the closing of wrapper 172. When thus released the cam assembly CS turns from the position shown in Fig. 36 to that shown in Fig. 37 where the follower 252 again stops the cam assembly by engaging the other shoulder 251. As will appear later when we describe the automatic circuit controls, the cam assembly CS stays locked in the position shown in Fig. 37 during a recording operation.

To effect the automatic opening of the wrapper 172 after a recording operation, it is necessary to release the cam assembly for movement from the position shown in Fig. 37 back to its normal position in Fig. 36. This is accomplished by releasing the follower 252 from the cam shoulder 251 by mechanical connections independently of the solenoid 267.

The recording mechanism, which we shall describe under the next heading, is mounted on a slidable carriage K which moves slowly forward from right to left (Fig. 18) during a recording operation, or from left to right when looking at the rear of the machine as in Fig. 20. At its forward end the carriage K has an upstanding trigger 285 pivoted on a stud 286. A coil spring 287 attached to the bottom of the trigger normally holds the latter upright against a stop 288. The trigger 285 has a sloping top 285' which extends in front of a pin 289 on the clutch release lever 277.

When the trigger 285 encounters the pin 289 during the forward movement of carriage K, the lever 277 is not affected since the trigger simply rocks backward and passes under the pin. However, during the return movement of carriage K after a recording operation (from right to left in Fig. 20) the trigger 285 remains rigid and the sloping top 285' lifts the lever 277 with the result that the follower 252 is disengaged from the stop shoulder 251 of cam 243.

We should remember, then, that the clutch release lever 277 is operated at two different intervals by two different means. First, it is operated by the start solenoid 267 at the beginning of a recording cycle to release the follower 252 from the stop 250 of cam 243. This effects the closing of wrapper 172, as fully explained before. Second, the lever 277 is operated at the close of a recording cycle to release the follower 252 from the stop 251 of cam 243. This allows the cam assembly CS to rotate until the follower 252 again engages the cam stop 251. During this interval, not only is the wrapper 172 opened, as already mentioned, but other operations take place in automatic sequence, as will be explained in due course.

The recording mechanism

We have seen how the flexible wrapper 172 supports a recording blank in cylindrical form for recording on the inner unobstructed surface of the blank. This recording is done by an electric stylus which comprises an arm or holder 290 (Figs. 31 and 32) pivotally mounted on an insulating disk 291 by means of a stud 292. The stylus arm 290 is a right-angled strip of suitable spring metal, such as Phosphor bronze, which carries a short piece of steel wire 293 at its free end. The wire 293, which forms the recording point, is attached by pinching the end of the flat strip 290 around it to form a channel 290' (Fig. 34A) in which the wire is seated, then filling the channel with solder 293a. For convenience we shall refer to the holder 290 and the wire tip 293 together as the stylus 290.

The stylus 290 is mounted in such a way on stud 292 that it can be easily removed therefrom or mounted thereon, as when replacing a worn stylus with a new one. For this purpose we provide the stylus arm at the bend with a metal sleeve or bushing 294 which fits over the stud 292 so as to be easily slipped on and off. The bushing 294 can be attached to the stylus arm by solder since the two parts have considerable contact area.

One end of a light coil spring 295 is detachably hooked over the tail piece 296 of stylus 290 and the other end of this spring is fastened to a stud 297 on the supporting disk 291. When a new stylus is to be inserted, the operator simply pulls the old one off the stud 292, unhooks the spring 295, slips a new stylus in place, and hooks it up with the spring. It is the work of only a few moments. As seen in Fig. 30, the stylus 290 is spaced laterally from the disk 291 a sufficient distance to clear the adjacent cylindrical flange 176 when the parts are in normal position.

A conducting strip 298 is fastened at its ends to the studs 292 and 297 so as to lie flat against the disk 291. An insulated conductor 299 passing through the center of disk 291 is soldered to the strip 298, whereby the stylus 290 is permanently connected to this conductor. The insulated disk 291 carries a lever 300 which is pivoted on a pin 301 in a slotted block 302 mounted on the rear side of the disk by screws 303 (Fig. 34). The lever 300 projects through a hole 304 in the disk 291 and the front end of the lever engages the stylus arm 290 on top.

When the stylus arm 290 is in normal or standstill position, as shown in Fig. 30 (that is, before the start of a recording operation) the rear end of lever 300 engages a stationary ring 305 which rocks the front of the lever downward. This forces the stylus 290 toward the center of disk 291 against the tension of spring 295, so that now the recording point 293 does not touch the paper. In other words, the lever 300 acts as a retractor for the stylus. When the disk 291 starts moving toward the left (as viewed in Fig. 30) the retractor 300 leaves the stop ring 305 and the stylus 290 is instantly rocked outwardly by the spring 295 into contact with the paper. The ring 305 can be attached to frame 165 by the same screws 178 that fasten the adjacent flange 176 in place, as shown in Fig. 28.

The insulating disk 291, which carries the stylus assembly and may therefore be called a stylus head, is fixed on the end of a shaft 306 by means of a collar 307 to which the disk is suitably secured, as shown in Fig. 30. In this case, the shaft 306 is hollow to receive the insulated conductor 299 which is connected to the stylus 290. The shaft 306, which will be called the stylus shaft, is mounted on the slidable carriage already identified as a whole by K. This carriage comprises a frame or casting with a long side plate 308 and a pair of spaced transverse plates 309 and 310 in which the stylus shaft 306 is mounted, as can be seen in Figs. 18 and 22. The rear portion of plate 309 is considerably higher than the front portion (Figs. 18 and 25) to form an extension 309' for a purpose that will presently appear.

The carriage K is slidably supported on a pair of rails 311 and 312, mounted on the base 167 of the machine in any practical way. In the present case, we use small blocks 313 to which the ends of the rails are secured by screws 314 extending upward through the base (Fig. 20). The plates 309 and 310 are connected at the bottom by a cross bar 315 (Figs. 18 and 22) which has a lateral extension 316 for supporting a roller 317 arranged to ride on the front rail 311. The side plate 308 of carriage K has a pair of ball-bearing wheels 318 which ride over the rear rail 312. The carriage K is thus supported for smooth rolling movement back and forth.

To prevent the carriage from leaving the rails we provide a retaining lug 319 for the front rail 311 and a pair of similar lugs 320 for the rear rail 312, as shown in Fig. 25. The retaining lugs 319 and 320 are apertured to receive the round rails in a loose fit which locks the carriage to the rails without interfering with the movements of the carriage. The lugs 319 and 320 are preferably cast integral with the carriage frame, as seen in Fig. 22. It goes without saying that the rails 311 and 312 are slid through the retaining lugs before the rails are fastened in place.

The stylus shaft 306 is driven by a synchronous motor 321 which is secured to the carriage plate 310 by screws 322. The shaft of motor 321 carries a pinion 323 which meshes with a large gear 324 on shaft 306. Referring to Fig. 23, the gear 324 is connected to the stylus shaft 306 through a friction clutch 325 which comprises a pair of felt rings 326 arranged in pressure contact with the opposite sides of the gear. The clutch rings 326 are held between a fixed collar 327 and a movable pressure disk 328. The collar 327 is clamped to shaft 306 by a set screw 329, and a second collar 330 is fixed on the shaft by a set screw 331. An expanding coil spring 332 is arranged between the disk 328 and the collar 330 whereby the felt rings 326 are pressed against the gear 324 with sufficient pressure to operate the stylus shaft 306. The clutch pressure can be regulated by the axial adjustment of collar 330.

Still referring to Fig. 23, the outer end of stylus shaft 306 carries an insulated slip ring 333 to which the end of conductor 299 is soldered. A brush 334 engages the slip ring 333 (Fig. 25) and this brush is mounted on an insulated block 335 secured to the carriage plate 310. The brush 334 is clamped to block 335 by a metal plate 336 to which a conductor 337 is soldered (Fig. 22). It will thus be seen that the electric stylus 290 is permanently connected to conductor 337 which is part of the recording circuit, as will be explained in the description of Figs. 41 and 42.

*The phasing mechanism*

A cam 338 is fixed on the stylus shaft 306 by a set screw 339 (Figs. 19 and 23) and this cam has a stop shoulder 340 which is normally in locking engagement with the armature 341 of an electromagnet 342. The free end of armature 341 carries a contact piece 341a which is insulated by a strip 341b (such as Bakelite) and engages the cam shoulder 340 when the magnet 342 is not energized. In other words, the insulated contact piece 341a is normally grounded through the cam 338. The reason for this will appear later. The magnet 342 has an L-shaped frame 343 which is set at the bottom in a recess 344 of an arm 345 projecting forwardly from the cross bar 315 of the carriage frame. A screw 346 secures the magnet 342 in place. The armature 341 is pivoted to the upper end of the magnet frame 343 by a pin 347.

Still referring to Fig. 19, the armature 341 carries a right-angled bracket 348 with a depending arm 349 to which one end of a contracting coil spring 350 is attached. The other end of this spring is connected to a bracket 351 secured to the magnet frame 343. The tendency of spring 350 is to throw the armature up and this movement is limited by an adjustable stop 352 mounted on the bracket arm 349. The stop 352 is so adjusted that the contact piece 341a of the armature 341 engages the locking shoulder 340 on cam 338.

The function of cam 338 and magnet 342 is to hold the stylus shaft 306 against rotation until the moment when the magnet is energized to release the stylus 290 for operation by the synchronous motor 321. The instant in which the stylus is thus released for operation is called the phasing moment of the machine. The automatic energizing of magnet 342 at the phasing moment will be explained in the description of the recorder control circuits of Figs. 41 and 42.

When the magnet 342 is deenergized, the spring 350 instantly rocks the armature 341 up against the rotating cam 338 which is stopped when the armature tip 341a strikes the shoulder 340. It should be noted that the cam 338 is always stopped in the same angular position. For distinction we shall designate the parts 338 and 342 as the phasing cam and the phasing magnet.

*The carriage operating connections*

During a recording operation, the stylus 290 not only rotates at a high speed but at the same time moves slowly forward axially inside the recording blank. This axial sliding movement is produced by connecting the carriage K with the motor driven feed screw 236, as we shall now describe.

Referring to Figs. 22 and 25, a lever 354 is pivoted on a stud 355 mounted on the rear extension 309' of the carriage plate 309. The front end of lever 354 carries a half-nut 356 arranged to engage the feed screw 236 when the lever is rocked clockwise by the energizing of a solenoid 357. The plunger 358 of this solenoid is connected to the rear end of lever 354 through a strong contractile spring 359. The solenoid 357 is attached to the carriage plate 308 by screws 360 (Fig. 20.)

A spring 361 coiled about the stud 355 has one end fixed in the plate extension 309', and the other end of the spring bears on top of the lever 354 (Fig. 22), whereby the front end of this lever is normally held down to keep the half-nut 356 out of contact with the feed screw 236. The front part of lever 354 passes through a slotted plate or comb 362 (Fig. 22) attached to the front edge of the plate extension 309' by screws 363. The comb 362 guides the lever 354 in its movements so that the half-nut 356 is held in correct relationship to the feed screw 236. The retractile movement of lever 354 is limited by the slot in comb 362.

The half-nut lever 354 controls a switch 364 (Figs. 20 and 25) mounted on an upright piece 365 which is secured to the rear extension 309' of the carriage plate 309. The switch 364 is the well known micro-switch type and has an operating arm 366 projecting out of the switch box. The free end of switch arm 366 presses against the rear end of lever 354. In the normal condition of this assembly, as shown in Fig. 25, the raised rear end of lever 354 holds the switch arm 366 in closed position. When the solenoid 357 is energized and rocks the lever 354 clockwise, the arm 366 automatically moves down to open the switch. The function of switch 364 is to keep the stylus 290 grounded until the carriage K is connected to the feed screw 236. This will be understood from the coming description of Fig. 42.

The carriage K is held in its start position by a spring drum 367 (Figs. 18 and 25) which is mounted in the base chamber 167' by means of a bracket 368. The spring drum 367 is a well known device which requires no description. We need only say that a flexible band or tape 369 which is connected to the spiral spring in the drum is attached to a stud 370 on the bottom of the carriage K. As the carriage moves forward (to the left in Fig. 18) during a scanning operation, the spring drum is wound up. When the carriage is released upon the deenergization of the half-nut solenoid 357, the tension of the spring drum instantly retracts the carriage.

The stylus carriage K is held in a definite start position by a novel stop device comprising (see Fig. 25) a bar 371 slidably mounted in a plate 372 which is secured to the carriage plate 310 by screws 373. The plate 372 has a recess 372' in which the stop bar 371 is housed. The bar 371 has a stud 374 which projects through a slot 375 in plate 372. A contractile spring 376 is attached at its upper end to the stud 374 and at its lower end to a stud 377 on plate 372, so that the bar 371 is held down with its stud 374 resting on the bottom of slot 375. The stop bar 371 is formed on top with a lateral flange 378 which acts as a finger piece for lifting the bar when required.

As seen in Figs. 18 and 20, the lower end of bar 371 bears againts a bumper 379 carried by an angle bracket 380 which is secured to the base of the machine by screws 381. The bumper 379 is of suitable shock and noise absorbing material such as rubber. The screws 381 pass through slots 380' in bracket 380 (Fig. 22) whereby the bracket is adjustable lengthwise of the carriage to regulate its start position with great accuracy.

The normal or start position of carriage K controls a switch 382 (Fig. 18) which projects through a slot in base 167 and is mounted on a bracket 383 secured to the underside of the base. The switch 382 has an operating arm 384 which carries a roller 385 at its free end and this roller engages the rear edge of the carriage when the latter is in start position. This arrangement normally holds the arm 384 depressed and the switch 382 is open. The moment the carriage starts moving forward it allows the arm 384 to spring up and the switch 382 is closed. As we shall see from Fig. 42, the function of switch 382 is to control the circuit of the phasing magnet 342.

When the carriage K reaches its final position at the end of a recording operation, as indicated by the dotted position 356' of the half-nut 356 in Figs. 18 and 22, it automatically closes a switch 386 (Figs. 20 and 22) mounted on the lower frame 166 at the bottom by a bracket 387. The switch 386 has a spring arm 388 arranged to project laterally into the path of the front edge of carriage plate 309 (Fig. 22).

Normally the switch 386 is open. As the carriage K reaches the end of its scanning movement it thrusts the switch arm 388 to closing position whereby certain operations are automatically initiated. The nature of those operations will appear in the description in Fig. 42. At this point we need only mention that the closing of switch 386 releases the solenoid 357, so that the half-nut 356 is withdrawn from the feed screw 236 and the carriage K is instantly pulled back to start position by the spring drum 367. The switch 386 may properly be called the end-of-message switch.

We mentioned in our description of the mounting of stylus 290 on the head 291 that the stylus was easily removable from the supporting stud 292 (Figs. 31 and 32) so that a worn stylus could be quickly removed and a new one substituted. For this stylus replacement, it is necessary to have the carriage K remain in its forward or operated position so that the stylus will be accessible to the operator.

For this purpose, we use the carriage stop 371. When the operator wants to change a stylus, he simply moves the carriage forward by hand (to the left in Fig. 18) until the lower end of stop 371 rides over a beveled block 389 fixed on the base 167 at a proper distance from the normal position of the stop. The block 389 has a slot 390 into which the spring pressed bar 371 snaps automatically and thereby holds the carriage in forward position. In this position of the carriage the stylus 290 is closely adjacent to the open flange 177 (Fig. 30) and is easily reached by the fingers after the flange is uncovered, as will be explained later. To release the carriage the operator simply lifts the stop 371 out of the block 389 by the fingerpiece 378, whereupon the spring drum 367 returns the carriage to start position. It is to be understood that the block 389 does not interfere with the scanning movements of the carriage K because the carriage completes its forward travel before the stop 371 reaches the block 389. The operating arm 388 of switch 386 is sufficiently flexible to permit the small extra movement required to bring the carriage stop 371 into locking engagement with the block 389.

The paper feed mechanism

After a transmitted message has been recorded, the wrapper 172 is automatically opened and a fresh length of paper is fed into the wrapper from the supply roll 182, while the recorded section of the paper is at the same time projected out of the wrapper for removal. We shall now describe the mechanism that feeds the paper into the open wrapper 172 and for this description we shall refer particularly to Fig. 38.

We have already seen from Fig. 35 that a roll or cylinder 266 is operated from the power shaft 235 through the gear 246 of the cam assembly CS which is frictionally mounted on the power shaft. The cam 244 of the cam assembly has a high edge 391 and a low edge 392 (Figs. 36 and 38), each covering a prescribed arc. A follower 393 pivoted on a stud 394 rides over the periphery of cam 244. The stud 394 is carried by the left frame 166 as shown in Fig. 24.

Referring to Fig. 38, there is a rotary shaft 395 which has an arm 396 rigidly clamped thereon by a set screw 397. The free end of arm 396 has a slot 398 adapted to receive a pin 399 projecting laterally from the forward end of the cam follower 393. The shaft 395 is mounted in the upright frames 165 and 166 (Fig. 18) in parallel relation to the roll 266 and adjacent thereto. A second arm 400 fixed on the shaft 395 is connected at its free end to a contractile spring 401 which is fastened at its free end to a stud 402 on frame 166 (Fig. 24). The spring 401 always tends to rock the shaft 395 clockwise and to press the free end of the follower 393 against the cam 244.

The shaft 395 carries two arms 403 which extend downward and rearward toward the feed roll 266. The arms 403 are secured to shaft 395 in correct angular position by set screws 404. A rod 405 is journaled in the lower ends of arms 403 and carries a pair of rolls 406 made of soft rubber. A simple way to fit these rolls on the rod 405 so as to rotate therewith is to knurl the end portions of the rod and force the rollers over the knurls.

The tendency of spring 401 is to urge the rollers 406 against the feed roll 266 but the rollers are held away from the feed roll as long as the follower 393 engages the high edge 391 of cam 244. The continuous paper strip 181 passes from the supply roll 182 through the space between the feed roll 266 and the rubber rollers 406. When the follower 393 rides over the lower edge 392 of cam 244, the spring 401 instantly moves the rollers 406 against the feed roll 266 and carries the paper strip 181 into the pressure contact therewith. Therefore, the rotation of roll 266 by the motor 241 feeds the next recording blank into the open wrapper 172. To improve the feeding action of roll 266 it may be striated lengthwise very finely.

The movements of cam 244 are so timed (as will be explained later) that the paper feeding operation takes place automatically upon the opening of the wrapper 172 at the end of a recording cycle. The diameter of feed roll 266 and the circumferential length of the operative edge 392 of cam 244 are so calculated that a measured length of paper is fed into the wrapper at each paper feed operation. This measured length of recording paper represents the width (that is, the distance from side to side) of the recorded telegram sheet, while the length of the sheet (the up and down distance) is determined by the width of the supply roll 182.

The automatic feeding of the paper into the wrapper 172 requires automatic means for notifying the operator when the supply of paper is nearing exhaustion. Referring to Figs. 20, 22 and 28, a switch 407 is mounted on a bracket 408 adjustably attached to the right frame 165 by screws 408'. The switch 407 has a spring arm 409 which carries a roller 410 arranged to engage the adjacent side of the supply roll 182. The roller 410 presses against the paper roll 182 near its core 411 (Fig. 28), which is a wooden cylinder carrying a pair of trunnions 412 supported in open slots 413 on top of the transverse frames 165 and 166.

As long as there is sufficient paper in the supply roll 182 to form a bearing surface for the spring pressed roller 140, the switch 407 remains open. When the paper turns are exhausted beyond the roller 410 and no longer hold it back, it suddenly snaps forward and closes the switch 407. Any suitable alarm device may be controlled by the switch 407, such as a bell or a lamp or even both. In our machine, the switch 407 lights the red lamp 133 which we mentioned in our description of Fig. 11. The lamp 133 is mounted on a bracket 414 which is attached to the left frame 166 (Figs. 22 and 24).

We should point out that the switch arm 409 engages the side of supply roll 182 and therefore operates with a snap action when the diameter of the roll reaches a predetermined minimum. This distinguishes our alarm device from prior structures of this type where a lever engages the face of the supply roll and moves slowly as the diameter of the roll diminishes, so that no snap action of the control member is possible.

The paper cutting mechanism

Every time the paper feed advances a measured length of paper into the open wrapper 172 upon completion of a recording operation, the section of paper that bears the recorded message is projected out of the wrapper, as indicated by the dotted outline 415 in Fig. 29. Before the wrapper can close again, it is necessary to cut off the recorded message. This is automatically accomplished by the following mechanism for which we shall refer to Figs. 18, 22, 24, 28, 29 and 31.

A block 416 on base 167 carries a plate 417 which is set into a recess in the block and is secured by screws 418 (Figs. 18 and 22). The plate 417 has an extension 419 which is thicker than the plate itself (Fig. 22) and carries a stud 420 in the form of an adjustable shoulder screw for pivotally supporting a knife blade 421. This blade is attached to a holder 422 by rivets 423 and the holder is mounted on the pivot stud 420. As shown in Fig. 18, a retractile spring 424 secured at one end to the base 167 is attached to the rear end of the blade holder 422 and normally holds the blade 421 up against a stop 425 carried by an extension 417′ of plate 417.

A stationary knife blade 426 is set in a recess in plate 417 and secured by rivets 427. The left end of this fixed blade is fastened to a block 428 by a screw 429. The block 428, which is mounted on the base 167 in any practical way or cast integral therewith, supports a leaf spring 430 for guiding the movable knife blade 421. An extension 431 attached to the free end of the blade 421 passes between the stationary blade 426 and the spring 430, which thus presses against the movable blade and holds it in line. The tension between the two knife blades is regulated by a bowed spring 432 on the pivot stud 420 (Fig. 22). A part 432′ of spring 432 (Fig. 22) projects into a slot 433 (Fig. 18) on the end of extension 419 of plate 417 to hold the spring against turning.

When the recorded paper 415 is projected out of the wrapper 172, it passes between the open knife blades 421 and 426 as shown in Fig. 29. When the movable blade 421 is swung down, the paper is cut off along the edge of the wrapper as closely as possible. The cutting operation of blade 421 is done electrically at a predetermined moment through the following connections.

Referring to Figs. 18, 18A and 29, there is a solenoid 434 in the base chamber 167′ depending from the top of the base to which it is secured by screws 435. The solenoid 434 has a plunger 436 which operates with a long longitudinal stroke and therefore requires special supporting and guiding means. The plunger moves between a pair of guide plates 437 and 438 which are secured to the top of the base casting by screws 439. The bottom of the plunger rests on a plate 440 which is an L-shaped piece attached to the side plate 438 by screws 441. To permit vertical adjustment of the bottom plate 440, it is provided with vertical slots 442 through which the screws 441 extend.

A plate 443 is secured to the bottom guide 440 by screws 444 and the forward end of this plate terminates in an upstanding flange 445 which forms a stop for the outward movement of plunger 436. The stop 445 is adjustable lengthwise of the plunger by providing a longitudinal slot (not shown) through which the fastening screws 444 pass. A cord 446 is tied at one end to the plunger 436 and at the other end to the free end of the movable knife 421. The cord 446 passes through the top of base 167 around a pulley 447 carried by a bracket 448 which is attached to the underside of the base. A guide 448′ on the bracket 448 extends across the pulley 447 to hold the cord in place. The retractile spring 424 normally holds the plunger 436 against the stop 445, which can be adjusted to make the cord 446 taut.

When the cutter magnet 434 (as we shall call it) is energized, the plunger 436 is drawn in and the knife blade 421 is quickly pulled down to cut off the recorded sheet 415 which has been projected out of the wrapper 172. The discharged telegram drops into the delivery chute 131 at the front of the machine, as we mentioned in connection with Fig. 11. The delivery chute 131 is preferably a transparent receptacle through which the operator can see the discharged telegrams 449. The bottom of chute 131 is formed by an inclined plate 450 which guides the discharged sheets towards the front wall of the chute (Fig. 29).

In the present machine, the delivery chute 131 is detachably secured to the base 167 by means of a bracket 451 which is fastened in place by a manually operable lock 452 of any practical construction. It may be assumed that the locking device 452 is like the one shown in Figs. 14–17 previously described. To protect the operator from accidentally cutting his hand on the knife blade 421, as when he removes the telegrams from the delivery chute, we provide a guard 453 which is a light blade of sheet metal pivotally suspended on a rod 454 in front of the knife. The rod 454 is carried by an arm 455 secured to the frame 165. The swinging guard plate 453 is pushed aside by the paper as it emerges from the wrapper (Fig. 29).

The cutter magnet 434 is energized at the proper moment by the operation of a switch 456 (Fig. 28) mounted on frame 165 and associated with the paper feed shaft 265. The right end of this shaft extends through the frame 165 and carries a pinion 457 which permanently engages a gear 458 mounted on a stud 459 on frame 165. A cam 460 is mounted on the stud 459 and connected to gear 458 so that those two parts always rotate together. The cam 460 has a notch 461 adapted to receive the end of a follower 462 which is pivoted on a stud 463 on frame 165.

The switch 456 has a spring pressed button 464 which bears down on the follower 462. As long as the follower rides over the high edge of cam 460, it holds the switch button back and the switch remains open. When the follower 462 drops into the notch 461, the button 464 moves out and the switch 456 is closed. As will be explained later, the closing of switch 456 energizes the cutter magnet 434.

The gear ratio between the elements 457 and 458 is so related to the movement of the paper feed shaft 265 that during each paper feed operation the cam 460 makes one revolution from the position shown in Fig. 28. This means that when the required length of fresh paper has been fed into the open wrapper 172 and the recorded sheet projected out of the wrapper, the cutter magnet 434 is energized for a moment (only while the follower 462 is in the notch of cam 460) and quickly pulls the knife 421 down to cut off the telegram sheet 415. The shaft 265 continues to move after the cutting operation sufficiently to cam the follower 462 out of the notch 461. This opens the switch 456 to release the magnet 434, whereupon the knife 421 flies up to normal position. It will thus be seen that the cam 244 controls the paper feed operation mechanically and controls the paper cutting operation electrically.

The smoke remover

In facsimile recorders using an electric stylus on specially prepared paper the high voltage of the recording operation liberates fumes or smoke which it is desirable to remove and render innocuous. For this purpose we have devised a blower arrangement which draws the smoke from the recording chamber into a filter box mounted in the base chamber of the machine.

Referring to Fig. 29, an inverted U-shaped bracket 465 is attached by screws 466 to the underside of base 167. To the right side of bracket 465 is fastened a fan casing 467 by screws 468 and the other side of the bracket carries a motor 469 which is secured by screws 470. The motor shaft 471 extends into the fan casing 467 where it operates a suitable fan or blower (not shown).

The intake of the blower casing 467 connects with a metal pipe 472 which extends upward through a hole in the base top. The upper end of pipe 472 connects with a short piece of rubber tubing 472' which is connected at its upper end to a metal elbow pipe 473. This pipe is attached at its upper end to the flange 177 of the wrapper assembly (Fig. 30) by means of a metal fitting 474 which has a circular flange 475 adapted to fit into the flange 177 in a tight yet readily separable connnection. The elbow flange 475 is slotted to make it slightly flexible and thereby produce an air tight joint with the flange 177. When the operator wants to change the stylus, as previously explained, he pulls out the elbow 473 which is freely movable out of and into closing position because of its mounting on the flexible rubber tube 472'.

The outlet of the blower casing 467 is connected by a tube 476 to a filter box 477 secured to the top of the base by brackets 478 and 479 (Figs. 18 and 28). The box 477 contains suitable material which filters out the smoke and allows the purified air to escape through perforations in the cover (not shown). It will thus be clear that the blower motor 469 withdraws the smoke liberated in the recording chamber 179 and blows it into the filter box 477. The blower motor 469 is energized simultaneously with the power motor 241 through circuit connections controlled from the transmitter, as will be explained in connection with Figs. 41-42.

The transmitter circuits (Fig. 40)

The source of power for the facsimile transmitter is indicated in Fig. 40 by a pair of bus bars A and B which may be assumed to be connected to a commercial line circuit of 60 cycles and 110 volts. A main power switch 480 connects the bus bars A—B with a pair of lines 481 to which conductors 482 and 483 are connected by an auxiliary switch 484.

To simplify the circuit connections in Fig. 40 we have shown a pair of auxiliary bus bars $a$ and $b$ leading from the conductors 482 and 483, respectively. When a terminal or conductor is marked with an arrowhead and labeled $a$ or $b$, it means that the part thus labeled is connected to the auxiliary bus bar $a$ or $b$, so that it will not be necessary to show the wiring or circuit connections to the auxiliary bus bars, which are connected to the main bus bars A and B through the switches 480 and 484. In describing the circuits we use the convenient term "wire" to represent any kind of electrical connector.

The two lines 481 go to a frequency standard 485, and the conductors 482—483 are connected to the power input terminals 486—487 of a preamplifier 488. This apparatus is so well known in the facsimile art that it will be sufficient if we merely indicate the presence of two transformers 489 and 490 which supply power to the vacuum tubes in the amplifier. Transformer 489 has a primary coil 491 and a secondary coil 492. The primary 491 is connected to wires 493 and 494, while the secondary 492 is in the filament circuits of the tubes. The other transformer 490 has a primary coil 495 and two secondary coils 496 and 497. The primary 495 is connected to wires 494 and 498, the secondary 496 feeds the plate circuits of the tubes, and the other secondary 497 furnishes current for the exciter lamp 60 of the optical scanner. The power lead 482 goes to conductor 493 through a wire 499, and the other lead 483 connects with conductor 494 through a wire 500. The photocell 63 constitutes the signal input of amplifier 488 and the amplified signal output goes over lines 501 and 502 to a signal inverter 503.

The signal inverter 503, like the amplifier 488, is a well known device in the facsimile art, so we need only indicate a transformer 504 for the heater filaments of the vacuum tubes in the inverter and another transformer 505 for the plate circuits. The primary 506 of transformer 504 has its terminals conected to the auxiliary mains $a$ and $b$, and the secondary 507 supplies current to the heaters of the tubes. The primary coil 508 of transformer 505 has one side connected to terminal $b$ and the other side is connected to a conductor 509. The secondary coil 510 of transformer 505 furnishes the power for the plate circuits of the inverter.

The amplified signal output circuit 501—502 of amplifier 488 constitutes the input of the inverter 503 and the output of the inverter goes to lines 511—512. It will be understood that the function of the inverter is to invert the incoming signals so that the receiver will record a positive copy of the transmitted telegram. This operation of signal inverters is familiar to facsimile engineers and we need not go into detail except to mention that the inverter 503, which is really an oscillator, sends out a steady tone or carrier (say 2500 cycles) when disconnected from the amplifier.

From what has been said so far concerning Fig. 40 it will be clear that when the operator closes the main power switch 480, the frequency standard 485 is energized through the circuit lines 481. Nothing else happens until the auxiliary power switch 484 is closed. Thereupon the transformer 489 of amplifier 488 and the transformer 504 of inverter 503 are energized to heat the tube filaments of those two units, which are thereby made ready for operation.

The transmitter has a start button 513 for operating a switch 514. Let it be understood that the parts 513—514 represent any practical form of hand operated switch. When the switch 514 is closed, a relay 515 is energized through the following circuit: from bus bar A to conductor 482, wire 499, wire 493 to point 516, wire 517, through the closed switch 514, wire 518, through relay 515, wire 519, switch 196, wire 494 to point 520, wire 500, and through conductor 483 to bus bar B.

The energized relay 515, which we call the power relay, closes its contacts 521, 522 and 523.

The relay locks through closed contacts 522 and 523 as follows: from wire 493 through contact 522, wire 498 to point 524, wire 525, contact 523, through the winding of relay 515 and back to bus bar B as described in the preceding paragraph. The start button 513 need, therefore, be held down only for a moment. The closed contacts 522 and 523 also close the circuit of chopper motor 65 through wire 525 to point 526, through the motor windings to wire 494 and from there to bus bar B, as previously traced.

The closing of contact 522 of energized relay 515 connects the transformer 490 of amplifier 488 with the auxiliary bus bars $a$ and $b$ through the following circuit: from the input terminal 486, wire 499 to wire 493, closed contact 522, wire 498, through transformer primary 495, wire 494 to point 520 and to the other input terminal 487. Accordingly the operation of start button 513 energizes the plate circuits of amplifier 488.

At the bottom of Fig. 40 are four relays marked 527, 528, 529 and 530. The first relay is operated by alternating current from the source A—B, and the other three relays operate on direct current. The relay 528 is of the slow-release type, usually called a slug relay. In designating the contacts operated by these relays it will simplify the description if we apply a single reference numeral to each pair of contacts. That is, each assembly of a stationary contact member and its associated tongue or armature will be regarded as a relay contact which either makes or breaks when the relay is energized.

Relay 527 has four make contacts 531 to 534 and a break contact 535. The contacts 534 and 535 have a single tongue 536 in common. Relay 528 has a break contact 437 and a make contact 538. Relay 529 has four make contacts 539 to 542 and three break contacts 543 to 545. The contacts 540 and 543 have a common tongue 546 and the contacts 541 and 544 have a common tongue 547. Relay 530 has two make contacts 548 and 549 and two break contacts 550 and 551. The contacts 549 and 551 have a common tongue 552.

A rectifier 553 of any practical construction is represented diagrammatically by a transformer 554, a pair of A. C. input terminals 555—556 to which the transformer primary 557 is connected, and a pair of D. C. output terminals 558 and 559 for supplying direct current to certain relays. The input terminal 555 connects with contact 531 of relay 527 through a wire 560, and the other terminal 556 goes to the auxiliary bus bar $b$. The wire 509 which comes from the signal inverter 503 is connected to terminal 555.

A timer 561 is associated with the relays 527 to 530 for controlling the sequence of their operation. This timing device is a well known piece of apparatus purchasable in the open market, so we need only say that it comprises a small synchronous motor represented by a winding 562, a pivoted switch arm 563 and a pair of contacts 564—565. For convenience we shall refer to 562 as the timer motor. One side of this motor goes to wire 560 and the other side is connected to contact 537 of relay 528 through a wire 566. The timer arm 563 is connected to a wire 567 which goes from the negative terminal 559 of rectifier 553 to contact 533 of relay 527. A wire 568 connects the timer contact 564 with contact 538 of relay 528, and a wire 569 connects the other timer contact 565 with the tongue 546 of relay 529.

In the operation of timer 561 it is to be assumed that the arm 563 normally rests against the contact 564. When the motor 562 is energized, the arm 563 is slowly moved from contact 564 to contact 565. The length of time required for this movement of arm 563 can be regulated and for the purposes of this description we shall assume that it takes two seconds for the arm 563 to swing over to contact 565, where the arm remains as long as the motor 562 is energized. When the motor circuit is broken, the arm 563 flies back to contact 564. These are the only details we need to remember in connection with the timer 561.

As previously mentioned, the lines 481 which are connected to the bus bars A and B go to the input terminals of the frequency standard 485. This unit is a standard device well known to electrical engineers and requires no description. It is sufficient to say that the output lines 570—571 supply a 60 cycle alternating current to a synchronous power amplifier 572. The line 570 goes directly to the amplifier but the other line 571 is connected to the tongue 536 of relay 527. A wire 573 containing a load resistor 574 connects line 570 to the closed contact 535 of relay 527, whereby the output of the frequency standard is short-circuited when the relay 527 is not energized. A conductor 575 connects an input terminal of amplifier 572 to contact 534 of relay 527. Hence, when this relay is energized the output of the frequency standard 485 goes into the synchronous power amplifier 572.

The amplifier unit 572 is another piece of apparatus that is so well known as to require no description. We need only say that its output lines 576 energize the synchronous motor 39 which operates the scanning cylinder 32. Since the output of amplifier 572 is insufficient to start the motor 39, we insert a relay 577 which has a pair of make contacts 578 and 579 connected at one side to the bus bars $a$ and $b$ and at the other side to the output lines 576. One side of relay 577 is connected by a wire 580 to contact 532 of relay 527 and the other side of relay 577 is connected to the plus terminal 558 of rectifier 553 through wires 581, 582 and 583.

When the relay 527 is energized upon operation of the start button 513 (as presently to be explained), the motor starting relay 577 is energized through the following connections: from the plus terminal 558 of rectifier 553 through wires 581, 582, 583, relay 577, wire 580, through closed contact 532 of relay 527, wire 584, contact 544 of relay 529 (not energized), wire 585, closed contact 533 of relay 527 and through wire 567 to the negative terminal 559 of the rectifier. The energized relay 577 connects the scanning motor 39 to the main power source A—B, and once this motor is started, the synchronous amplifier 572 takes over the duty of running the motor after the relay 577 is released.

When the power relay 515 is energized upon operation of the start button 513, as previously explained, the relay 527 is energized from the bus bar $a$ through the closed contact 521, wire 586, through the relay winding, and to bus bar $b$. It is evident that the relay 527 remains energized as long as the power relay 515 is in operated condition. When the energized relay 527 closes its contact 531, which is connected to bus bar $a$, the rectifier 553 is energized through transformer primary 557.

The closed relay contact 531 also energizes the primary coil 508 to transformer 505 in the signal inverter 503 through wires 560 and 509, the other side of coil 508 going to bus bar *b*. Accordingly, the plate circuits of the inverter tubes are connected to the source of power A—B. The relay contact 531 also energizes a relay 587 (upper right corner of Fig. 40) which is connected by a wire 588 to wire 509 and therefore to the bus bar *a*. The other side of relay 587 goes to bus bar *b*. When the relay 587 is energized, its contact 589 closes the control circuit 590 of the radio transmitter 13.

The closed contact 531 of relay 527 also energizes the timer motor 562 from bus bar *a* through wire 560 to point 591, through the motor windings to wire 566, across the closed contact 537 of relay 528 (not yet energized), wire 592, and through closed contact 551 of relay 530 (still inert) to bus bar *b*. When the timer is thus energized, the arm 563 moves over to contact 565 and this operation (as we have assumed) requires two seconds.

When the timer arm 563 engages the contact 565, the slug relay 528 is energized for a moment through the following connections: plus terminal 558 of rectifier 553, wire 581 to point 593, through relay 528, wire 594, closed contact 543 of relay 529 (not yet energized), wire 569, and through the timer arm 563 to the negative terminal 559 of the rectifier. The energized relay 528 opens its contact 537 and thereby deenergizes the timer motor 562, thus causing the switch arm 563 to fly back against the contact 564. The breaking of contact 565 disconnects the relay 528 from the rectifier 553, but as this relay is slow to release it holds its contact 538 closed long enough to energize the next relay 529.

The circuit of energized relay 529 goes from the plus terminal 558 of rectifier 553, wire 581 to point 593, wire 582, through relay 529, wire 595, through closed contact 538 of relay 528 (still energized at this moment), wire 568, and through the timer contacts 564—563 to the negative terminal 559 of the rectifier. Relay 529 locks through its closed contact 541, wire 585, closed contact 533 of relay 527 (which remains energized) and through wire 567 back to the rectifier. In other words, the relay 529 remains energized independently of relay 528 and the timer 561.

Relay 529 through its contact 545 controls a relay 596 which has one lead 597 connected to contact 521 of the power relay 515 and the other lead 598 goes to contact 545. When the relay 515 is energized by operating the start button 513, the relay 596 is connected to bus bars *a* and *b* before the relay 529 is energized. The function of relay 596 will presently be explained. At this time we need only mention that the energizing of relay 529 breaks the contact 545 and releases the relay 596.

Relay 529 also controls the output circuit of amplifier 488. As long as this relay is inactive, its open contact 539 keeps the amplifier output lead 502 open. Upon the closing of contact 539, the amplifier output circuit 501—502 is fed into the signal inverter 503. However, the output of the inverter is at this time short-circuited by the closing of contact 542 of the energized relay 529. This short-circuit can be traced from point 599 on line 511, wire 600, contact 542, wire 601 to closed contact 550 of relay 530 (not yet energized), and wire 602 to point 603 on line 512.

The breaking of contact 544 of energized relay 529 deenergizes the relay 577 of amplifier 572, so that the contacts 578—579 are released and the bus bars *a* and *b* are taken off the circuit of the synchronous scanning motor 39, which is now operated by the synchronous output of amplifier 572. The breaking of relay contact 543 holds the circuit of relay 528 open even after the timer arm 563 again engages the contact 565.

Let us now go back for a moment to the slug relay 528 which has been disconnected from the rectifier but which did not release its contacts 537 and 538 until the relay 529 became energized. The release of contact 538 has no effect on the locked circuit of relay 529. The closing of contact 537 again energizes the timer motor 562 and the arm 563 starts moving toward contact 565 which it touches after an interval of two seconds.

We now have the condition where the contact 540 of relay 529 and the timer contact 565 are closed. As a result the relay 530 is energized through the following connections: from plus terminal 558 of rectifier 553, wire 581 to point 593, wire 582 to point 604, wire 583 to point 605, through relay 530, wire 606 to closed contact 540, wire 569 to contact 565, and through the timer arm 563 to the negative side of the rectifier. Relay 530 locks through its closed contact 548, wire 585 and the closed contact 533 of energized relay 527. It is important to remember that the relay 530 is energized two seconds after the energizing of relay 529. The purpose of this interval, which we have put at two seconds by way of example, will shortly become clear.

When the energized relay 530 breaks its contact 550, it removes the short-circuit from the inverter output lines 511—512, which now connect with the radio transmitter 13 through the closed contacts 607 and 608 of energized relay 587. A T-pad 609 of conventional construction regulates the power level of the input circuit 610—610' of the radio transmitter 13.

The closing of relay contact 549 connects the solenoid 96 of the scanning mechanism with the bus bars *a* and *b* through wire 611, whereby the half nut 84 is thrown into mesh with the feed screw 50, as previously explained. The scanning carriage SK now starts to move down. When the energized relay 530 breaks its contact 551, it deenergizes the timer 561 and the arm 563 instantly returns to normal position against the contact 564.

The relay 596, which is energized from the bus bars *a* and *b* upon operation of the power relay 515, has two break contacts 612 and 613 and two make contacts 614 and 615. The contacts 612 and 614 have a common tongue 616 connected to a wire 617, and the contacts 613 and 615 have a common tongue 618 connected to wire 602. The contacts 612 and 613 are connected to the output lines 511 and 512 of inverter 503, and the contacts 614 and 615 are connected to a pair of terminals 619 and 620 of the frequency selector 15. We mentioned this device briefly in the description of Fig. 1 and now we shall say something more about it.

Assuming that we have three cars that operate as mobile recording units in our system, the selector mechanism 15 comprises three oscillators 621, 622 and 623 which deliver different frequencies adapted to select cars Nos. 1, 2 and 3, respectively. Each oscillator has a pair of output terminals 624 arranged to be connected with the terminals 619 and 620 by wires 625. A rotary hand knob 626 enables the operator to select the particular oscillator which is to be connected to the radio transmitter 13.

Let us suppose that the operator has a message for car No. 1. He turns the selector knob 626 to connect the oscillator 621 which is assigned to that particular car. With relays 597 and 596 both energized, the oscillator 621 sends its frequency to the radio transmitter 13, through the following connections: From the selector switch terminal 619 to relay contact 614, wire 617, relay contact 607 and through line 610 to the radio transmitter. From the other selector terminal 620 we go to contact 615 through the T-pad 609 to wire 627, relay contact 608 and through the circuit line 610' to the radio transmitter, which broadcasts the selector frequency to be picked up by car No. 1. What this frequency does in the recorder outfit of the selected mobile unit will be explained in the description of Figs. 41 and 42.

It should be pointed out that the interval during which the selector frequency is sent over the radio circuit is determined by the movement of timer arm 563 from contact 564 to contact 565. This interval, as already mentioned, is here assumed to be two seconds, which we have found to be sufficient in our present system but which of course can be varied to suit particular conditions.

The reason why the transmission of the selector frequency is determined by the timer arm 563 will be understood if we recall the following operations. When the relay 527 is energized, its contact 531 connects the relay 597 to bus bars $a$ and $b$ so that the contacts 607 and 608 are closed. With the relay 596 also energized upon operation of the start button 513, the frequency selector circuit is connected to the input of radio transmitter 13. The energizing of relay 527 also energizes the timer 561 and in two seconds the arm 563 engages the contact 565. When that happens, the relay 528 is momentarily energized and closes the circuit of relay 529 which opens its contact 545 and releases the relay 596. This automatically takes the selector frequency off the radio input 610 and 610' after a transmission time of two seconds.

In describing Fig. 1 we mentioned that the facsimile sending station had a two-way telephone set 16 for calling up the operators of the mobile receiving units. In Fig. 40 this telephone set is represented diagrammatically by a microphone 628 adapted to be connected to the radio transmitter 13 and a loud speaker 629 connected to the radio receiver 14. It is to be understood that the handle of microphone 628 has a switch button 630 which the operator automatically pushes in when he grips the handle to close the control circuit 590 of radio transmitter 13 through wires 631.

The microphone circuit 632 is connected to contacts 633 and 634 of relay 587 which is not energized at this time, so that the microphone is normally connected to the input lines 610 and 610' of the radio transmitter for sending out verbal instructions to the car operators. The telephone talk coming from the car operators is received at the sending station through the loud speaker 629. It should be noted that during facsimile transmission when the relay 587 is energized, the microphone is disconnected from the radio transmitter 13 so that it is impossible to jam the facsimile signals with an attempted telephone message.

*Operation of Fig. 40*

The operation of the various control circuits in Fig. 40 will be clear from the preceding detailed description, but it will help us to remember the salient points in the automatic control between the sending station and the selected receiving station if we give a synopsis of what happens at the sending station when the start button 513 is operated.

To begin with, the closing of the main power switch 480 connects the frequency standard 485 with the source of power A—B. When the auxiliary power switch 484 is closed, the filament or heater circuits of the vacuum tubes in the preamplifier 488 and in the signal inverter 503 are connected to the source of power through the auxiliary bus bars $a$ and $b$. The units 488 and 503 are thus readied for operation. The attendant inserts the message to be transmitted into the scanning cylinder 32 and adjusts the selector knob 626 to select the particular car for which the message is intended.

After telephoning to the operator of the selected car whatever instructions or information may be necessary, the attendant at the sending station presses the start button 513 for a moment and this is what happens:

Relays 515 and 596 are operated. The exciter lamp 60, the chopper motor 65 and the plate circuits of preamplifier 488 are energized. However, the output circuit 501-502 of this amplifier is still open at contact 539 of relay 529.

Relay 527 is energized and causes the energizing of the plate circuits in signal inverter 503, the rectifier 554, the synchronous timer 561 and the relays 577 and 587. Consequently, the synchronous scanning motor 39 is started, the microphone circuit 632 is disconnected and the selector frequency is sent out over the radio transmitter 13.

At the end of two seconds, the timer arm 563 touches the contact 565 whereupon the relay 528 is energized for a moment, thereby deenergizing the timer and operating the relay 529. When the relay 528 is deenergized the timer 561 starts recycling.

The operation of relay 529 deenergizes the re- 596, whereby the selector frequency is taken off the lines 617 and 627 two seconds after it started.

The operation of relay 529 closes the output of preamplifier 488 and the same time short-circuits the output of inverter 503.

Two seconds after the relay 529 is energized, the timer arm 561 again touches the contact 565 and the relay 530 is energized. As a result, the inverter output 511—512 is freed of its short-circuit and goes into the radio transmitter 13. At the same time the half-nut magnet 96 is energized and the timer 561 is again deenergized.

Therefore, the energizing of relay 530 puts the facsimile transmitter into operation to scan the message in cylinder 32. The first facsimile signals to go over are the phasing signals produced by the black mark 38' on the telegram sheet. At the close of a scanning operation, the carriage SK opens the switch 196 whereby the power relay 515 is deenergized and all parts are restored to normal.

It will be seen, then, that once the machine is started by the button 513, the various operations we have described take place automatically and so quickly that only about four seconds elapse between the pressing of the start button 513 and the beginning of facsimile transmission.

There are two features in the transmission circuits of Fig. 40 that should be remembered for a clear understanding of the receiver circuits in Figs. 41 and 42 presently to be described. First, there is the two-second interval during which the selector frequency is transmitted over the radio circuit upon the energizing of relay 527. This is the selector interval during which the desired mobile unit is selected to receive the coming message. Second, there is another interval of two seconds between the operation of relay 529 and the operation of relay 539. During this interval the selector frequency as well as the output of inverter 503 are off the lines 626 and 627 that go to the radio transmitter 13. This silent interval we call the no-tone interval during which the selected receiver is automatically conditioned for the recording operation, as will be explained in the description that follows.

In a system using but one car to be connected with the sending station (as would come within the purview of our invention), the selector frequency device 15 would not be necessary, for then the steady frequency tone sent out by the signal inverter 503 for a period of two seconds would operate as a selector frequency. The control apparatus of the car would, of course, be tuned to the frequency output of the inverter.

In the broader aspect of our invention we contemplate a selector mechanism capable of sending out any kind of selecting signals that will automatically place a desired car in facsimile receiving condition. For example, the selecting devices 621 to 623 can be of a type that will generate different code signals, each adapted to select a particular car.

*The recorder circuits (Figs. 41–42)*

The source of power for the electrical apparatus of the facsimile equipment installed in each car is a storage battery 635. A main lead 636 (which runs through both Figs. 41 and 42) connects various electrical devices to one side of the battery, the other side of which is grounded. In Fig. 41 the units directly connected to battery lead 636 are two dynamotors 637 and 638, a frequency standard 639 (with respect to the filament circuits) and a converter 640. These units are therefore energized and placed in a standby condition by the mere closing of the battery circuit. A switch 641 enables the operator to turn the electric power on and off, and when the power is on a lamp 642 (Fig. 42) lights and shines through the jewel 129 on the dashboard of the car.

The synchronous stylus motor 321 is connected by lines 643 to the frequency standard 639 which drives the motor and therefore the stylus 290 in synchronism with the scanning mechanism of the distant transmitter. The power motor 241 and the blower motor 469 are connected in parallel to the AC output lines 644 of an inverter 645 which is energized through the battery input line 646.

The signals broadcast from the sending station, whether they represent the selector frequency or facsimile transmission, are received by the radio receiver 18 of the selected car. The output of this receiver forms the input of the amplifier unit 20 and goes through lines 647 to a transformer 648 which has the usual primary and secondary coils 649 and 650. The primary 649 is connected to the radio output circuit 647 through a T-pad 651 and a condenser 652 to adjust the input power level as required for the best results.

The amplifier 20 contains a triode 653, a beam-power tube 654 and a twin triode 655. The heater filaments 656 of all three tubes are connected to the battery lead 636 through a conductor 657. The grid 658 of tube 653 is connected to one side of the secondary coil 650 and the other side of this coil goes to a grounded wire 659 which connects with the cathode 660 through the usual resistor-condenser combination. A conductor 661 connects the plate 662 of tube 653 with the control grid 663 of tube 654. The screen grid 664 of this tube goes to a conductor 665 and the cathode 666 is connected to the grounded wire 659, the same as cathode 660 of tube 653.

A transformer 667 comprising a primary coil 668 and a secondary coil 669 constitutes the output end of the amplifier 20. One side of primary 668 goes to the plate 670 of tube 654 and the other side of that coil is connected to conductor 665 which runs through both Figs. 41 and 42. One side of the secondary coil 669 is connected to the recording line 337 and the other side of that coil is grounded. The stylus 290 being connected to line 337 receives the amplified signals generated in the transformer winding 669. In other words, the circuit of coil 669 constitutes the recording circuit of the facsimile receiver. A grounded resistor 669′ (Fig. 42) connected to line 337 serves as a continuous load on transformer 667 and therefore on tube 654, which operates better with such a load.

The twin triode 655 is part of the frequency selector embodied in the amplifier unit 20. The tube 655 has two sets of three electrodes, one set comprising a plate 671, a grid 672 and a cathode 673, and the other set comprising a plate 674, a grid 675 and a cathode 676. The first three electrodes act as an amplifier and the other three as a rectifier. The cathodes 673 and 676 are connected to a grounded conductor 677 through the bias resistors 678 and 679 which are in parallel with the associated grid-leak condensers, according to usual practice.

The grid 672 of tube 655 is connected to the plate conductor 661 of tube 653 by a wire 680 which includes a condenser 681. The connecting point 682 may be called the filter tap because it is the point where the incoming selector frequency is tapped from the amplifier tube 653 to the filter control tube 655. The grid 672 is connected to the grounded wire 677 through a high resistor 683.

The frequency selector portion of the combined amplifier and selector device 20 includes a filter unit 684 which comprises a transformer 685 with a primary coil 686 and a secondary coil 687. Each coil is shunted by a condenser 688 and 689, respectively. One side of primary 686 is connected by a wire 690 to the plate 671 of tube 655, and the other side of that coil is connected by a wire 691 to a conductor 692. The secondary coil 687 is connected at one side to the grid 675 of tube 655 by a wire 693 through a high resistor 694, and the other side of that coil goes by a wire 695 to the grounded conductor 677.

The conductor 692 is an output lead of dynamotor 637 and carries (in this particular instance) a 300 volt direct current which goes to the plate conductor 661 of tube 653 through a resistor 696. A condenser 696′ keeps the direct current voltage from the grid 663. The dynamotor lead 692 is also connected to the amplifier plate 671 of tube 655 through wire 691, primary coil 686, and wire 690.

The voltage in wire 691 from lead 692 divides at the point 697, one path going through the transformer primary 686 and the other path going to the grounded wire 677 through a voltage dividing resistor 698 and the cathode bias resistor 679. The rectifier cathode 676 of tube 655 is connected by a wire 699 to point 699' between the resistors 679 and 698, whereby the cathode is positive with respect to the grid 675. Putting this another way, the purpose of the voltage divider 698 is to bias the grid 675 negatively with respect to cathode 676. In the apparatus we have been using this negative bias amounts to about 20 volts.

The rectifier electrodes 674—675—676 of tube 655 control a relay 700 (Fig. 42) which we call the line relay of the recorder control circuits. A conductor 701 connects one side of relay 700 permanently with the 300-volt direct current output of dynamotor 637, and the other side of this relay goes by way of conductor 702 to the rectifier plate 674 of tube 655. A condenser 703 is connected across conductors 691 and 702 to smooth out the peaks of the rectified half waves that go across the electron path between plate 674 and cathode 676. For convenience let us call this electron path by the single reference numeral 704.

It will be clear that the line relay 700 is energized only when the electron path 704 has sufficient conductivity to close the relay circuit. The condition of electron path 704 is determined by the filter unit 684 and the operation of this unit depends upon the selector frequency received by the input transformer 648 of the amplifier 29. We should remember that each car has its own band-pass filter which lets through only the particular frequency assigned to that car. Let us assume in Fig. 41 that the amplifier is receiving a selector frequency to which the filter unit 684 has been tuned. The operation of line relay 700 in response to this frequency is effected as follows.

The incoming selector frequency goes from tap 682 to grid 672 of tube 655. The direct current circuit for plate 671 goes from the dynamotor output lead 692 to wire 691, through primary coil 686 and wire 690 to plate 671, across the electron path to cathode 673 and to the grounded return wire 677. Therefore, the selector frequency impressed on grid 672 passes in amplified form through the transformer primary 686. Since the filter unit 684 will let this frequency through, the induced E. M. F. in the secondary coil 687 so controls the grid 675 that the current flow across the electron path 704 energizes the line relay 700. The circuit of this relay goes from dynamotor lead 701 through the relay winding, conductor 702, across electron path 704, wire 699, and through resistor 679 to the grounded return wire 677.

The band-pass filter 685 performs another important function, namely, keeping the line relay 700 (and therefore the facsimile equipment of the car) inoperative while telephone conversations are going on between the sending station and the selected mobile receiver. As we shall presently explain, the facsimile recorder can not be started unless the relay 700 is energized for a predetermined interval, and this relay, as we have seen, is operatively energized only by the selector frequency which passes through the filter 684 of the car. Therefore, the band-pass filter 684 constantly acts as a custodian that prevents the energizing of relay 700 for the required interval except when it is desired to start the recorder. How this operation of relay 700 automatically sets the recording mechanism going will now be described.

The line relay 700 has a make contact 705, a break contact 706, and a tongue 707 common to both contacts. A condenser 708 and a resistor 709, both grounded, are connected in parallel to the relay tongue 707. The make contact 705 is connected by a wire 710 to a conductor 711 which is the output lead of converter 640 and carries (in this instance) a 150-volt direct current. The wire 710 includes a high resistor 712 and a lower resistor 712' which are in series with condenser 708 when the relay contact 705 is closed.

We stated in the description of Fig. 40 that the selector frequency was sent over the radio circuit for a period of two seconds. Accordingly the line relay 700 is kept energized for that interval and closes its contact 705. The condenser 708 is now charged by the converter 640 through lead 711, resistors 712 and 712' in line 710, relay contact 705, and through the condenser to ground. The resistors 712 and 712' control the current flowing into the condenser and are so calculated that it takes two seconds to charge the condenser to a value sufficient for its intended operation. Short pulses (that is, such as last less than two seconds), while they will briefly energize relay 700, are not of sufficient duration to charge the condenser 708 to the value required for its prescribed function, which is about to be explained.

In addition to line relay 700, which makes the recorder operative, there are seven relays in Fig. 42 for automatically controlling various functions of the machine. We have designated those seven relays as follows: two power relays 713 and 714, an A. C. relay 715, a battery relay 716, a phasing relay 717, an end-of-message relay 718, and finally a release relay 719 which restores all the relays to normal.

As we have seen, the immediate purpose of relay 700 when energized is to cause the adequate charging of condenser 708. Upon release of that relay the condenser instantly discharges through closed contact 706, wire 720, contact 721 of relay 715, wire 722, and through relay 713 to ground. The energized relay 713 closes its contact 723 and completes the circuit of relay 714 from the 150-volt D. C. conductor 711, contact 724 of unenergized relay 719, wire 725, through relay 714, wire 726, closed contact 723, and through relay 713 to ground. This circuit thus locks the relay 713 upon cessation of the condenser discharge current and at the same time energizes the relay 714.

The operation of relay 713 energizes the inverter 645, through the battery lead 636 to point 727 (Fig. 42), wire 728 to point 729, wire 730, closed contact 731 of relay 713, wire 732 and through conductor 646 into the inverter. The 110-volt A. C. output lines 644 go to relay 715 and energize the same. The energized inverter 645 operates the power motor 241 and the blower motor 469. When relay 715 is operated and before the relay 716 is energized, any residual charge in condenser 708 is cleared out through wire 720, closed contact 733 of relay 715, wires 734 and 734', and through closed contact 735 of relay 716 to ground. This keeps the residual condenser discharge out of the phasing relay 717.

The energized relay 713 also makes the 60-cycle frequency standard 639 operative to run the stylus motor 321. These frequency standards, as is well known, contain a set of vacuum tubes which operate an output transformer at the required frequency and voltage. The filaments or heaters of the vacuum tubes in unit 639 are connected to the battery lead 636 by a wire 734, and the plate supply (300 volts D. C.) is furnished by the dynamotor 638 through two branch leads 735 and 736. Conductor 735 supplies the plate voltage for all tubes except the last one which is not energized until the relay 713 is operated. When the last or output tube of unit 639 is energized through conductor 736, relay contact 737 and return wire 738. The power output of frequency standard 639 is now sufficient to operate the synchronous stylus motor 321. The stylus 290, however, does not rotate until its shaft 306 is released by the phasing magnet 342.

The energized relay 715 operates the clutch release solenoid 267 from battery lead 636 through the solenoid winding, wire 739, closed contact 740 of relay 716 (not yet energized), wire 741 and through the closed contact 742 of relay 715 to ground. As we explained earlier, the operation of solenoid 267 releases the cam 243 (and therefore the entire cam assembly CS, Fig. 35) for rotation until the stop shoulder 251 strikes the follower 252. Let us remember that during this movement of the cam assembly the wrapping mechanism is closed to shape the paper into a cylindrical form for recording.

The operation of relay 714 energizes the half-nut solenoid 357 from the battery lead 636, wire 743 through the solenoid winding, wire 744 to wire 745, closed contact 746 of relay 718 (not energized), wire 747, closed contact 748 of relay 719 (not energized), and through the closed contact 749 of energized relay 714 to ground. The operation of solenoid 357 moves the half-nut 356 into mesh with the feed screw 236 and the scanning carriage K starts moving forward (toward left in Fig. 42) closing the switch 382. The movement of lever 354 to coupling position by solenoid 357 opens the switch 364 which is connected to the recording line 337 by a wire 750.

Let it be noted that the output coil 669 of amplifier 20 is normally grounded at both ends through two grounding circuits. One of the circuits goes through the closed switch 364, as already mentioned, and the other circuit goes from wires 750 and 750' through the insulating contact piece 341a of phasing magnet 342 and through cam 338 to ground. Therefore, even when the switch 364 is opened by the operation of solenoid 357, the stylus 290 is still shorted out by the grounded wire 750'. Consequently the output of amplifier 20 can not go to the stylus 290 until the phasing magnet 342 is energized.

The relay 716 is energized from battery lead 636 to point 727, wire 728 to point 729, wire 730, closed contact 731 of energized relay 713, wire 732, closed contact 751 of energized relay 715, wire 752 and through the winding of relay 716 to ground. The closed contact 753 of relay 716 short-circuits the high resistor 712 for a purpose that will presently become clear. It should be noted that when the energized relay 716 opens its contact 740, the circuit of solenoid 267 is broken, so that the operation of this solenoid is only momentary to lift the follower 252 off the cam 243.

Up to this moment, then, we have the recorder in this condition: The blank has been wrapped into cylindrical form, the scanning carriage K is starting to move forward, the stylus motor 321 is running, one of the grounding circuits has been removed from stylus 290 by the opened switch 364, and the high resistor 712 has been shorted from the condenser charging line 710. These operations are all performed within the two-second no-tone interval which we described in connection with the transmitter circuits of Fig. 40.

The transmitter is now sending out phasing pulses or signals produced by the scanning of the black mark 38' on the transmitted telegram. The line relay 700 responds to these phasing signals which are sufficiently long to charge the condenser 708 through the low resistor 712' in line 710, from which the high resistor 712 has been shorted out so as to reduce the charging time of the condenser. The resistor 712' is so chosen that it requires a duration of approximately half the phasing signal time to charge the condenser 708 to the required value.

When the relay 700 is released upon cessation of the phasing signal, the charged condenser 708 is discharged through wire 720, closed contact 733 of energized relay 715, wire 734, through phasing relay 717, wire 756 and to ground either through the closed contact 757 of relay 718 (not energized) or by wire 758 through switch 382 which the moving carriage K has allowed to close. The relay 717 locks through its contact 759 and a limiting resistor 759'. Obviously, from what we said in the preceding paragraph, short pulses of less than half the phasing signal duration will not operate the phasing relay 717.

The energized relay 717 operates the phasing magnet 342 from point 760 on line 711 through resistor 761, closed contact 762 of relay 717, wire 763 and through magnet 342 to ground. The energized magnet 342 releases the locking cam 338 and ungrounds the line 750', with the result that the stylus shaft 306 is now rotated by the synchronous motor 321 and the stylus 290 is operatively connected in the recording circuit. Hence, the stylus 290 rotates in synchronism with the scanned telegram sheet 38 in the transmitter and produces a facsimile of the transmitted message in a manner well known to those familiar with this art.

When the carriage K reaches the end of its forward movement or completion of a scanning operation, it closes the switch 386 which energizes the relay 718 from battery lead 636, wire 764, switch 386, wire 765, through the relay winding, wire 766, and through the closed contact 767 of relay 719 (not energized) to ground. The energized relay 718 locks through battery lead 636, wires 728 and 730, relay contact 731, wire 732, conductor 646, wire 786, closed contact 769 and through the relay winding as before. The opened contact 746 of energized relay 718 breaks the circuit of solenoid 357 which releases the half-nut 356 from feed screw 236 and allows the carriage K to return instantly to normal position.

Let us recall (Figs. 20 and 39) that during the return movement of the carriage K the lever 277 is thrown up by the trigger 285 and releases the cam assembly CS for movement from the position in Fig. 36 to that in Fig. 37. As a result, cam 245 opens the wrapper 172 and cam 244 feeds a fresh length of paper into the open wrapper, thereby projecting the recorded sheet out of the wrapper. At the same time the paper feed shaft 265 operates the cam 460 to close the switch 456, thereby energizing the solenoid 434 to shear off the recorded message which falls into the holder 131. As previously mentioned, when the paper supply is nearly exhausted, the switch 407 is closed and the lamp 133 lights to warn the operator of that fact.

The closing of switch 456 also energizes the relay 719 from the battery lead 636 through a wire 770, and the opening of relay contacts 724, 748 and 767 releases all the other relays of Fig. 42. The relay 719 has a make contact 771, and when this is closed it keeps the inverter 645 energized from battery lead 636 through a wire 728, contact 771 and conductor 646. The inverter, therefore, keeps the power motor 241 running until the cam 460 that controls the knife solenoid 434 has turned sufficiently to throw the follower out of the notch 461 so as to open the switch 456. This now deenergizes the relay 719 and also releases the cutter solenoid 434 which allows the knife 421 (Fig. 18) to fly back up.

With the release of relay 719 after the shearing of the recorded message, the machine automatically shuts down and stays ready for the next message. The battery switch 641 is left closed so as to hold the power units 637, 638, 639 and 640 in stand-by condition. The dynamotor 637 keeps the plate circuit of the first amplifier tube 653 energized through conductor 692 but that tube takes little power. However, the beam power tube 654 uses a heavy current and it would be a waste of power to keep that tube energized during non-recording intervals. Consequently, the plate circuit through conductor 665 is not closed until the relay 714 is energized, whereupon the conductor 665 is connected to the output lead 701 of dynamotor 637 through a wire 772 and the contact 773 of relay 714.

Another feature of conserving battery power is used in connection with the phasing magnet 342. The armature 341 of this magnet is subjected to heavy end pressure by the cam 338 which is constantly urged clockwise by the friction clutch 325 (Fig. 23). Hence it requires considerable power to dislodge the armature 341 from its locking position, though it takes but little power to hold it down. To meet this condition we provide a low resistor 774, and a condenser 775 of large capacity in series with the comparatively high resistor 761. The negative side of condenser 775 is grounded.

When the battery switch 641 is closed, a 150-volt D. C. source charges the condenser 775 through conductor 711 and the resistors 761 and 774. When the relay 717 is operated at the phasing moment, the condenser 775 discharges and sends a heavy current through the low resistor 774, closed relay contact 762, wire 763 and through the phasing magnet 342 to ground. This momentary heavy impulse has enough power to actuate the armature 341 and release the stylus shaft 306. After that a low current passes through the magnet 342 from conductor 711, through resistor 761 and relay contact 762 to hold the armature 341 in actuated position.

When only one car is used in our system, the line relay 700 responds to the selector signals and to the phasing signals equally well without any adjustment of the filter circuit in the recorder, because both kinds of signals come over the output frequency of the signal inverter 503 at the sending station. However, where we employ several cars with filter units tuned each to a different frequency, so that the selector frequency of any car is different from the output frequency of the signal inverter 503, we provide automatic means for adjusting the reactance of the filter circuit in each car in such a way that the filter frequency will correspond to the output frequency of the signal inverter.

One arrangement for accomplishing this automatic adjustment of the filter frequency comprises a pair of condensers 778 and 779 (Fig. 42) connected by wires 780 and 781 in parallel with the condensers 688 and 689, respectively, in the filter unit 684 (Fig. 41). The circuits of condensers 778 and 779 are controlled by contacts 782 and 783, respectively, of relay 713. Until this relay is energized, the condensers 778 and 779 are out of circuit and the filter unit 684 remains tuned to the selector frequency of this particular car, so that the relay 700 will respond only to that frequency.

After the car in question has been thus selected, the energized relay 713 closes the contacts 782 and 783, thereby connecting the adjusting condensers 778 and 779 in parallel with the filter condensers 688 and 689. Consequently, the frequency of the filter unit is adjusted to the proper value for the operation of relay 700 by the phasing pulses. For example, suppose the selector frequency of a particular car is 3000 and further suppose that the output frequency of the signal inverter 503 at the transmitter is 2500. The filter unit of that car was initially tuned to 3000 cycles for operating the line relay 700 to connect the car with the sending station. After this selection has been made and the relay 700 is energized, the inclusion of condensers 778 and 779 in the filter circuit automatically reduces the filter frequency to 2500 cycles. The relay 700 will now operate when the phasing signals come over on the 2500-cycle carrier tone. Should the selector frequency of a car be less than the frequency of the carrier tone coming from the signal inverter 503, the adjusting condensers 778 and 779 would normally be in the filter circuit and would be cut out when the relay 713 is energized.

*Summary of the recorder operation*

When the car operator closes the battery switch 641, the power units 637, 638 and 640 are energized and the tube filaments in amplifier 20, frequency standard 639 and inverter 645 are kept lighted in stand-by condition. The plate circuit of tube 654 in the amplifier is energized from the power unit 637 (upon the operation of relay 714) and the lighted jewel 129 tells the operator that the power is on. In other words, the operator only has to turn on the battery to condition the recorder equipment of his car for receiving facsimile signals.

When the selector frequency comes in, the line relay 700 is energized long enough (two seconds in this case) to charge the condenser 708. When the frequency is taken off, the condenser discharges through relay 713 which in turn energizes the relay 714. These two relays are kept energized from converter 640 and take over the power control of the apparatus independently of line relay 700.

The relay 713 energizes the inverter 645 and the frequency standard 639, whereby the relay 715 is energized and the power motor 241, the blower motor 469 and the stylus motor 321 are set in operation.

The energized relay 715 releases the cam assembly CS to close the wrapper 172 and the energized relay 714 operates the solenoid 357 to connect the half-nut 356 to feed screw 233. The paper is now supported in cylindrical form ready for recording and the scanning carriage K starts moving forward. But the stylus 290, be it noted, is still held back.

The foregoing operations take place automatically during the two-second no-tone interval following the cessation of the selector interval.

When the phasing marks come in, the condenser 708 is again charged but this time for a brief interval and discharges through the relay 717, which operates the phasing magnet 342. The stylus shaft 306 is now released and rotates in synchronism with the distant facsimile transmitter to record the received message.

Upon completion of a recording, the carriage K is pulled back to starting position and releases the cam assembly CS whereby the following automatic operations take place:

The wrapper 172 is opened by cam 245. The paper feed roll 266 is operated by cam 244 to supply the wrapper with fresh paper and project the recorded sheet out of the wrapper. The knife solenoid 434 is energized to shear off the recorded telegram. All relays 713 and 717 and the parts they control are restored to normal and the machine stops, waiting for the next signals from the sending station.

The battery lead 636 preferably contains a switch 784 which is held closed by the cover 132 and automatically opens when the cover is removed, as for inserting a new roll of paper. The open switch 784 disables the magnet 434 and paper cutter 421.

The moment a car is conditioned to receive facsimile signals, the radio transmitter 19 of that car is automatically disabled until the recording is over and the machine is shut down. In Fig. 41 a line 785 connects a relay 786 in the radio transmitter 19 with the inverter 645. When this inverter is energized, the relay 786 is operated and opens its contact 787 which disconnects the control circuits of the radio transmitter and thereby prevents its operation. This will be understood without further explanation.

It will be apparent that our facsimile system as herein set forth is susceptible of various modifications within the scope of the appended claims. Manifestly, it is not essential that all the various features of novelty comprising our invention shall be embodied in the same system, for certain features can be used advantageously without the presence of others.

Concerning the automatic recorder herein shown we call attention to the pending application of R. J. Wise, Ser. No. 609,756, filed August 9, 1945, for Facsimile Recording Apparatus, which includes a flexible wrapper for shaping a measured length of recording paper into cylindrical form by closing the wrapper. We do not, therefore, claim that idea broadly in this case where we limit ourselves to improvements over the Wise recorder.

We claim as our invention:

1. A radio facsimile telegraph system comprising a transmitter and a plurality of receivers, a device at the transmitter for sending out a plurality of different steady selector frequencies, means at the transmitter for sending out phasing signals over a carrier frequency which is different from said selector frequencies, a filter unit in each receiver tuned to be energized only by one of said selector frequencies, a relay in each receiver adapted to be operated in response to the energizing of the associated filter unit by its selector frequency, and means for automatically conditioning the circuit of said relay so as to be energized by said phasing signals, said conditioning means including connections for adjusting the resonant frequency of said filter unit to the carrier frequency of the phasing signals, a recorder embodied in each receiver, means responsive to the operation of said relay when energized by said selected frequency to connect power to said recorder and means responsive to the operation of said relay, when energized by said phasing signals, for rendering the recorder responsive to transmitted signals.

2. In a facsimile telegraph system, a transmitter having facsimile scanning mechanism, means in said transmitter for generating a steady selector signal frequency, means for generating phasing signals, timing means for limiting the duration of said selector signal frequency to a prescribed interval, said timing means operating to initiate operation of said phasing signal generating means a predetermined interval after interruption of said selector signal frequency for sending out phasing pulses, in combination with a facsimile recorder provided with a relay energized at successive intervals in response to said selector signal and said phasing pulses, and apparatus controlled by said successive operation of said relay for placing said recorder in phased synchronism with said transmitter.

3. In a facsimile telegraph system, a transmitter having a rotary copy holding cylinder, a motor for operating said cylinder, a scanning carriage associated with said cylinder, a starting switch, a relay energized by the closing of said switch, connections whereby the energizing of said relay causes said motor to drive said cylinder, a second relay automatically energized by the operation of said first relay, means controlled by the second relay to actuate said carriage, and a timing device and means controlled thereby for causing the operation of the second relay to occur automatically after a certain time following the operation of the first relay.

4. A facsimile telegraph system including a sending station and a receiving station adapted to be placed in operative communication, said sending station having scanning mechanism and said receiving station having recording mechanism, a starting switch and a plurality of relays at the sending station, a timer operatively connected with said relays, means actuated by said switch for initiating operation of said timer, control circuits interconnecting said timer with said relays in a manner to effect operation of said relays in automatic sequence at timed intervals, apparatus at the sending station controlled by the successive operation of said relays for automatically sending a selector signal over the communication channel for a first predetermined timed interval and after a second predetermined timed interval operating said scanning mechanism to transmit facsimile signals, a device at the receiving station responsive to said selector signal, and apparatus at the receiving station controlled by the continued operation of said device for said first timed interval and operated in part during said second timed interval for automatically placing said recording mechanism in condition to record facsimile signals.

5. A facsimile telegraph system comprising a sending station and a receiving station, means at the sending station for generating a steady selector frequency of a certain duration, and apparatus at the receiving station automatically responsive to said frequency for placing said station in operative communication with the sending station, said apparatus including a condenser having a charging time of the order of magnitude of said certain duration, means for applying a charging current to said condenser during the transmission of said frequency and means for automatically discharging said condenser upon the cessation of said frequency and a controlling device responsive to said condenser discharging current for conditioning said recorder for operation.

6. A facsimile telegraph system comprising a transmitter and a receiver adapted to be connected through a communication channel, said transmitter having scanning mechanism and said receiver having mechanism for recording the scanned subject matter, a driving motor for said recording mechanism, means at the transmitter for generating a selector frequency of definite duration and sending it over said channel to the receiver, control circuits at the receiver including a condenser and a relay, connections whereby said condenser is charged in response to said selector frequency and automatically discharged through said relay upon cessation of said frequency, and means responsive to the operation of said relay for energizing said motor.

7. A facsimile telegraph system comprising a transmitter, a device in said transmitter for generating a selector signal of definite duration, a recorder having apparatus responsive to said selector signal for automatically making said recorder operative to record facsimile signals coming from said transmitter, said recorder having an amplifier output circuit in which a recording stylus is connected, and connections for automatically grounding the stylus for the duration of said selector signal.

8. A facsimile telegraph system comprising a transmitter, apparatus in said transmitter for generating two sets of electric impulses of predetermined duration and automatically spaced a certain interval apart, a recorder operatively connected with said transmitter, said recorder having a flexible member adapted to be closed into cylindrical form and normally open to receive a recording blank, mechanism for closing said member to support the received blank in the form of a paper cylinder, a rotary electric stylus for scanning the inside surface of said paper cylinder, a synchronous motor for rotating said stylus, connections operated in response to the first set of said impulses for operating said mechanism and energizing said motor, means for normally locking said stylus against rotation by the energized motor, and a magnet energized in response to the second set of impulses for operating said member to release the stylus, whereby the recorder is automatically placed in operative condition and phased with the transmitter.

9. A facsimile recorder responsive to successively received control signals and message signals, said recorder having a flexible wrapper normally open to receive a recording blank, mechanism for operating said wrapper to closed and open positions, said wrapper when closed being adapted to support a blank in cylindrical form for scanning, a power driven cam for controlling the operation of said mechanism, an electromagnet responsive to said control signals for controlling the operation of said cam to effect the closing of said wrapper by said mechanism prior to the receipt of said message signals, and means in said recorder for automatically controlling said cam at the end of a recording cycle to effect the opening of said wrapper by said mechanism.

10. A facsimile recorder having a rotary shaft, a recording stylus mounted on said shaft, a motor for operating said shaft, a device for normally holding said shaft locked against rotation, a magnet adapted when energized to operate said device for releasing the shaft, connections for normally grounding the stylus, and means for automatically removing said ground actuated by the operation of said device to shaft releasing position.

11. A facsimile machine having a scanning shaft, an electric motor for operating said shaft, an electromagnet having an armature which normally holds said shaft locked against the turning movement of said motor, a source of current of a value insufficient to operate said magnet, a circuit including said source and said magnet, a normally open switch in said circuit, a condenser connected to said source of current and adapted to be charged thereby, means for closing said switch at a predetermined moment, and connections whereby the closing of said switch automatically discharges the condenser through the magnet winding to operate said armature and release the scanning shaft for rotation, said current being of a value sufficient to hold said armature in operative position in the closed position of said switch.

12. A facsimile recording machine having a flexible wrapper for holding a length of paper in cylindrical form for recording, connections for opening and closing said wrapper, a device for feeding a measured length of paper from a continuous supply roll into the open wrapper, means for recording on the inner surface of the supported blank when the wrapper is closed, means for operating said connections to open the wrapper at the close of a recording cycle, means for operating said paper feed device upon opening of the wrapper to project the recorded sheet out of the wrapper and feed a fresh blank into the wrapper, a cutting member, means for automatically actuating said cutting member after said paper feed operation to cut off the recorded sheet, and means for interrupting the operation of said connection with the wrapper held in open position.

13. A facsimile recorder having a flexible wrapper normally open to receive a recording blank, a device for feeding a definite length of recording blank from a continuous supply roll into the open wrapper, mechanism for closing and opening said wrapper, said wrapper when closed being adapted to support said length of blank in cylindrical form, scanning apparatus for a blank in the wrapper, a power shaft for said apparatus, a cam assembly frictionally mounted on said shaft and normally locked against rotation, means for automatically releasing said cam assembly at the beginning and at the end of a recording cycle, connections whereby the release of said cam assembly at the beginning of a recording cycle operates said mechanism to close the wrapper, connections whereby the release of said cam assembly at the end of a recording cycle opens the wrapper and operates said blank feed device, and a shearing member automatically actuated after the blank feed operation for cutting off the recorded section of the blank.

FREDERICK G. HALLDEN.
GARVICE H. RIDINGS.
DOUGLAS M. ZABRISKIE.
ROBERT D. PARROTT.

(References on following page)

References Cited in the file of this patent

UNITED STATES PATENTS

| Number | Name | Date |
|---|---|---|
| Re. 22,819 | Ridings et al. | Dec. 17, 1936 |
| 1,676,848 | Au | July 10, 1928 |
| 1,713,314 | Willis | May 14, 1929 |
| 1,932,579 | Finch | Oct. 31, 1933 |
| 1,984,602 | Snyder | Dec. 18, 1934 |
| 2,047,817 | Bailey | July 14, 1936 |
| 2,113,655 | Kellie | Apr. 12, 1938 |
| 2,136,789 | Finch | Nov. 15, 1938 |
| 2,255,868 | Wise et al. | Sept. 16, 1941 |
| 2,255,869 | Ridings et al. | Sept. 16, 1941 |
| 2,333,272 | Ridings | Nov. 2, 1943 |
| 2,363,583 | Gilman | Nov. 28, 1944 |
| 2,365,741 | Wise et al. | Dec. 26, 1944 |
| 2,386,263 | Ridings et al. | Oct. 9, 1945 |
| 2,398,352 | Beach | Apr. 16, 1946 |
| 2,412,639 | Traugott | Dec. 17, 1946 |
| 2,446,400 | Woolley | Aug. 3, 1948 |
| 2,483,449 | Wise et al. | Oct. 4, 1949 |
| 2,511,892 | Wise | June 20, 1950 |
| 2,515,893 | Philpott | July 18, 1950 |
| 2,528,624 | Volz | Nov. 7, 1950 |